United States Patent
Khoyilar et al.

(10) Patent No.: US 11,397,719 B1
(45) Date of Patent: Jul. 26, 2022

(54) DATABASE SYSTEM FOR TRIGGERING EVENT NOTIFICATIONS BASED ON UPDATES TO DATABASE RECORDS IN AN ELECTRONIC FILE

(71) Applicant: AnyQpon Inc., Newport Coast, CA (US)

(72) Inventors: Michael Khoyilar, Newport Coast, CA (US); Piotr Szreder, San Diego, CA (US)

(73) Assignee: AnyQpon Inc., Newport Coast, CA (US)

( * ) Notice: Subject to any disclaimer, the term of this patent is extended or adjusted under 35 U.S.C. 154(b) by 0 days.

(21) Appl. No.: 17/504,397

(22) Filed: Oct. 18, 2021

Related U.S. Application Data

(63) Continuation-in-part of application No. 17/249,639, filed on Mar. 8, 2021, now abandoned, which is a continuation of application No. 16/867,415, filed on May 5, 2020, now Pat. No. 10,942,913, which is a continuation-in-part of application No. 16/244,463, filed on Jan. 10, 2019, now Pat. No. 10,679,239.

(60) Provisional application No. 62/616,292, filed on Jan. 11, 2018.

(51) Int. Cl.
| | | |
|---|---|---|
| *G06F 16/23* | (2019.01) | |
| *G06F 16/21* | (2019.01) | |
| *G06F 16/9537* | (2019.01) | |
| *G06F 16/2455* | (2019.01) | |
| *G06F 9/54* | (2006.01) | |
| *G06F 9/445* | (2018.01) | |

(52) U.S. Cl.
CPC .......... *G06F 16/2358* (2019.01); *G06F 9/445* (2013.01); *G06F 9/542* (2013.01); *G06F 16/219* (2019.01); *G06F 16/2365* (2019.01); *G06F 16/24565* (2019.01); *G06F 16/9537* (2019.01)

(58) Field of Classification Search
CPC ...... G06F 16/2358; G06F 9/445; G06F 9/542; G06F 16/219; G06F 16/2365; G06F 16/24565; G06F 16/9537
USPC ................................ 707/702, 705; 705/14.1
See application file for complete search history.

(56) References Cited

U.S. PATENT DOCUMENTS

| | | | | |
|---|---|---|---|---|
| 8,140,403 | B2 * | 3/2012 | Ramalingam | H04W 12/08 705/26.1 |
| 2008/0268868 | A1 * | 10/2008 | Maitland | G06Q 30/02 455/456.1 |
| 2012/0185355 | A1 * | 7/2012 | Kilroy | G06Q 30/0633 705/26.8 |

(Continued)

*Primary Examiner* — Michael Pham
(74) *Attorney, Agent, or Firm* — Knobbe, Martens, Olson & Bear, LLP

(57) ABSTRACT

A database processing system is disclosed for accessing databases and updated data items and triggering event notifications. The data processing system may comprise a records database including a plurality of data records, and a triggers database including a plurality of trigger indicators. The database system may further include a hardware processor that can execute computer-executable instructions in order to: receive an update on a data record, identify a type of change corresponding to change in the data record, cause an update to the records database based on information included with the updated data record, identify a trigger corresponding to the type of update to the data record, and generate an event notification including information included in the update.

20 Claims, 49 Drawing Sheets

(56) References Cited

U.S. PATENT DOCUMENTS

2015/0294344 A1* 10/2015 Popomaronis ..... G06Q 30/0235
                                                      705/14.35
2020/0167699 A1*  5/2020 Cohen ................... G06Q 10/02

* cited by examiner

1100

- 10% Event Notification Content Value Adjustment (Everyone)
- 25% Event Notification Content Value Adjustment (>25 Points)
- 45% Event Notification Content Value Adjustment (>100 Points)
- 60% Event Notification Content Value Adjustment (New Customers)

DATABASE SYSTEM FOR TRIGGERING EVENT NOTIFICATIONS BASED ON UPDATES TO DATABASE RECORDS IN AN ELECTRONIC FILE

TECHNICAL FIELD

The present disclosure relates to data processing, including database and file management, as well as a database system for accessing one or more databases or other data structures, and triggering event notifications based on updates to database records.

Electronic databases provide for storage and retrieval of digital data records. Data records in such databases may be electronically updated.

SUMMARY

The systems, methods, and devices described herein each have several aspects, no single one of which is solely responsible for its desirable attributes. Without limiting the scope of this disclosure, several non-limiting features will now be described briefly.

Embodiments of the present disclosure relate to a database system (also herein referred to as "the system") for triggering event notifications (also referred to herein as "notifications" or "alerts") based on updates to database records. The system may advantageously provide notifications to interested users of certain types of changes to certain database records. For example, a database system may determine that the user is interested in a particular database record, and more specifically to a particular type of change to the particular database record. The system advantageously, upon a change to the particular database record, may determine that the user is interested in changes to the particular database record, and may thus generate a log of the change. The system may then determine that the change that was logged is of the particular type, and may thus generate and send a notification to the user. Further, advantageously, the notification may include information about the change that may be quite useful to the user.

In some embodiments, the system may store a history of previous notifications. Thus, for example, the system may advantageously avoid sending out duplicate notifications, and/or may prioritize particular notifications. Further, the system may determine that notifications are to be generated based on historical data.

In some embodiments, the system may receive, from various users, indications of triggers that may be implemented by the system. A trigger may be associated with a particular user, such that notifications resulting from that trigger are sent to the user. In some embodiments, the notification may cause activation of a device or software application, enabling rapid notification and/or automation activities.

In some embodiments, the system may process, e.g., hundreds of millions (or more) of data record updates each day and may determine and generate millions (or more) of triggers and event notifications each day. Accordingly, in various embodiments, large amounts of data are automatically and dynamically processed in response to user inputs.

Various embodiments of the present disclosure provide improvements to various technologies and technological fields. For example, existing database systems may lack notifications. The present disclosure describes improvements to, and useful applications of, database systems. For example, the database system disclosed here, according to various embodiments, efficiently monitors a database for triggering events, and dynamically generates notifications in response to those triggering events. Additionally, various embodiments of the present disclosure are inextricably tied to computer technology. In particular, various systems and methods discussed herein provide monitoring of electronic databases, processing of large volumes of data items, generation and transmission of electronic notifications, and the like. Such features and others are intimately tied to, and enabled by, computer technology, and would not exist except for computer technology. Further, the implementation of the various embodiments of the present disclosure via computer technology enables many of the advantages described herein, including more efficient processing of various types of electronic data.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings.

DETAILED DESCRIPTION

Overview

Figure 1A:
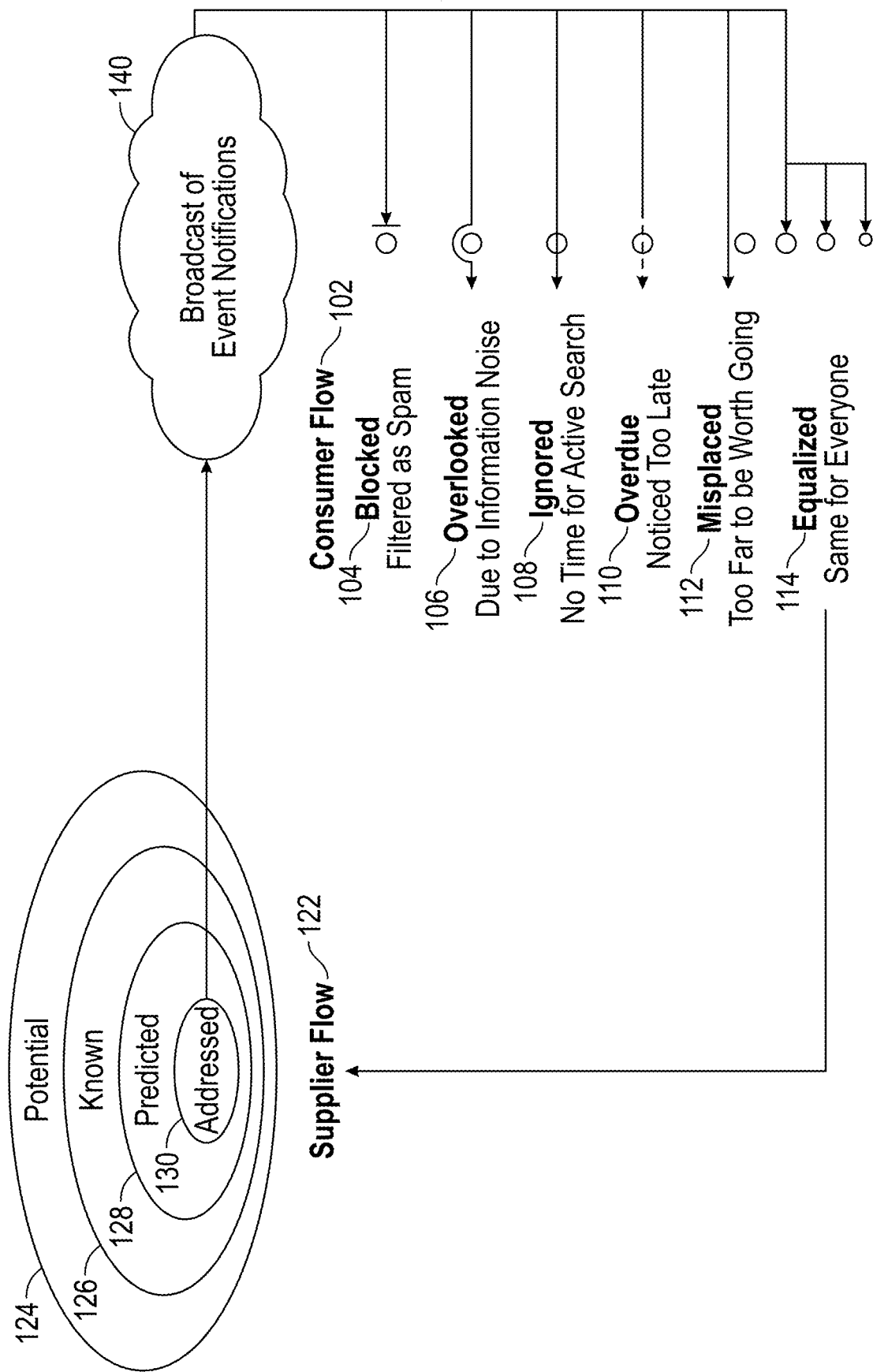
FIG. 1A illustrates an example of a traditional process of a database system for triggering event notifications based on updates to database records.

Some embodiments can include a method for data integration of geolocation information of a mobile computing device from a downloadable electronic file, the method comprising: providing a first downloadable electronic file to a mobile computing device for installation on the mobile computing device, wherein the mobile computing device includes a global positioning system; receiving an indication of completion for the installation of the first downloadable electronic file on the mobile computing device; receiving, from the first downloadable electronic file, a geolocation of the mobile computing device, wherein the first downloadable electronic file receives geolocation data from the global positioning system of the mobile computing device and identifies the geolocation based on the received geolocation data; identifying a list of content provider systems within a threshold radius of the geolocation; accessing content items for the list of content provider systems and corresponding matching rules; accessing a profile for the mobile computing device; and applying the matching rules to the profile to identify one or more matched content items for the mobile computing device.

In the method in any of the preceding paragraphs or any of the methods described herein, the method can further comprise identifying a distance between the geolocation of the mobile computing device and the content provider systems corresponding to each of the matched content items; and adjusting a characteristic of the matched content items based on the identified distance.

In the method in any of the preceding paragraphs or any of the methods described herein, the method can further comprise transmitting the one or more matched content items to the mobile computing device with the adjusted characteristic, wherein the mobile computing device displays a map including a visual indicator of the matched content items and the geolocation of the mobile computing device.

In the method in any of the preceding paragraphs or any of the methods described herein, the method can further comprise receiving an redemption indication of at least one of the one or more matched content items from a second downloadable electronic file installed on the corresponding content provider system, wherein the content provider system receives a signal from the mobile computing device via a near field communication antenna or Bluetooth.

In the method in any of the preceding paragraphs or any of the methods described herein, transmitting the one or more matched content items to the mobile computing device with the adjusted characteristic includes: transmitting the one or more matched content items over a wireless communication channel, and automatically activating the first downloadable electronic file on the mobile computing device to display at least one of the one or more matched content items.

In the method in any of the preceding paragraphs or any of the methods described herein, transmitting the one or more matched content items to the mobile computing device with the adjusted characteristic occurs in substantially real-time of identifying one or more matched content items for the mobile computing device.

In the method in any of the preceding paragraphs or any of the methods described herein, the one or more matched content items is an event notification.

In the method in any of the preceding paragraphs or any of the methods described herein, the characteristic is a discount amount or a discount percentage.

In the method in any of the preceding paragraphs or any of the methods described herein, adjusting the characteristic is further based on at least one of: a content provider rating, a user of a mobile computing device rating, loyalty points, an event notification referral, an event notification redemption, or an event notification received.

In the method in any of the preceding paragraphs or any of the methods described herein, adjusting the characteristic is further based on a corresponding conversion rate for the identified distance.

In the method in any of the preceding paragraphs or any of the methods described herein, the corresponding conversion rate is retrieved via an Application Programming Interface (API) call.

In the method in any of the preceding paragraphs or any of the methods described herein, the map further includes visual indicators of distributed, redeemed, and referred content items, and of reviewed content providers.

Some embodiments include a system for data integration of geolocation information of a mobile computing device from a downloadable electronic file, the system comprising: one or more processors in communication with at least one electronic data store and configured to at least: provide a downloadable electronic file to a mobile computing device for installation on the mobile computing device, wherein the mobile computing device includes a global positioning system; receive an indication of completion for the installation of the downloadable electronic file on the mobile computing device; receive, from the downloadable electronic file, a geolocation of the mobile computing device, wherein the downloadable electronic file receives geolocation data from the global positioning system of the mobile computing device and identifies the geolocation based on the received geolocation data; identify a list of content provider systems within a threshold radius of the geolocation; access content items for the list of content provider systems and corresponding matching rules; access a profile for a user of the mobile computing device; and apply the matching rules to the profile to identify one or more matched content items for the mobile computing device.

In the system in any of the preceding paragraphs or any of the systems described herein, the one or more processors are further configured to identify a distance between the geolocation of the mobile computing device and the content provider systems corresponding to each of the matched content items; and adjust a characteristic of the matched content items based on the identified distance.

In the system in any of the preceding paragraphs or any of the systems described herein, the one or more processors are further configured to transmit the one or more matched content items to the mobile computing device with the adjusted characteristic, wherein the mobile computing device displays a visual indicator of the matched content items and the geolocation of the mobile computing device.

In the system in any of the preceding paragraphs or any of the systems described herein, the one or more processors are further configured to facilitate a payment transaction between the content provider system and the mobile computing device without providing financial information associated with a user of the mobile computing device to the content provider system.

In the system in any of the preceding paragraphs or any of the systems described herein, at least one electronic data store includes a first data store storing call functions for data in a second data store.

In the system in any of the preceding paragraphs or any of the systems described herein, the one or more processors are further configured to display an event notification value (such as a promotion or discount) summary graph of event notification contents accepted, redeemed, removed, and expired.

In the system in any of the preceding paragraphs or any of the systems described herein, the one or more processors are further configured to display a distribution distance graph of accepted event notification contents over two or more distances.

In the system in any of the preceding paragraphs or any of the systems described herein, a scanner of the content provider system is configured to scan the one or more matched content items displayed on the mobile computing device.

In the system in any of the preceding paragraphs or any of the systems described herein, at least one of the one or more matched content items include a Quick Response (QR) code.

Some embodiments include a non-transitory computer storage medium storing computer-executable instructions that, when executed by a processor, cause the processor to perform the following method: provide a downloadable electronic file to a user computing device for installation on the user computing device, wherein the user computing device includes a global positioning system; receive an indication of completion for the installation of the downloadable electronic file on the user computing device; receive, from the downloadable electronic file, a geolocation of the user computing device, wherein the downloadable electronic file receives geolocation data from the global positioning system of the user computing device and identifies the geolocation based on the received geolocation data; identify a list of content provider systems within a threshold radius of the geolocation; access content items for the list of content provider systems and corresponding matching rules; access a profile associated with the user computing device; and apply the matching rules to the profile to identify one or more matched content items for the user computing device.

In the non-transitory computer storage medium in any of the preceding paragraphs or any of the methods described herein, the method can further comprise the following: identify a distance between the geolocation of the user computing device and the content provider systems corresponding to each of the matched content items; and adjust a characteristic of the matched content items based on the identified distance.

In the non-transitory computer storage medium in any of the preceding paragraphs or any of the methods described herein, the method can further comprise the following: transmit the one or more matched content items to the user computing device with the adjusted characteristic.

In the non-transitory computer storage medium in any of the preceding paragraphs or any of the methods described herein, the matching rules include a query for a type of content item.

In the non-transitory computer storage medium in any of the preceding paragraphs or any of the methods described herein, the method can further comprise the following: receive a request to send one of the matched content items to another user computing device.

Some embodiments include a database processing system for accessing databases and updated data records and triggering event notifications, the system comprising: a data records database including a plurality of data records; a triggers database including a plurality of trigger; and a hardware processor configured to execute computer-executable instructions in order to: receive a request from a user device for purchase of a product; identify a user profile and corresponding user data records in the data records database; identify a type of change corresponding to change in a data record corresponding to the user profile, wherein the type of change includes a distance between the user device and a vendor location; cause an update to the data records database based on information included with the updated data record; identify a trigger stored in the triggers database corresponding to the type of change in the data record, wherein the trigger comprises a threshold distance; and generate an event notification including information related to the trigger.

In the system in any of the preceding paragraphs or any of the systems described herein, the request for purchase of a product comprises a database query from a user, and in response to receiving the database query, requesting to receive the update on the data record.

In the system in any of the preceding paragraphs or any of the systems described herein, the system further comprises: a historical data records database including a plurality of historical records, wherein the hardware processor is further configured to execute computer-executable instructions in order to: store a previous version of the data record in the third database, wherein the previous version of the data record includes a previous distance between the user device and the vendor location; compare the previous version of the data record to the data record; and generate the event notification at least in part in response to comparing the previous version of the data record to the data record.

In the system in any of the preceding paragraphs or any of the systems described herein, the hardware processor is further configured to execute computer-executable instructions in order to enable a feedback loop to update data records in the data records database based on a user's interaction to the event notification.

In the system in any of the preceding paragraphs or any of the systems described herein, the records database stores geolocation information of a user's mobile device.

In the system in any of the preceding paragraphs or any of the systems described herein, the hardware processor is further configured to execute computer-executable instructions in order to identify a threshold distance of a location for the type of change, wherein to identify the type of change comprises identifying an updated distance from the user's mobile device to a vendor location, and wherein identifying the trigger comprises determining that the updated distance meets the threshold distance.

In the system in any of the preceding paragraphs or any of the systems described herein, the threshold distance comprises a threshold radius.

In the system in any of the preceding paragraphs or any of the systems described herein, the event notification launches an application on a user's mobile device that is in an unlaunched state to provide a notification regarding the identified trigger.

In the system in any of the preceding paragraphs or any of the systems described herein, the notification on the application displayed on the user's mobile device comprises a map and a visual indicator of information related to the identified trigger.

Some embodiments include a method for accessing databases and updated data records and triggering event notifications, the method comprising: receiving a database query on a data record related to purchase of a product or service; identifying a type of change corresponding to change in a data record corresponding to a user profile, wherein the type of change includes a distance between the user device and a vendor location; causing an update to the records database based on information included with the updated data record; identifying a trigger stored in the triggers database corresponding to the type of update to the data record, wherein the trigger comprises a threshold; and generating an event notification including information related to the trigger.

In the method in any of the preceding paragraphs or any of the systems described herein, to generate the event notification comprises determining an event notification content based on a historical conversion rate for the user.

In the method in any of the preceding paragraphs or any of the systems described herein, determining an event notification content based on a historical conversion rate for the user is based on the distance between the user device and the vendor location.

In the method in any of the preceding paragraphs or any of the systems described herein, determining an event notification content based on a historical conversion rate for the user comprises an adjusted percentage discount.

In the method in any of the preceding paragraphs or any of the systems described herein, the adjusted percentage discount occurs in substantially real-time of receiving the database query.

In the method in any of the preceding paragraphs or any of the systems described herein, the adjusted percentage discount is further based on at least one of: a content provider rating, a user rating, loyalty points, a voucher referral, a voucher redemption, or a voucher received.

In the method in any of the preceding paragraphs or any of the systems described herein, the method further comprises, receiving a redemption indication of the event notification by the user.

Some embodiments include a non-transitory computer storage medium storing computer-executable instructions that, when executed by one or more processors, cause the one or more processors to perform the following method: receive a request from a user device for purchase of a product; identify a user profile and corresponding user data records in the data records database; identify a type of change corresponding to change in a data record corresponding to the user profile, wherein the type of change includes a distance between the user device and a vendor location; cause an update to the data records database based on information included with the updated data record; identify a trigger stored in the triggers database corresponding to the type of change in the data record, wherein the trigger comprises a threshold distance; and generate an event notification including information related to the trigger.

In the non-transitory computer storage medium in any of the preceding paragraphs or any of the methods described herein, the method can further comprise: facilitating a payment transaction between the vendor and the user without providing financial information associated with a user to the content provider system.

In the non-transitory computer storage medium in any of the preceding paragraphs or any of the methods described herein, the method can further comprise: displaying a promotion summary graph of coupons accepted, redeemed, removed, and expired by the user, and displaying a distribution distance graph of accepted coupons over two or more distances.

In the non-transitory computer storage medium in any of the preceding paragraphs or any of the methods described herein, the method can further comprise: initiating payment for a transaction and transmitting a request for the goods or services requested by the user in response to the user scanning the event notification at the vendor location.

Increasing numbers of businesses are using special content items, such as special offers, event notifications (e.g., vouchers or alerts), loyalty and referral programs, and product or services discounts to attract users (e.g., customers). Retailers are providing digital event notifications to users without the need for event notifications to clip or emails to print. Users can simply display an event notification on a mobile device or enter a code online to redeem the event notification. Event notifications can include a buy-one-get-one-free or free shipping. Other event notifications can include a percentage discount, a bundling offer, or a free gift. As such, retailers can entice new users to a business, as well as re-attract previous users.

Described herein are systems and methods that facilitate the delivery of targeted content (e.g., digital event notifications) via a targeting campaign to provide a personalized user-vendor experience. The targeting content can include dynamically generating an event notification based on a certain type of update to a data record. For example, the database system can dynamically determine rates for discounts and/or event notifications based on changes to distances between a user (or consumer) driving on a highway with a vendor such as a car wash for improved targeted marketing. The targeting content can include a single platform for suppliers, users, and producers, instead of providing separate platforms in traditional targeting campaigns that facilitate communication to and from users and vendors (e.g., content item providers). As such, the database system can maximize sharing of relevant event notification contents and vendor event notification values to users, and match the user's unique needs with customized discounts.

The database system can generate event notifications based on user queries. The database system can receive a database inquiry, and in response to receiving the database inquiry, the database system can request to receive an update on a data record. The inquiry can include a user's request to receive coupons or promotions in the area. The database system can identify a data record for the user and determine updates to the data record. The changes to the data records can correspond to a type of change, such as a change in GPS location or a distance from certain vendors. The database system can identify a trigger corresponding to the type of change, such as if the distance from a vendor meets a distance threshold. The database system can then generate an event notification, such as an alert that includes rates and promotions based on distances to the vendors.

The rates for the event notifications, discounts, bundle options, and/or the like can be customized to a particular user and/or a particular merchant based on loyalty and/or referral programs, user ratings, supplier ratings, producer ratings, user queries and/or transactions, user conversion rates, distances from certain locations, and/or the like. For example, the database system can identify a user query history for car washes, match with a merchant with available event notifications remaining for the remainder of the month, and push the event notification to the user (or shopper) when the user's geographical location is within a defined distance (e.g., 5 miles) from a car wash. Accordingly, the event notifications can be uniquely customized based on the user needs rather than suppliers broadcasting general event notifications to a group of individuals based on a supplier's prediction of a user's needs. Moreover, users can be incentivized to provide referrals to their friends and family by providing the users with points and/or discounts of their own.

In some embodiments, the database system can include infrastructure to facilitate the determination and/or distribution of the dynamically determined event notification. The infrastructure can include one or more of web servers, databases, web API calls, executable software instructions including algorithmic processing, mobile devices, mobile applications, and/or the like. In some embodiments, mobile applications can retrieve geolocation information of a user's mobile device. The database system can provide a downloadable electronic file to the user's mobile device. The user's mobile device can install the downloadable electronic file. Then, the electronic file can access geolocation data from the mobile device's global positioning system to identify a geolocation of the mobile device. The electronic file can transmit the geolocation back to the database system.

In some embodiments, the database system deploys an executable instruction set via a downloadable electronic file by transmitting the executable instruction set to the client device (e.g., a client mobile device). Transmitting the executable instruction set can include pushing the executable instruction set to the client device in the form of an update and/or a downloadable file. Accordingly, in some embodiments, the executable instruction set can be downloaded and performed on the client computing device, separate from the database system, to perform the one or more processes on an event notifications and/or event notification related processes. Thus, the executable instruction set can perform the one or more processes locally to the client computing device, enabling faster response time by performing the processes locally and reducing network throughput by reducing and/or eliminating sending data back and forth to the database system. Moreover, the executable file enables the secure retrieving of internet activity data, such as cookie data on the mobile device, that can be used for event notification generation (e.g., a user's online activity indicates a preference for Italian restaurants, and thus, event notification contents are generated for Italian restaurants). Moreover, sensitive information retrieved at the mobile device can be processed within the mobile device without having to send the sensitive data to and from the database system, thus improving sensitive data security.

In some embodiments, the database system can identify and determine an optimal event notification amount or rate for a user based on historical data records (such as a past conversion performance across various event notification amounts), a change in data records (such as a change in distances to vendor locations, loyalty points, last visit time or dates, referrals, etc), and/or a combination thereof. The database system can retrieve a user's previous data record, such as the user's historical conversion rate for a particular event notification discount percentage over certain distances, such as a positive conversion for 30% discount at 5 miles but a negative conversion for 20% at 6 miles. The database system can retrieve a user's data record, such as the user's profile information which can include the user's conversion rates, via API calls to various databases. Accordingly, the database system can dynamically determine an event notification rate (e.g., 30%) based on the profile information. In some embodiments, the database system can determine a content item, such as an event notification, a coupon, a rate, a price, a discount, and/or the like, based on a user profile and current geolocation (e.g., a higher percentage discount voucher based on a conversion rate at a certain distance and the current distance of the user). The database system can then identify a trigger, such as if the geolocation is of a certain distance to the vendor, if the conversion rate is above a certain threshold, other factors tested as described herein, and/or a combination thereof (e.g., 20% conversion at 6 miles distance). Upon identification of a trigger, the database system can cause the mobile device to display the event notification to the user. The event notification can be transmitted over a wireless communication channel to activate the installed electronic file (e.g., a mobile application) on the user's mobile device, to cause connection between the electronic file of the remote user mobile device and the dynamic generation and distribution system over the Internet, and to display details of the event notification to the user.

Advantageously, the dynamic generation of the event notification and the automatic distribution of the event notification improves an Internet-centric, technical problem that is rooted in computer technology. In the example of dynamically generating the event notification based on the geolocation relative to the vendor, the user can be immediately notified of an event notification in the nearby vicinity when the event notification is the most relevant to the user. Thus, the user can be alerted of time and/or distance sensitive location when the user is away from a web browser and/or not using the user's mobile phone, providing a practical solution to the technical problem of the user being away from a computing device, such as a home desktop or mobile phone, and/or a user device not specifically using a communication network (such as a user not using the wireless network on the mobile phone).

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Traditional platforms separate the supplier targeting campaign and user profile, such that a supplier's targeting campaigns are directed to user databases that are sometimes accessible, static, and known, and that must be created and maintained/updated. Such separation of the supplier campaign and user profile of traditional systems often require suppliers to focus their event notifications to users that are known upfront. Suppliers may need to create and maintain user database by their own. Such approaches are very cost restrictive for small businesses and even large corporations to reach a reasonably sized audience that can benefit from the event notification valueal campaign. Furthermore, such approaches restrict targeting campaigns to known users. New users (e.g., new to the area, visitors, tourists, and/or the like) may be missed by suppliers due to the static nature of user databases that need to be maintained in order to be current. Advantageously, embodiments of this disclosure include systems and methods that establish a shared/common platform for suppliers to run campaigns and users to receive and redeem offers from the suppliers. As such, the shared platform has access to the most up-to-date customer information across multiple supplier channels, thereby providing a solution to the technical problem of database storage of user data. User data in today's internet of things world can be scattered across hundreds of different databases/platforms and quickly outdated. By providing a combined database, the database can aggregate user information, including information of users and vendors, to provide a practical solution of having an up-to-date customer information database for vendors and users to use, instead of having to rely on their own database and/or perform collection of data across thousands of databases on their own.

Furthermore, additional challenges may be associated with having to maintain and update user information in response to user profile changes. Traditional systems often do not update information related to currently known users and/or require large amount of processing and/or data transmission to maintain real-time up-to-date user information. Finally, such systems focus on gathering large amount of indirect information about the user, often without his knowledge (e.g., user browsing history) and use complex and computation exhaustive algorithms to determine user needs to properly targeting campaign. Such approach requires large amount of storage, computation and bandwidth and thus is costly. On top they must consider legal issues of gathering information about users without their consent (e.g., geographic location or browsing history). Advantageously, embodiments of the current disclosure include systems and methods that minimize and/or eliminate those costs by shared platform shared by suppliers and users and using information consciously provided by users about their current needs from user queries. The shared platform can also provide information of user event notifications that were delivered and used. Thus, the shared platform can apply user conversion statistics across different suppliers.

Traditional systems often focus on informing potential users regarding an offer by offering a wide broadcasting of an offer to all users meeting certain criteria, limits, and/or known characteristics of the users, and/or the like. Such broadcasting methods and systems can generate a lot of undesired messages for a user, such as many alerts on a mobile device or many emails. Furthermore, such broadcasting methods and systems increase the usage of network bandwidth, especially if many sources are broadcasting messages to a large and wide audience. Moreover, messages are increasingly including enhanced content requiring the transmission of larger data files. In addition, broadcasting information often are not filtered on the supplier end and thus are not noticed immediately. Accordingly, this type of system puts the effort on the user to filter the messages and find the offers that meet the preferences and/or desires of the user. Furthermore, in this type of system, users have to check the validity of the date and/or store location. Broadcasting unfiltered messages creates information noise and often results in a situation where a user misses an interesting offer or the user's attention is detracted to a potentially irrelevant offer. It can also reduce the overall effectiveness of all targeting campaigns by numbing the effect of the event notification to the user. Moreover, traditional systems often extend event notifications for a long period of time, such as a few days or weeks. By broadcasting to distribute event notifications, suppliers cannot predict whether the user will notice them immediately. Such systems do not react to dynamic market changes and thus, cannot customize event notifications to custom tailor them to a smaller time window. Accordingly, supplier campaigns cannot therefore easily customize to specific geographical locations and/or narrow the event notification to a smaller time window.

Traditional systems currently available and used for finding offers and event notifications also fall short of dynamic event notification generation. Even though such systems provide categorized search of offers available in the web, they are based on web content analysis rather than based on information directly sourced or dynamically customized by suppliers. Thus, users often must verify the validity of found offers themselves and are able to find only publicly available offers not tailored for their unique user profile.

An additional limitation includes the complexity of identifying interesting and applicable offers at a particular time and/or a location, which can often discourage users from looking for them in the first place as the effort spent may not be worth the gain. This in turn limits the effectiveness of the targeting campaign as a whole. Users receiving a large number of offers become desensitized to offer content, treating the event notifications as spam. Another limitation is the overflow of multiple offers leading to overlooking an offer that the user would have otherwise use. Finding applicable offers that have already been expired and/or are too distant of a location can also further limit the reach of targeted marketing.

Another limitation to traditional systems is the inability to target specific users based on loyalty and/or a personal user profile. Existing loyalty programs provide appreciation to valued users, but suppliers cannot generate dedicated offers for each individual user. Instead, systems implement threshold-based groupings of users averaging offer benefits over particular groups that meet certain thresholds. This limits the generation of dynamic event notification generation custom tailored to individual users.

FIG. 1A illustrates an example of a traditional process of a database system for triggering event notifications based on updates to database records. The process in this traditional targeting campaign can be very inefficient. For example, traditional systems can broadcast event notifications (such as vouchers) 140. On the user flow side 102, the event notifications can be blocked 104 (e.g., filtered as spam), overlooked 106 (e.g., due to information noise), ignored 108 (e.g., when users do not bother actively searching for the vouchers), overdue 110 (e.g., when vouchers are noticed too late such as when expired), misplaced 112 (e.g., when the location for voucher use is too far), and/or equalized 114 (e.g., same for a group of users and not custom tailored).

A part of the reason for this is due to the fact that on the supplier flow 112, the event notifications are created based on static information that is imprecise for both user targeting and analysis. Furthermore, the static information includes a lot of overhead and requiring human analysis. On the supplier flow, users are categorized based on potential users 124 (e.g., all users interested in the event notifications), known users 126 (e.g., supplier knows the user's email address), predicted users 128 (e.g., user current need predicted by the supplier), and addressed users 130 (e.g., selected needs addressed by event notifications). The addressed users 130 are a subset of the predicted users 128, the predicted users 128 are a subset of known users 126, and the known users 126 are a subset of the potential users 124. In traditional campaigns, only the addressed users 130 are the ones that supplier is able to target, which is small subset of all potential users 124.

Figure 1B:
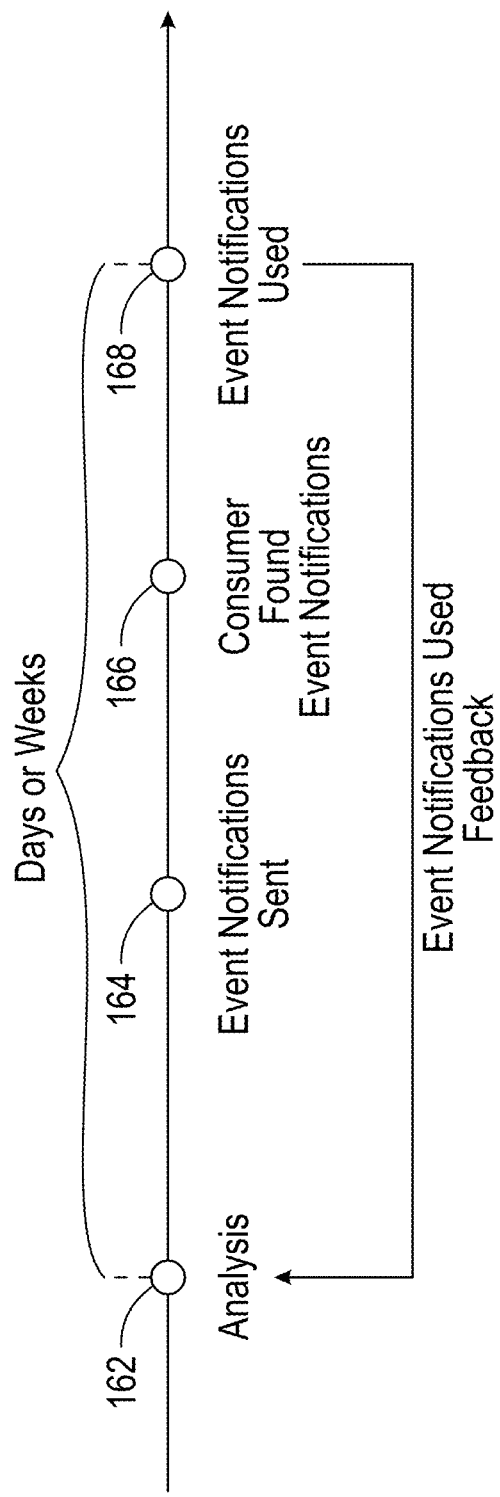
FIG. 1B illustrates a traditional approach to event notifications generation over days or weeks.

FIG. 1B illustrates a traditional approach to event notifications generation over days or weeks. Traditional systems can send the event notifications (such as vouchers) 164, the user can find the event notification 166, the event notification can be used 168, and feedback of whether the event notification is used can be analyzed 162 in order to determine future event notifications. As such, the feedback is generally limited to whether the event notification was used or not. It is not possible to determine specific user that used it and bind transaction to user profile. Furthermore, traditional systems generate event notifications that are valid for longer periods of time, such as days or weeks.

Systems and Methods for Dynamic Event Notification Generation

Figure 2A:
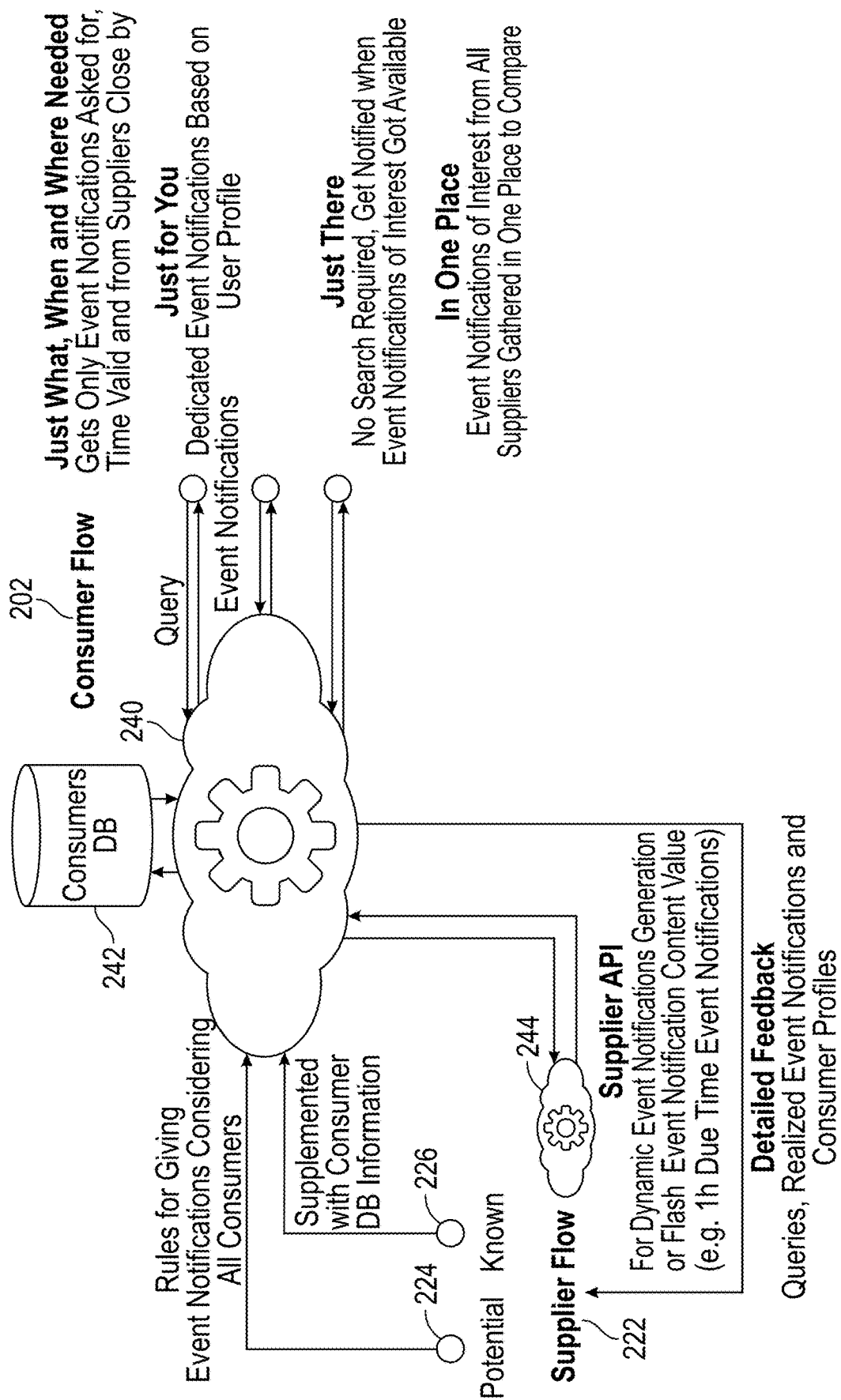
FIG. 2A illustrates an example of a database system according to some embodiments.

FIG. 2A illustrates an example of a database system according to some embodiments. The database system can include a dynamic event notification generation and distribution system and/or vice versa, according to some embodiments. Embodiments described herein provide a unified end-to-end system that is used by suppliers and users at same time. Users that are signed up in the database system can specify what kind of changes to database records (such as offers) they are interested in and query the database system to search for matching database records (such as matching offers). In some embodiments, the database system identifies user interest, and dynamically identifies triggers for certain types of changes to data records. For example, the database system identifies that the user is interested in car washes. The database system can identify data records for when the user last went to a carwash. Data records can include distances from a user's mobile device to a car wash. The database system can identify one or more triggers that correspond to changes to these data records, and generate event notifications (e.g., more discounts if distances are within 5 miles and conversion rate is over 50%). Suppliers instead of broadcasting predefined event notifications, can specify rules that describe how to generate an event notification based on user query.

In the user flow 202, database queries (or user queries) can include one or more of, but are not limited to:
  unique user ID
  time and date of the request
  geographic location and search radius or maximum drive distance/time
  list of categories and/or subcategories of products or services of interest
  list of specific products or services
  list of specific suppliers
  offer filters like minimum discount amount or discount percentage
  information about how query was triggered (manually, proximity based or periodic)

Additionally, user database(s) 242 can store detailed information about a user that can be obtained based on the unique user ID from the query and/or predicted by the database system. Examples include, but are not limited to:
  history of user queries
  history of realized event notifications with event notification information including time, locations, category, transaction price and savings achieved relation between user queries, corresponding event notification that was granted, same event notification realization, users to which the event notification was forwarded, user feedback provided after event notification realization each action can contain a time stamp and location list of verified loyalty program IDs associated with the user stored in the user profile calculated user global ranking based on user savings due to using event notifications and transaction price from used event notifications with rating contribution breakdowns or their combinations. Rankings can be based on:

per category/subcategory per supplier including supplier's percentage contribution in all user transactions time and/or location distribution list of user group membership credit card information for "pay with the event notification" transactions In the supplier flow 222, the supplier can create sets of rules (or triggers) and conditions that can determine whether the event notification should be granted and calculate a customized amount of benefits based on query information above and/or user profile information from in database. For example, the supplier can identify rules for giving event notifications considering a plurality of potential users 224. Advantageously, the supplier can reach potential users in response to user queries, even the users that would not be known to the supplier otherwise. As described above, this technical advantage can be realized based on the practical application of combined database of vendors and users. Furthermore, users associated with loyalty and/or personal user profiles can be reached. Data from social media and web based digital campaigns can also be analyzed to generate the rules for giving event notifications. The supplier can supplement the analysis with user database information for known users 226. Additionally, event notification generator can include, but are not limited to:

time and date list and supplier's premises locations fulfilling condition from user query The database system can provide each supplier a set of analysis data calculated based on user queries as well as based on granted and realized event notifications using the event notification generation and distribution system 240. Example of analysis output that can be provided include, but are not limited to:

list, value and full information of the event notifications granted from the beginning of the campaign including list of users that get them list, value and full information of the event notifications realized from the beginning of the campaign including list of users that used them geographic, time and category distribution of queries, granted and realized event notifications as well as ratings and reviews distance and time between event notification granting and realization statistics for costs, return on investment (ROI), campaign success rates customizable parameters calculated based on above In some embodiments, the analysis output data can be processed by the database system. The database system can determine a distribution of event notification content status changes over time and/or geographical location. The database system can perform statistical analysis on changes based on event notification values, by vendor, type of user, and/or the like to identify trends to generate models. The models can be applied to future queries to determine expected statistics, such as an expected conversion rate, which can be helpful for optimization of event notification values. A heat map/graph can be displayed over a map showing where event notification contents (e.g., event notification contents) were accepted, referred, and/or redeemed. A time distribution can show times between queries to acceptance, acceptance to redemption, queries to referrals, referrals to acceptances, acceptances to redemptions of referred event notification contents, and/or the like. Ratios of event notification contents can be generated such as accepted/redeemed based on event notification values, the vendor, the user characteristic, and/or the like.

In some embodiments, the statistical outputs can be inputted to a webAPI for event notification content benefit decisions done on the vendor server. Statistical outputs can be used as granting conditions for benefits. Examples of the granting conditions can include:

benefit of 75%—condition: user in top 10 loyal users last month (most loyalty points gathered)

benefit of 50%—condition: user in top 10 referrers last month (referred most of the event notification contents that were at least accepted)

benefit of 25%—condition: none

The suppliers can distribute the dynamic event notifications via a supplier API 244. Event notification generator can be adapted automatically based on the data from campaign analysis data. For example, supplier can limit number of granted event notifications, adjust discount value based on current distance users were willing to travel, increase event notification benefits during weekdays with less number of queries, and/or the like.

Figure 2B:
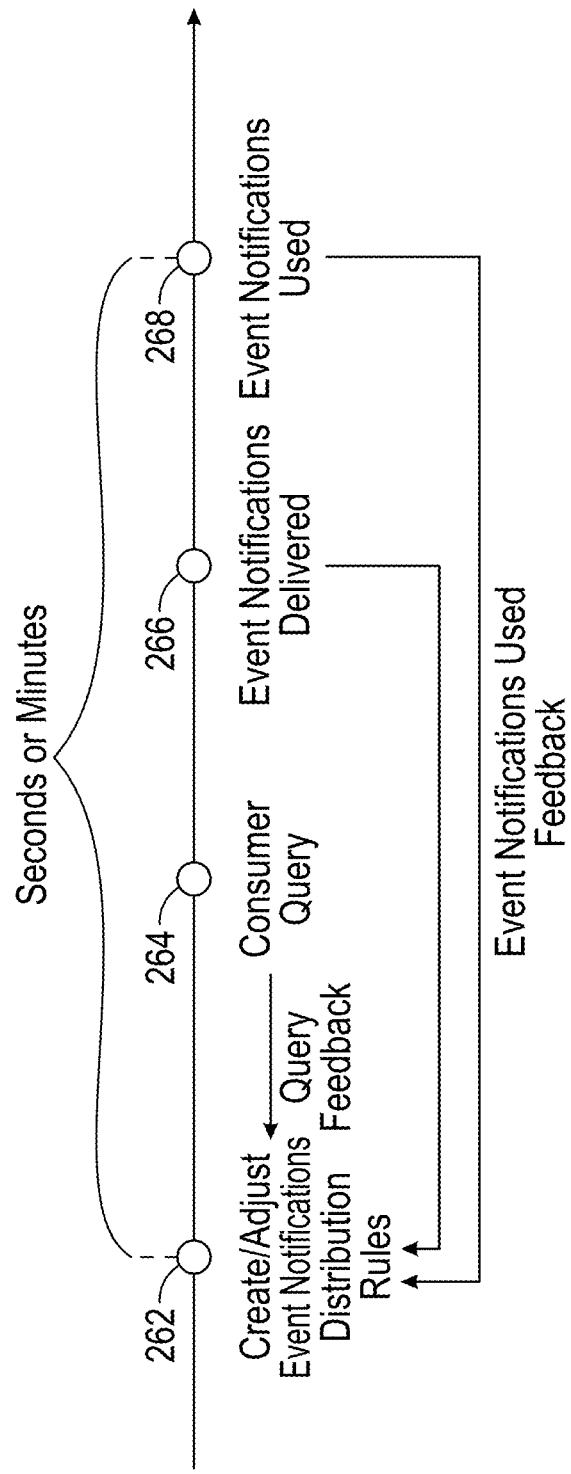
FIG. 2B illustrates event notification generation over a shorter time period according to some embodiments.

FIG. 2B illustrates event notification generation and lifetime cycle over a shorter time period such as, e.g., seconds or minutes, or in substantially in real time, according to some embodiments. The database system can receive a user query 264. The event notification can be generated and/or distributed 266, and the event notification can be used by the user 268. The database system can receive feedback as to whether the event notification was used and also receive feedback related to the user query 264. As such, the event notifications can be made to pertain to the immediate circumstances of the user, such as the user's current location and/or activity. This allows for a much faster reaction to market changes and enables the generation of dynamic event notifications and/or flash-event notification values (e.g., event notifications that expire in one hour). For example, the database system can generate event notifications based on sale results in the last hour.

In some embodiments, a specific event notification value with a short expiration date and benefits can be generated including granting conditions based on time or location, such as "time til event notification value end" or "distance to query." In some embodiments, user location is tracked and such an event notification value is sent based on a condition, such as a closeness in location.

In some embodiments, the event notification content characteristic, such as the benefit, can be changed based on the location or the time of event notification value expiration. For example, the closer a user is to a vendor site, the event notification content's discount amount and/or percentage can be decreased.

In some embodiments, the event notification contents are created dynamically based on a user characteristic. For example, the mobile device of a user can be at a certain distance threshold from a content item provider. If the user profile matches rules (e.g., rules set by the content item provider), then the database system can dynamically generate an event notification content for the user, even without a user query. If the user is driving within a 1 mile radius of a car wash and the profile indicates that the user washes his or her car every month, then the database system can dynamically provide an event notification content for a carwash.

In some embodiments, the database system can dynamically create reminders. The database system can create reminders based on an event notification content characteristic, such as when the event notification contents are close to expiring (e.g., send higher discounted event notification contents to ensure all seat tickets are sold for an event). The database system can create reminders based on user characteristics, such as a user preference or location (e.g., event notification content reminder when the user is very close to a location of a supplier). The database system can create reminders based on other characteristics, such as a time of day, a day of the week, the current weather, and/or the like (e.g., lunch event notification content when the user is close to a particular restaurant). The database system can create reminders based on supplier characteristics, such as a conversion rate of the user with the supplier for an event notification content (e.g., send a reminder when the user has visited the supplier frequently over the past few months).

In some embodiments, the users have the option to add vendors as their favorites. Vendors can then reach out with their event notification contents. Vendors can in return provide them with special offers during their query, providing them with additional bonuses for adding them to their favorite lists.

Database Concept Diagram with Information Flow

Figure 3:
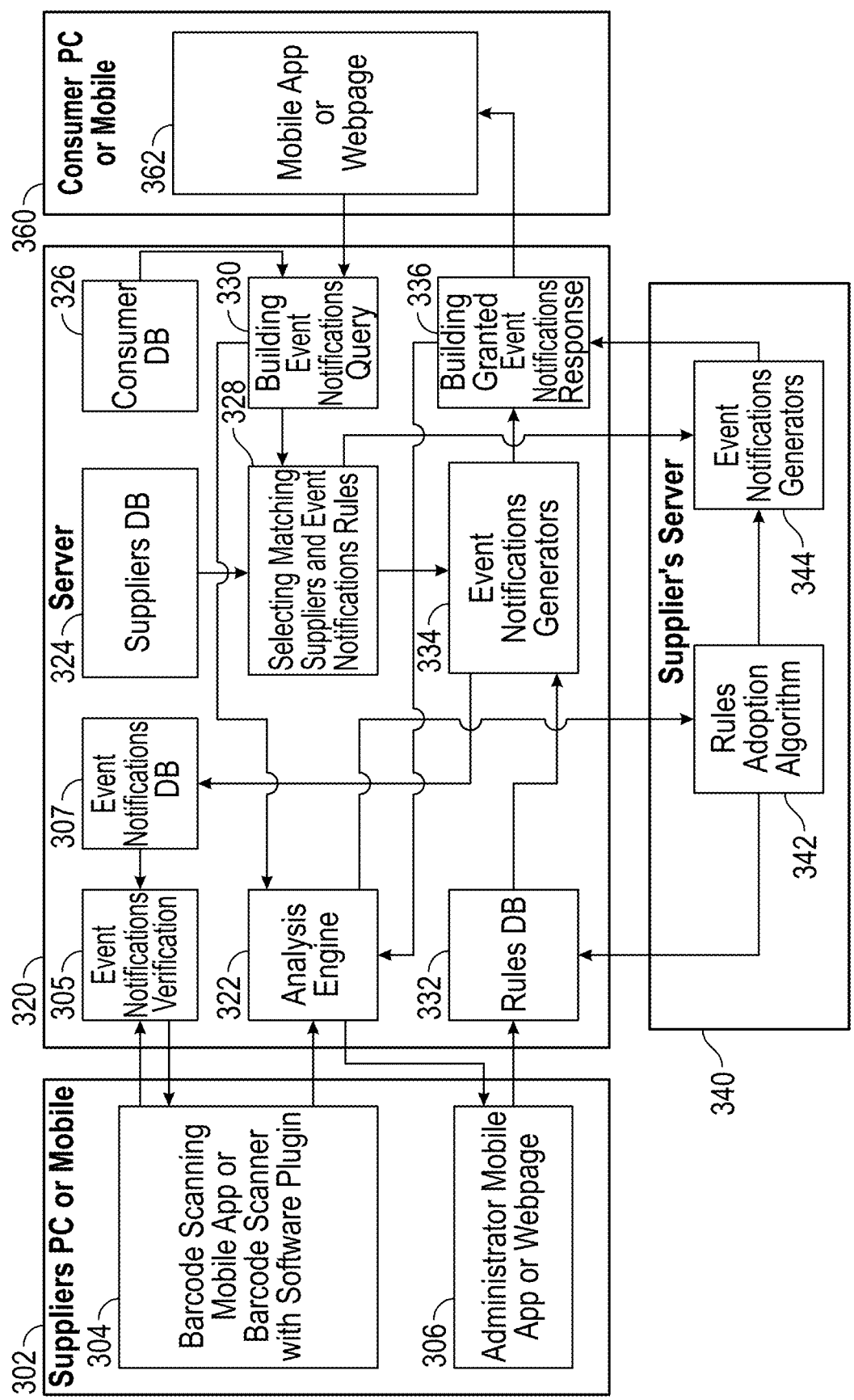
FIG. 3 illustrates an example dynamic event notification generation and distribution diagram with information flow according to some embodiments.

FIG. 3 illustrates an example database system diagram with information flow according to some embodiments. In some embodiments, the supplier's personal computer or mobile device 302 can provide a barcode scanning mobile application or barcode scanner with software plugin 304. The supplier's personal computer or mobile device 302 can include an administrator mobile application or web page.

In some embodiments, the database system can include a dynamic event notification generation and distribution server 320. The supplier's personal computer or mobile device 302 interface with the dynamic computer generation and distribution server 320. The dynamic computer generation and distribution server 320 can include an analysis engine 322 that receives realized event notifications and purchase transaction information from the supplier's personal computer or mobile device 302. The analysis engine 304 can also receive input from the building event notification query 330 that receives information on the user query and/or the building granted event notifications response 336 that determines the event notifications granted to the user. The analysis engine 322 can send the targeting campaign analysis information to the administration mobile application or webpage 306.

In some embodiments, the event notification generator 334 can generate event notifications based on user queries and store in event notifications database 307. The event notifications database 307 can store a plurality of event notifications, such as coupons or vouchers. When supplier scan granted with event notification barcode scanning mobile application or barcode scanner with software plugin 304, event notification information can be sent to event notification verification 305 for verification. Verification result can be sent from event notification verification 305 to barcode scanning mobile application or barcode scanner with software plugin 304 providing information of event notification validity. Barcode scanning mobile application or barcode scanner with software plugin 304 can send to analysis engine 322 information about event notification realization and purchase transaction details.

The database system can provide a downloadable electronic file for the vendor device that enables processing of a QR code provided by a user. The user can present the QR code to the vendor point of sale device, such as a mobile device or a tablet. The vendor device can scan the QR code and request the database system for verification of the event notification content. The vendor can apply the discount from the vendor's point of sale and confirm that the event notification content was redeemed with the database system. The electronic file can be an extension plugin for a vendor counter software such that the database system QR codes can be scanned using the vendor's counter scanner directly.

The downloadable electronic file for the vendor can allow for direct payment using the QR code. The database system can retrieve financial information of the user, such as a user's credit card, and the credit card information can be sent to the vendor without the vendor having access to that information. Advantageously, the technical problem of personal information security in today's digital age is improved by the practical application of sending the credit card information directly with the vendor device, and without the vendor being able to see the credit card information. Digital identify theft has become an increasing technical issue with credit card scanning technology being able to steal credit card information. However with this system, the database system can automatically facilitate the transaction without the use of a credit card scanner at the point of sale system for the vendor.

The downloadable electronic file can allow for direct payment automatically, reducing the number of graphical user interfaces needed for a typical payment purchase. In traditional payment procedures, a credit card is swiped on a vendor point of sale system, the system verifies the credit card with the bank, an employee of the vendor confirms the verification, the point of sale system displays the amount, the user verifies the amount and signs the point of sale system to complete the transaction. However, the downloadable electronic file can communicate with a database system, where the database system has already verified the credit card information of the user. Advantageously, the downloadable electronic file provides a technical solution to a technical problem by automatically receiving verification of the credit card and completing the transaction with a simple click of the user verifying the transaction. For example, if the vendor begins a transaction with the user, the vendor system can automatically notify the database system, the database system can automatically send an alert to the user device, the user device can select a button to accept the transaction, the user device can automatically transmit the selection to the database system, and the database system can automatically send the credit card information to the vendor device to complete the transaction. Thus, the technical problem of navigating through numerous graphical user interfaces to complete a payment purchase is solved by the practical application of automatically receiving verification of a credit card and completing a transaction.

In some embodiments, the analysis engine 322 can send the analysis of the targeting campaign to a supplier server 340 that includes a rules adoption algorithm 342 and/or an event notification generator block 344. The rules adoption algorithm 342 can send the event notification generation rules to a rules database 332. The rules database 332 (or the triggers database) can also be directly updated from supplier's personal computer and/or mobile device 302 via the administrator mobile application or webpage 306. The triggers stored in the triggers database 332 can be used to determine when and/or what event notifications are to be sent based on underlying factors, such as information in data records.

In some embodiments, the rules database 332 can be accessed by event notification generator module 334. The event notification generator module 334 can generate event notifications based on the received rules, supplier's information from suppliers database 324 and/or user's event notification query built by building event notification query module 330. The event notification can then be transmitted to the building granted event notifications response block 336, which transmits the event notifications to a mobile application and/or webpage 362 of a user personal computer and/or mobile device 360. In some embodiments, the event notifications can be displayed on a user device 360 without the downloadable file and/or corresponding application being launched. The user can receive such event notifications as a notification, such as a text message or a pop-up, while the application is in an unlaunched state. The user can then select the notification to launch the application, improving display interface technology by allowing a user to more quickly access event notification-related information stored in the application and/or a corresponding database. Such a notification with an unlaunched application improves the technical problem of the user having to open the application and navigate across several interfaces of the application to identify related event notifications.

In some embodiments, the mobile application and/or webpage 362 of a user personal computer and/or mobile device 360 can transmit a query from a user to a building event notification query 330 that receives query information and user information from a user database 326, or a data records database. The user database can store a plurality of data records that correspond to the user. The data records can include times when a user visited a vendor, loyalty related points, current and/or previous geographical locations, distances to other locations such as a vendor, referrals sent or received to other users, and/or the like. The dynamic computer generation and distribution server 320 can include a selecting matching supplier and event notification rules block 328 that receives query information from the building event notification query block 330 and/or supplier information from a supplier's database 324. The selecting matching suppliers and event notifications rules 328 can transmit the matching information to the event notification generator 334 to generate custom rules and/or event notifications for the selected user.

Supplier Web API Extension

In some embodiments, suppliers can use an algorithm running on their own server in order to calculate event notification discount and/or change event notification granting rules. Supplier's server system can connect to the database system using predefined web APIs. Suppliers can configure their system to route user queries fulfilling specific conditions via web API to their servers, where event notification to be granted will be calculated. The event notification data can be routed back to the database system and send as a response to the user query.

In some embodiments, suppliers can specify conditions using campaign analysis, which can trigger web API requests to supplier servers that would recalculate and update set of event notifications granting rules. In some embodiments, suppliers can add and/or modify rules via the API. The suppliers can automate the rules process based on triggers from the database system. The triggers can be generated based on analysis of parameter thresholds that can be set up before the suppliers connect to the database system.

In some embodiments, with web API extensions, suppliers can have more flexibility in defining their rules for event notifications as well as use their databases containing user information to supplement the system capabilities and further enhance their campaigns. Web API extensions enable suppliers to implement own proprietary and most sophisticated algorithms on their servers that would be requiring lots of compute power. For example, suppliers can use their own loyalty program database to grant better valued event notifications to loyal users. These users can be identified using loyalty number forwarded on the API.

Suppliers and Product Reviews

In some embodiments, upon verified realization of the event notification, users can be requested for feedback about the supplier. Optionally user can also write a review or/and fill out questionnaire. As reviews will be provided only by users who really used the event notification and transaction is verified by supplier, it would be very difficult to provide false reviews.

In some embodiments, in case the event notification is product specific, users can be requested to review specific product in similar way as for supplier rating. Again, only users who used event notification to purchase product can be able to provide feedback.

In some embodiments, each review can be rated by other users as helpful. User review that gathered multiple ratings as helpful would positively impact users rating. For this reason the user feedback is encouraged.

User Social Network

Social media and web based digital campaigns are becoming an effective and cost-effective method to reach potential and current users. The digital campaigns also enable automated analysis of feedback and much faster reaction time to changes on the market. Automated, algorithm-based systems can dynamically customize offers to users, automatically target each user separately customizing the offer based on time (e.g., time between event notifications, time of the day, time since similar service and/or good purchased, and/or the like), location (e.g., distance from a merchant, conversion rates for certain distances from a location, a determination of a user's means of transportation, and/or the like), and/or user profile (e.g., a user's preferences to goods and/or services, user habits, what was queried at a certain location or time, a predefined shopping cart of desired goods and/or services, a search query, what and where they referred, accepted, queried, redeemed, and/or reviewed event notification contents, and/or the like) to deliver dedicated offers providing a powerful tool for modern day marketing.

In some embodiments, users signed up in the system can reach out to each other and add other users to list of friends. Added a user can confirm being a friend with the one that initiated it. Users can invite new users via email or social media. Such invitations may contain forwarded event notification data to encourage new users to join.

In some embodiments, the user and vendors can both be a part of the same social network. An open, shared/common, public network can be used by vendors as their customer database. A user of the network can invite a friend to the network and/or connect one friend to another. The connections can include certain actions, such as a user referring event notification contents to friends only, or vendors broadcasting event notification contents to user-friends only. The vendors can get indirect access to all users, such as friends of friends.

User Public Groups

In some embodiments, each user can create publicly visible and/or private groups. Groups can be ranked based on its members rating and can be targeted by suppliers for special offers.

In some embodiments, suppliers can create user groups. User group event notification grant can be controlled by predefined rules (e.g., group ranking) as well as from web API. Suppliers can create several groups to which event notifications with different level of benefits can be delivered.

Registering Products

The database system may be configured to create special accounts for Producers. Producers can register their products in database under unique ID. The ID would be generated and assigned by the system. Alternatively, product can be registered using UPC (Universal Product Code) it is registered with. Along with ID each product need to be provided with a brand, name and to be associated with specific category. For each category additional information might be entered. Product description, ingredients, technical parameters, usage instructions, dietary information and any other information normally found on product labels or package can be entered and associated with registered product. System will provide ready to fill up forms with most common parameters of products belonging to specific category. For example: screen size, power consumption, refresh rate or 3d support for products from TV category.

Registered products database would be available for all parties using the system. Users can search for registered products to query for any event notifications or discounts associated with them or categories they belong to. Producers and Suppliers can use the products from database to create rules for event notifications generation.

Producers can print product unique ID on its package or mark the product with its unique ID using other technology. In case of products registered under UPC code the existing barcode or marking can be reused. Otherwise new unique ID assigned by system during registration in form of a barcode, QR-code, NFC or any other technology for in-store product identification can be printed or placed on the product or its package.

Users are able to scan product unique ID using application to use it in a query for event notifications, discounts or special offers. Offers for specific product or for category or subcategory it belongs to will be returned. As such, users may receive or gather discounts (e.g., instantaneously) while in the store.

Users can also use scanned product's unique ID to check information Producer placed in the system. Users can create set of filters for products parameters to verify if product is fulfilling their needs. For example, Users can create allergens filter for grocery products in order to be notified in case scanned product contain any of them on its ingredients list.

Products information can also be used in user queries. For example, user can query for event notifications for TVs with specific feature and screen size.

Users that realized event notifications for specific products will be requested for a rating and/or review of the product. This way reviews would come only from Users that purchased the product.

Suppliers can also register their services in similar way. For example, restaurant can register specific dish under unique product ID and use it in form of QR-code in their menu. Users can get information about its ingredients, verify allergens, check if it fulfills their diet constrains, see picture of the dish or to query for a discount. Each user account in the system can be a user, supplier and producer at the same time.

Blockchain

In some embodiments, granting and realizing event notifications can include a transaction between specific Supplier and User. Both parties, transaction details, rules and conditions of granting as well as realization of event notification and feedback to system can be connected and recorded. Both parties can be able to verify the transaction validity and to make sure event notification is unique. Blockchain technology can be used to manage and validate event notification transactions.

Example System Flow Diagram for Database System

Figure 4:
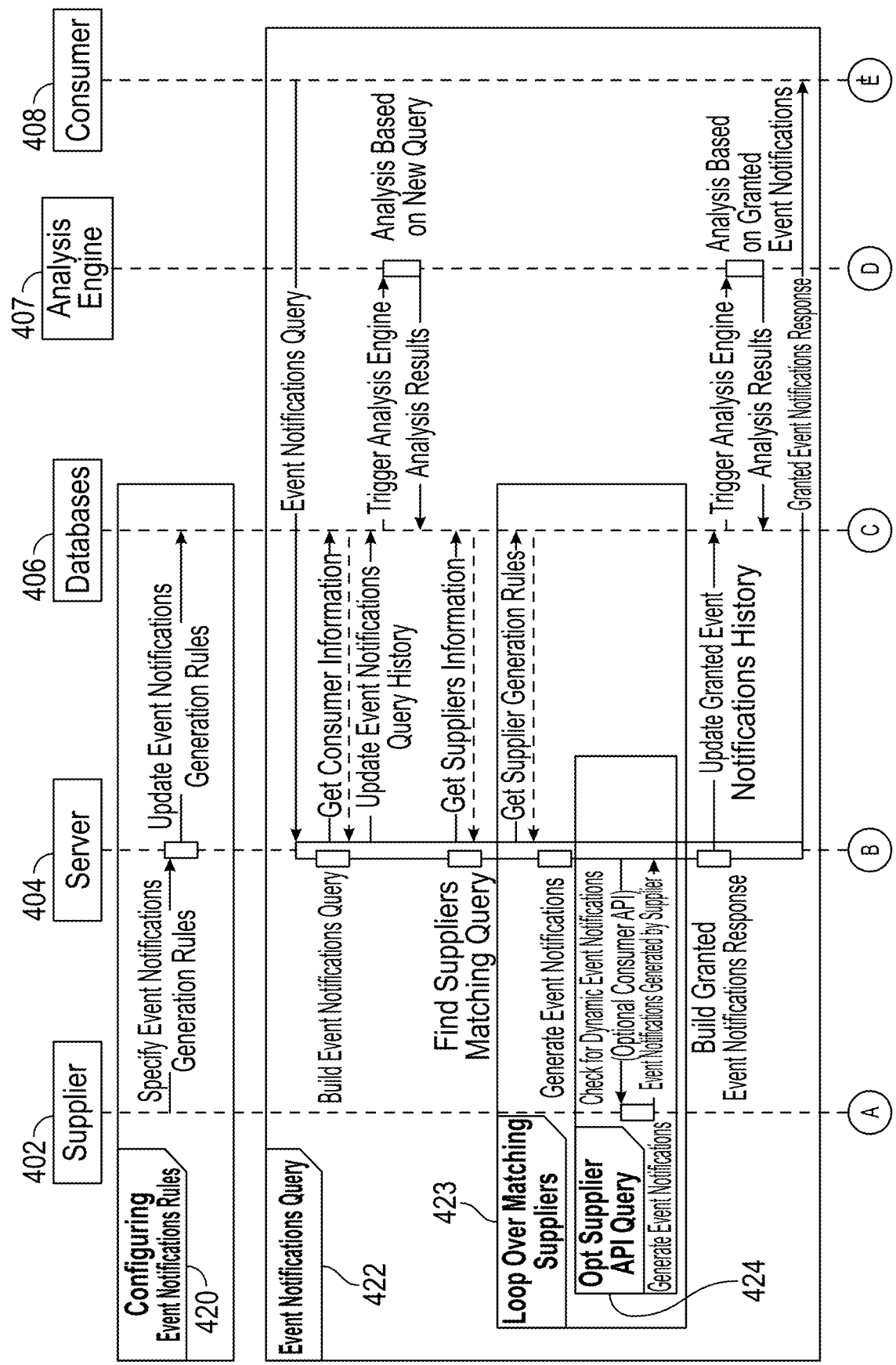
FIG. 4 illustrates an example of a flow diagram for database system according to some embodiments.
Figure 4:
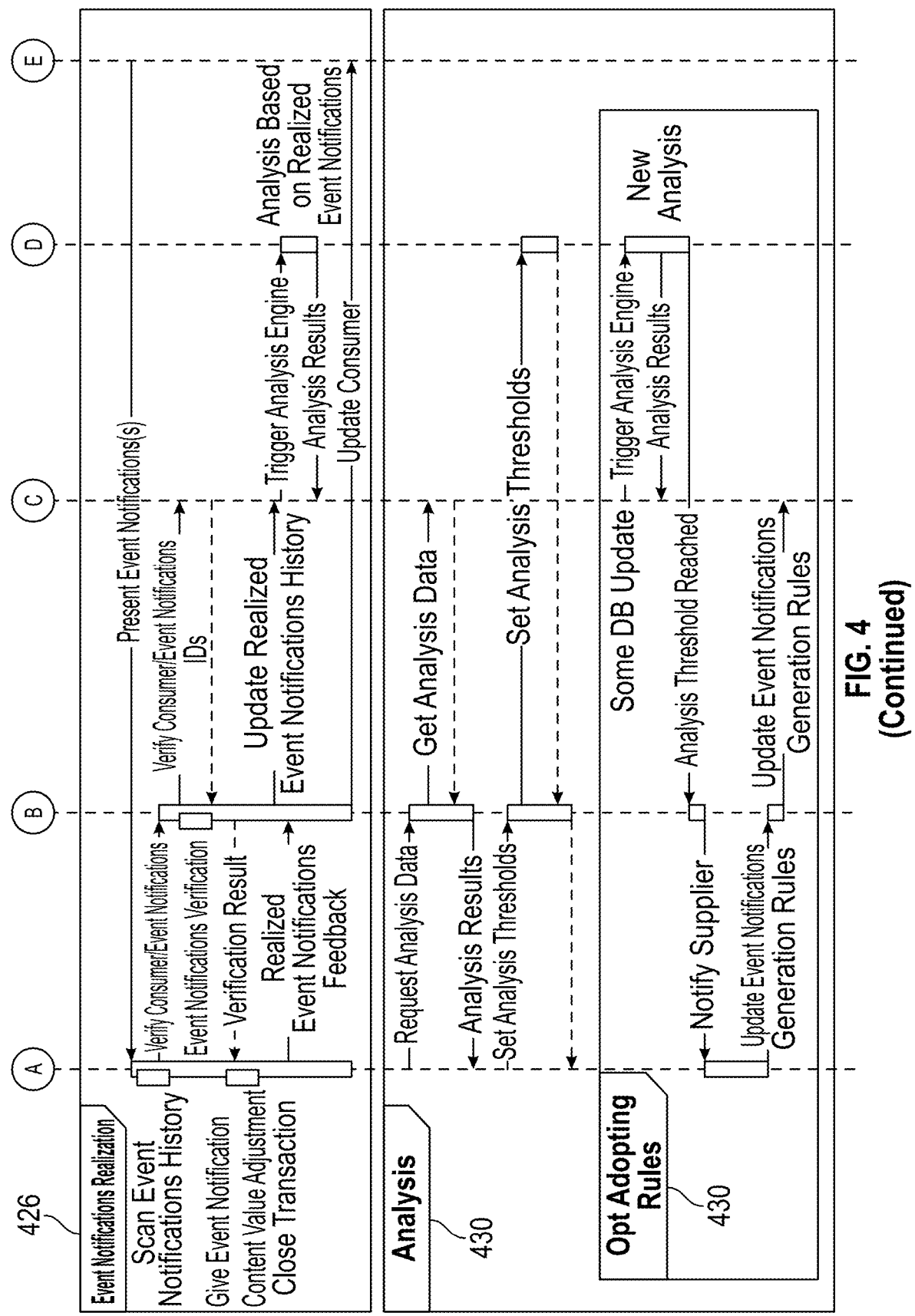

FIG. 4 illustrates an example of a flow diagram for database system according to some embodiments. In some embodiments, the supplier 402, the server for the database system 404, the database for the database system 406, the analysis engine 407, and/or the user 408 transmit data to generate and/or distribute the dynamic event notification.

In some embodiments, the database system can configure event notification rules 420. The supplier 402 can set event notification generator and send the rules to the server 404. The server can send the rules to a rules database 406 to update the database 406.

In some embodiments, the database system can facilitate event notification queries 422. The user 408 can send a query for an event notification to the server 404 of the database system. The server can update the event notification query history with the database 406. The database 406 can trigger the analysis engine to analyze the query and send the analysis results back to the database 406. The servers 404 can then find the suppliers matching the query based on information from the database.

In some embodiments, the server can request and receive supplier generation rules from the database 407 in block 423.

The server 404 can retrieve user information from the database 406 and generate event notifications based on the user information and/or the query information. The server 404 can grant the event notifications to the user 408 and update the database 406 of the granted event notification. Updating the database 406 can initiate the analysis engine 408 to analyze the granted event notification and send the results back to the database 406. The server 404 can then grant an event notifications response to the user 408.

In some embodiments, the server of the database system can communicate with the supplier 402 via a supplier API at block 424. For example, the supplier can initiate a call for information. The server 404 of the database system can check for dynamic event notifications from the supplier.

In some embodiments, the database system can track event notification realization at block 426. The user 408 can present an event notification to the supplier 402. The supplier 402 can scan the event notification (e.g., via a barcode) and ask for verification of the user and/or event notification. The user and/or event notification IDs requested for verification can be checked against information from the database 406 and/or the verification results can be sent back to the supplier 402. The server of the database system can provide a discount and/or close a transaction for a supplier 402. The supplier 402 can realize the event notification, and the database system can notify the server 404 that the event notification was realized. The database 406 can be updated with the realized event notification information. Updating the database 406 can trigger the analysis engine 407 to analyze the realized event notification and send the analyzed results back to the database. Then, the server 404 can update the user 408 about successful event notification realization.

In some embodiments, the server of the database system may be configured to gather targeting campaign analysis data. In some embodiments, the supplier 402 can request analysis data from a server 404 of the database system. The server 404 of the database system can request information from the database 406. The database 406 can return data that the server of the database system 404 can provide to supplier 402 as a result. The supplier 402 can set analysis thresholds for the analysis engine 407. When new analysis results are available, analysis engine can issue analysis trigger notification to server 404 in case analysis thresholds are reached. Notification about reaching predefined thresholds is then forwarded from server 404 to supplier 402. Supplier can use analysis threshold notifications to trigger own algorithms calculating modifications of event notification generation rules and send them as an update to the server 404, which in turn update them in database 406.

Example System Flow Diagram for User Query for Event notification contents

FIGS. 5A-5D illustrate examples of flow diagrams for user query for event notification contents according to some embodiments. In some embodiments, the database system can include a server 504 that can communicate with a user 502, a database 506, and/or a vendor 508 in order to respond to a user query for event notification contents. The database system can include a database 506 that includes one or more databases, such as the databases described in FIG. 7. The database system can include an electronic file installed on the user system 502 (e.g., a mobile application for the user device). The database system can include an electronic file installed on the vendor system 508 (e.g., an electronic application for the vendor point of sale device).

Figure 5A:
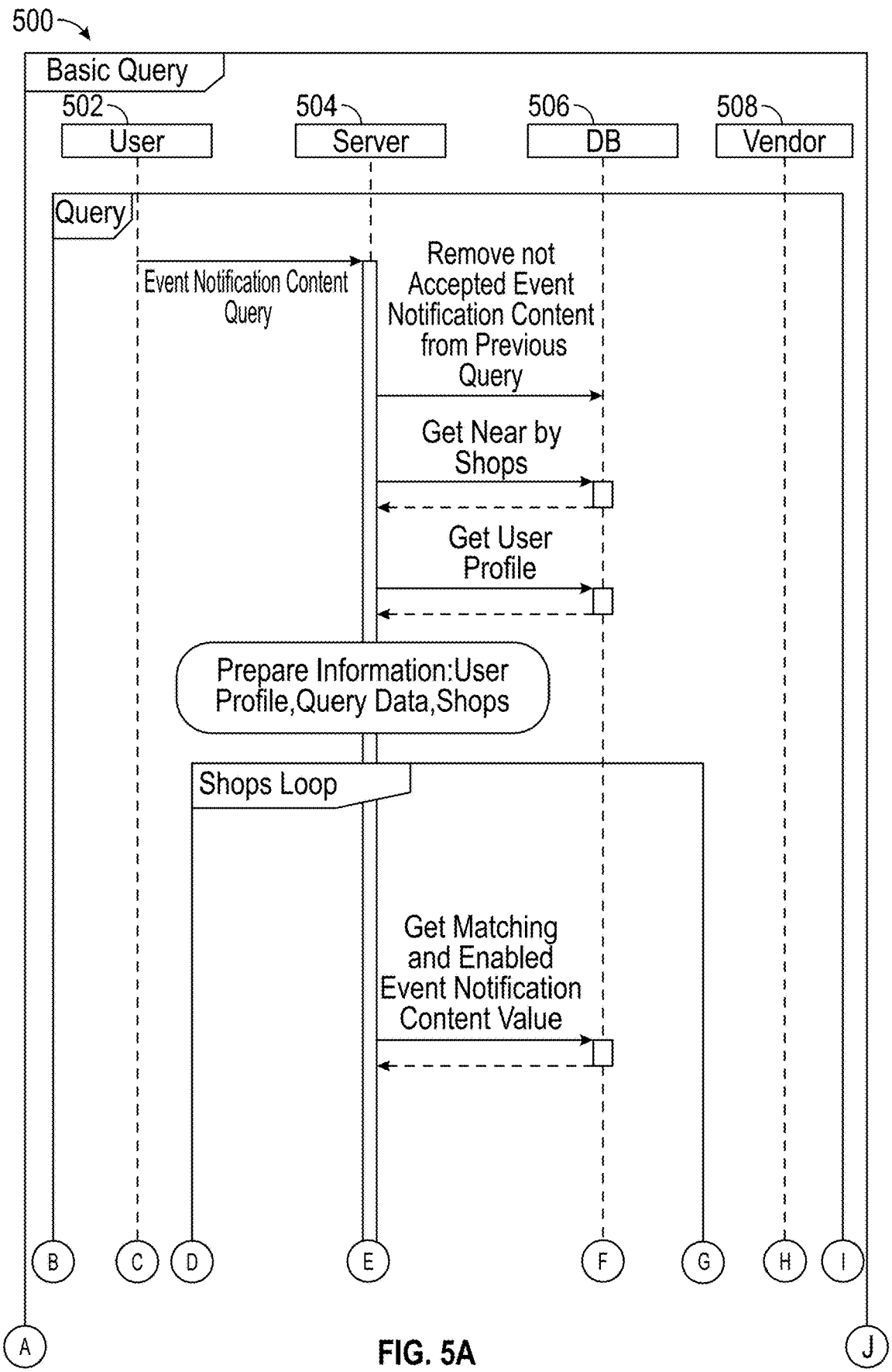
FIG. 5A illustrates an example of a query and query response according to some embodiments.
Figure 5A:
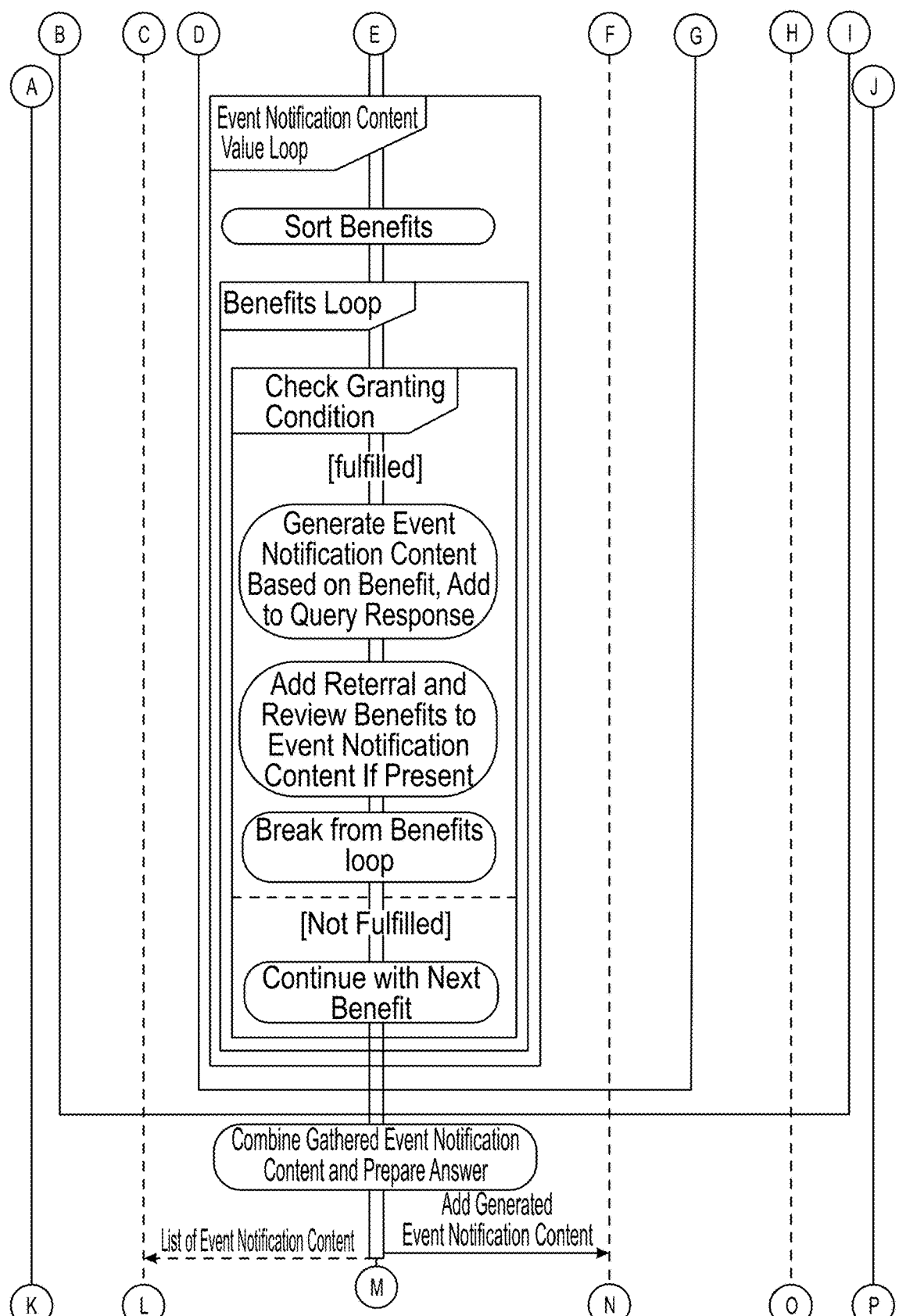

FIG. 5A illustrates an example 500 of a query and query response according to some embodiments. In some embodiments, the user 502 can send an event notification content query to the server 504. The event notification content query can include a specific query request. The event notification content request can include a desired category, such as car wash. The event notification content query can include location information, a time frame (e.g., currently open event notification content), a certain benefit (e.g., over 50% discounts), and/or the like.

In some embodiments, the server 504 can identify event notification contents that were previously not accepted by the user 502. Then the server 504 can indicate to the database 506 to remove not accepted event notification contents from previous queries. Advantageously, more relevant event notification contents can be provided to the user.

In some embodiments, the server 504 can request nearby shop information from the database 506, and the database 506 can transmit the nearby shop data (e.g., content provider data) back to the server 504. For example, the server 504 can request shops within a certain threshold radius of the geolocation of the user 502. The server 504 can request a user profile for the user 502 from the database 506, and the database 506 can transmit the user profile back to the server 504.

In some embodiments, the server 504 begins a shops loops where the server 504 requests matching and enabled event notification values from the database 506. The server 504 can request matching rules of the vendors 508 that provide the event notification contents and apply the matching rules to the retrieved user profile. Then, the server 504 can identify event notification contents that meet the matching rules of the vendor. For example, the vendor 508 may only want customers that wash their car at least once a month, or a customer with an income over $50,000. The server 504 can identify whether the user meets these criteria and pull the corresponding event notification contents for the user. The server 504 can also identify whether an event notification value is enabled, such as not yet expired.

In some embodiments, the server 504 begins an event notification value loop. The server 504 sorts the benefits of the event notification contents, begins a benefits loop, and checks on whether the granting condition has been met. For example, the benefits can be sorted based on a discount amount, a discount type, a granting condition, and/or the like. During the user query, the granting conditions of the benefits are checked starting with the benefit of the highest discount amount to the benefits with lower discount amounts. An example of a granting condition includes a query based granting condition, such as a user's distance to a vendor, a category searched, a desired benefit type, and/or the like. Another example of a granting condition is based on a user profile, such as a number of loyalty points within a time period, history of user queries, time of last visit and/or transaction, whether event notification contents were queried, referred, realized, and/or the like. A third example of a granting condition includes statistics, such as current event notification value statistics, sales benefits, ROI targets, a number of remaining event notification contents (e.g., remaining seats to a show), where in some embodiments, data can be collected from the vendor 508.

In some embodiments, the server 504 can generate a list of event notification contents for each matching event notification value based on the benefit and add the event notification content to the query response.

In some embodiments, the server 504 can add referral and review benefits to the event notification content if present. For example, if the user 502 was matched to the event notification content by another user and/or if the user 502 left a review for the corresponding vendor 508, the server 504 can add additional benefits to the matched event notification content. Then, the server 504 can break from the benefits loop and continue with the next benefit.

In some embodiments, after the event notification contents have been assessed, the server 504 can combine the gathered event notification contents and prepare an answer in the form of a query response. The server 504 can send the generated event notification contents to the database 506 to store the event notification contents that were sent to the user 502, and the server 504 can send the generated event notification contents to the user 502 in the form of a query response.

Figure 5B:
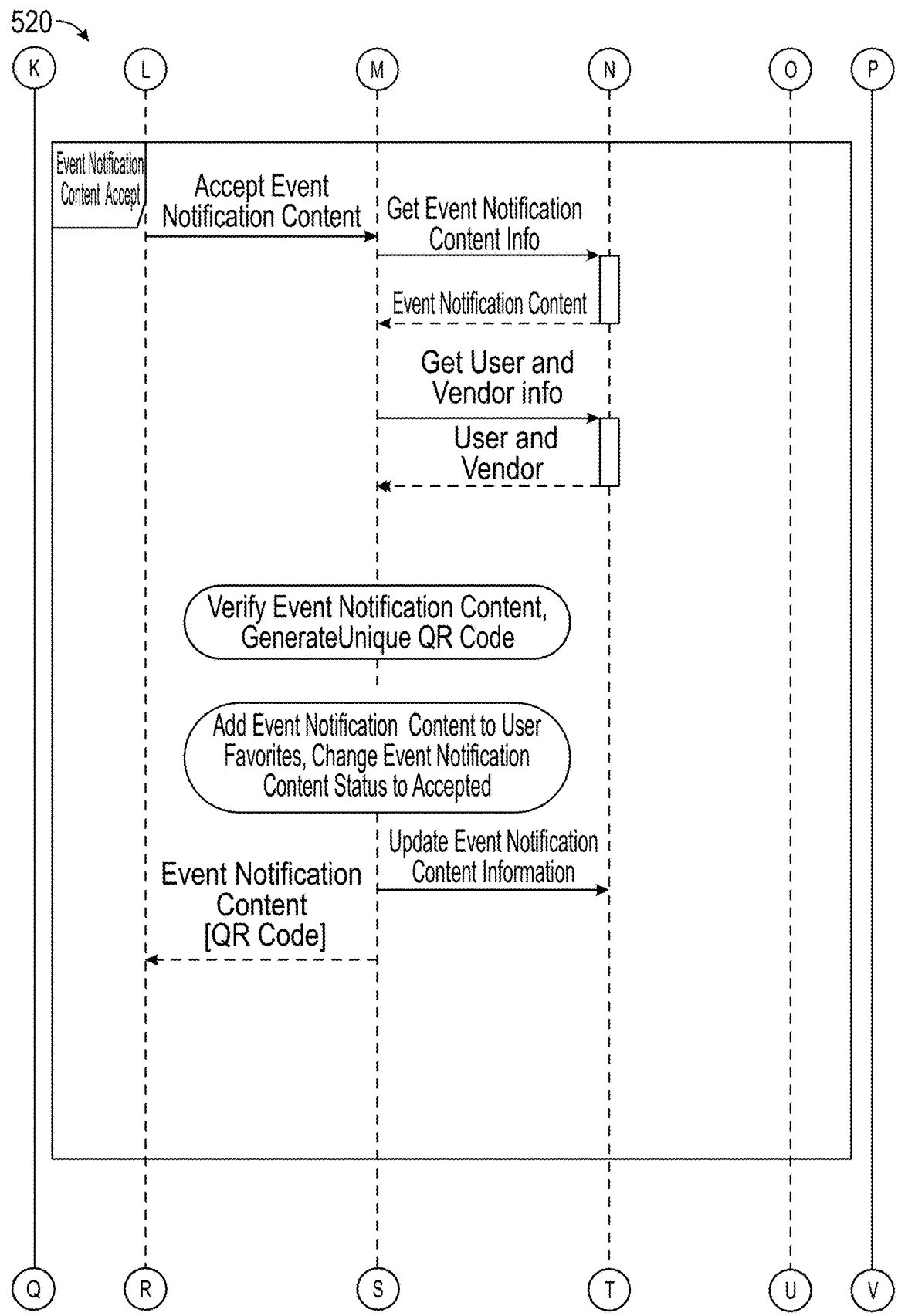
FIG. 5B illustrates an example of a QR code generation for the event notification content according to some embodiments.

FIG. 5B illustrates an example 520 of a QR code generation for the event notification content according to some embodiments. In some embodiments, the user 502 can indicate to the server 504 of accepting an event notification content of interest. The server 504 can request and receive event notification content information from the database 506. The server 504 can then verify the event notification content, and generate a unique QR code for the event notification content. In some embodiments, the server 504 can add the QR code to the user favorites and/or change the event notification content status to accepted or transmitted.

In some embodiments, the server 504 can send an update to the database 506, such as the corresponding QR code. The server 504 can send the QR code corresponding to the event notification content to the user 502.

Figure 5C:
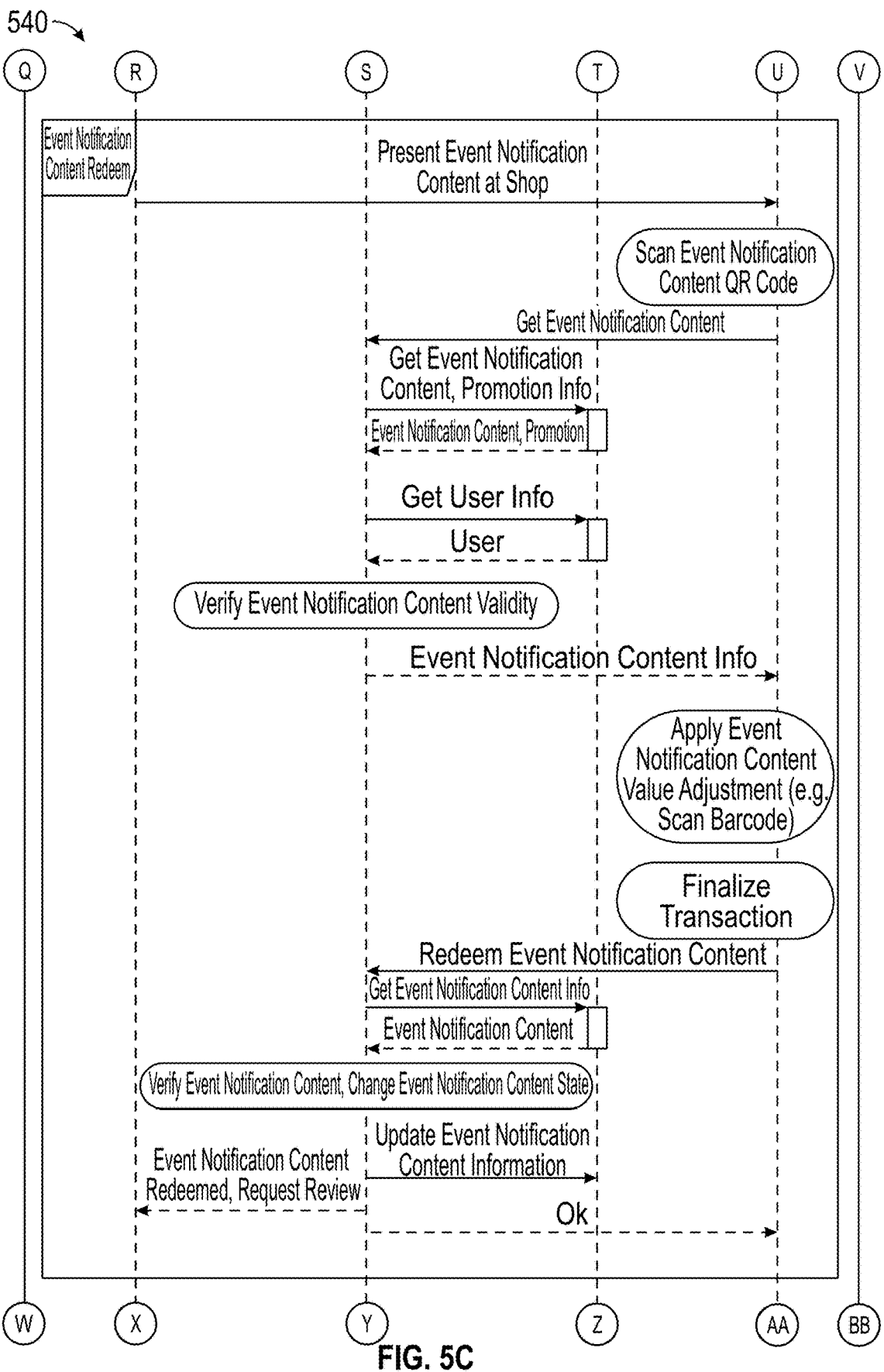
FIG. 5C illustrates an example of redeeming an event notification content using the QR code according to some embodiments.

FIG. 5C illustrates an example 540 of redeeming an event notification content using the QR code according to some embodiments. In some embodiments, the user 502 can present the QE code directly to the vendor 508. The vendor 508 can scan the QR code from the user 502 computing device. Then, the vendor 508 can request to retrieve the event notification content from the server 504.

In some embodiments, the server 504 can request and receive the event notification content and event notification value information from the database 506. The server 504 can request and receive corresponding user information from the database 506. The server can verify the event notification content validity, such as verifying that the event notification content corresponds to the event notification value, benefit, user, vendor, and/or the like.

In some embodiments, the server 504 transmits the event notification content information to the vendor 508 after verification, and the vendor 508 applies the event notification content discount (e.g., by scanning the barcode) and finalizes the transaction with the user 502. The vendor can indicate that the event notification content was redeemed to the sever 504. The server 504 can request and receive the event notification content information from the database 506, can verify the event notification content and change the state of the event notification content as redeemed, and send the updated event notification content information back to the database 506. Moreover, the server 504 can send a confirmation that the event notification content was redeemed to the user 502 and to the vendor 508.

Figure 5D:
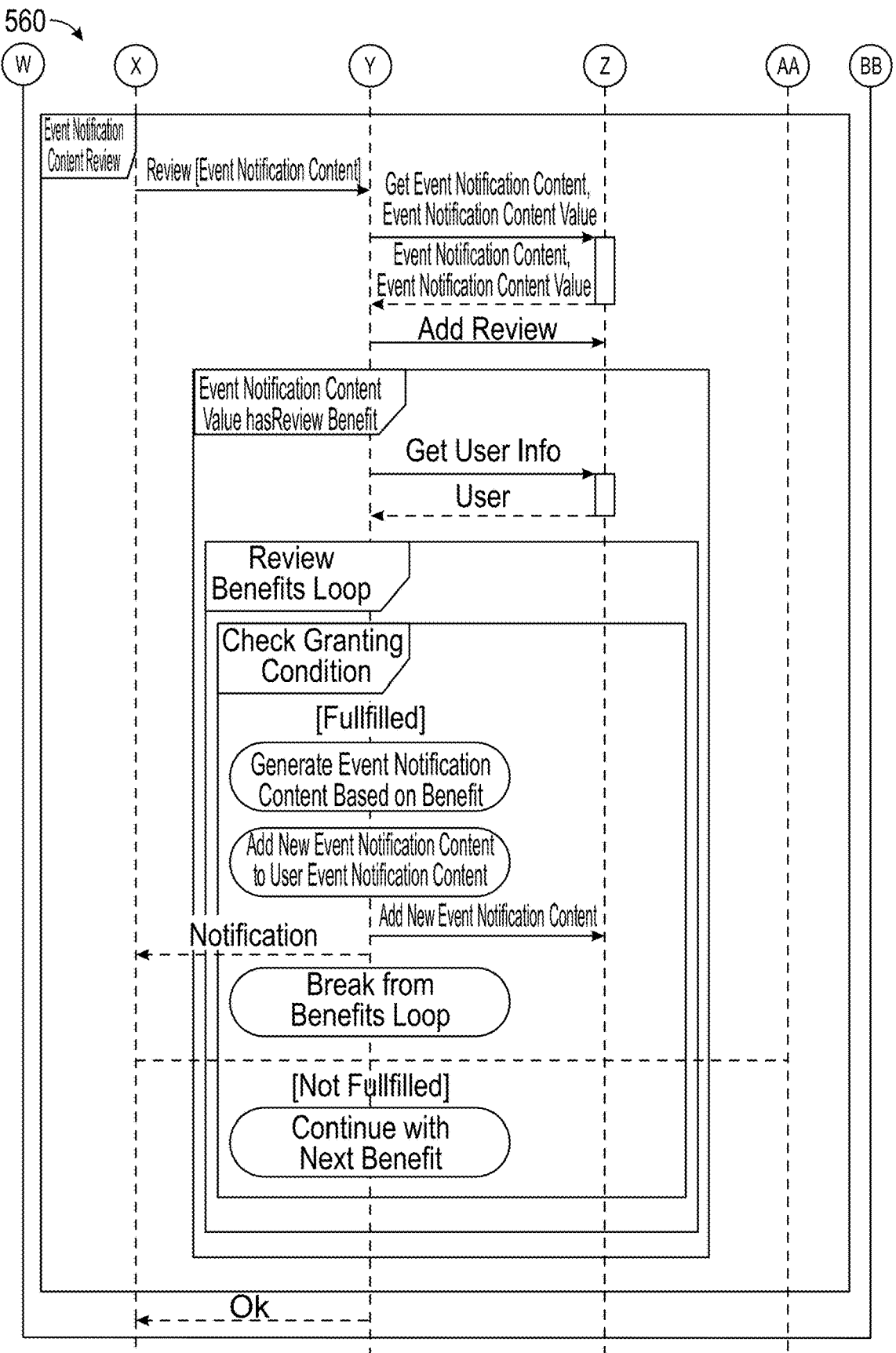
FIG. 5D illustrates an example of leaving a review for the vendor according to some embodiments.

FIG. 5D illustrates an example 560 of leaving a review for the vendor according to some embodiments. In some embodiments, the user 502 can leave an event notification content for the vendor 508 by sending the review to the server 504. The server 504 can request and receive the event notification content and the event notification value from the database 506. The server 504 can then determine whether the review includes an event notification value in the event notification value has review benefit loop.

In some embodiments, the server 504 requests and receives user information from the database 506. The server 504 can begin the review benefits loop and check the grant condition for the review. If the condition is met, the server 504 can generate the event notification content based on the benefit and add a new event notification content to the user event notification contents. The server 504 can then send the new event notification content to the database 506, and a notification can be sent to the user 502 indicating the new available event notification content. The server 504 can break from the benefits loop and continue with the next benefit. If the granting condition was not met, the benefits loop can also be broken and the server 504 can continue to the next benefit. Once all benefits have been verified, the user 502 can be notified by the server 504 of its additional event notification values based on the review.

Example System Flow Diagram for User Referral for Event notification contents

In some embodiments, granted event notifications can be forwarded to other users from the friends list. Suppliers might specify which event notifications can be forwarded to others. Suppliers also determine whether to forward the event notification and/or determine whether the user passed on the event notification.

In some embodiments, forwarded event notification benefits can be recalculated based on recipient profile and/or might differ from the original ones. Suppliers can specify rules for forwarded event notification's benefit calculation. Supplier can specify rules to generate special referral event notifications as a benefit for the forwarding user. Referral event notifications can be granted once the forwarded event notification is realized.

Figure 6A:
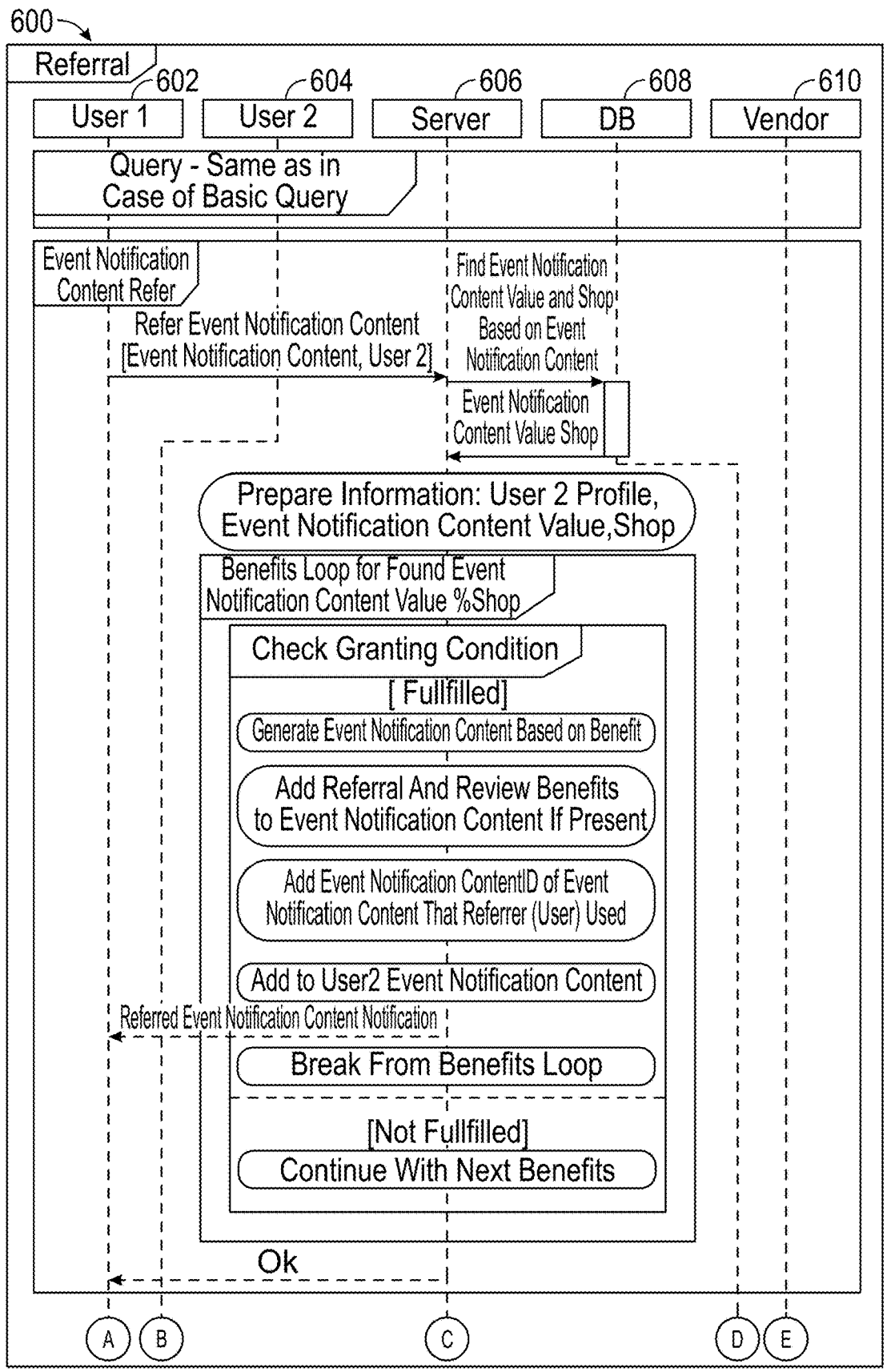
FIG. 6A illustrates an example of a flow diagram for an event notification content referral according to some embodiments.
Figure 6B:
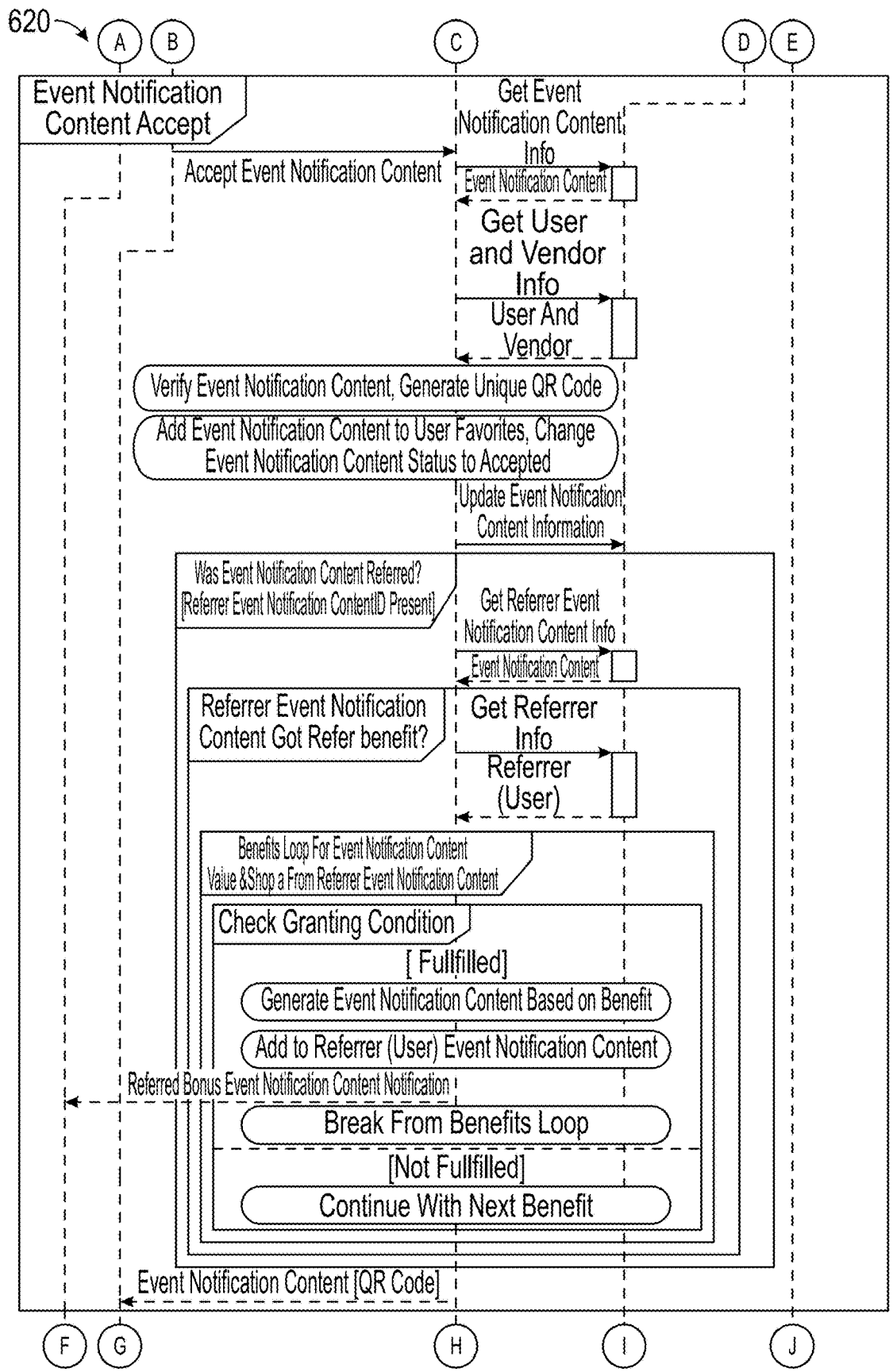
FIG. 6B illustrates an example of a flow diagram for an event notification content accepted according to some embodiments.
Figure 6C:
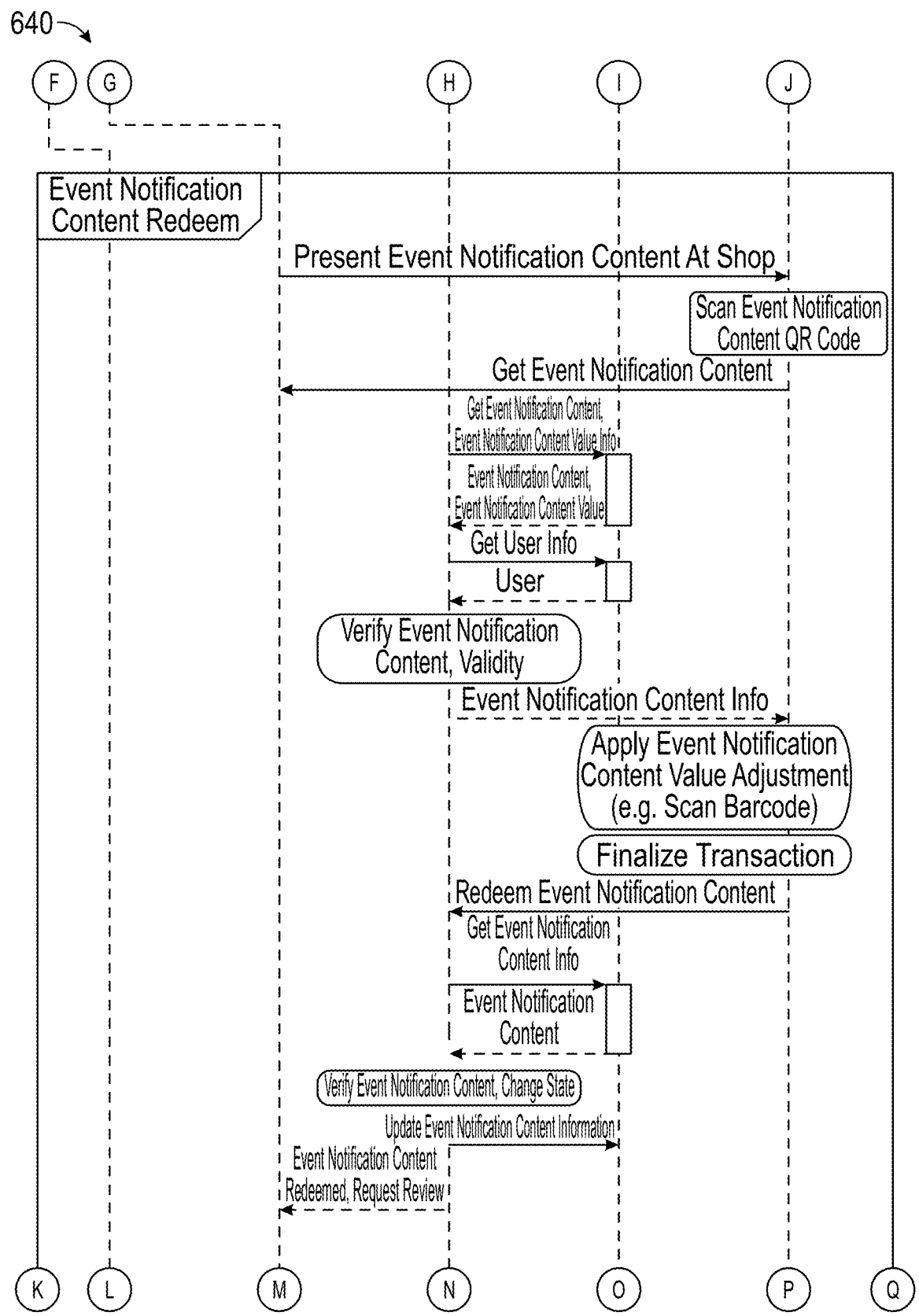
FIG. 6C illustrates an example of a flow diagram for an event notification content redemption according to some embodiments.
Figure 6C:
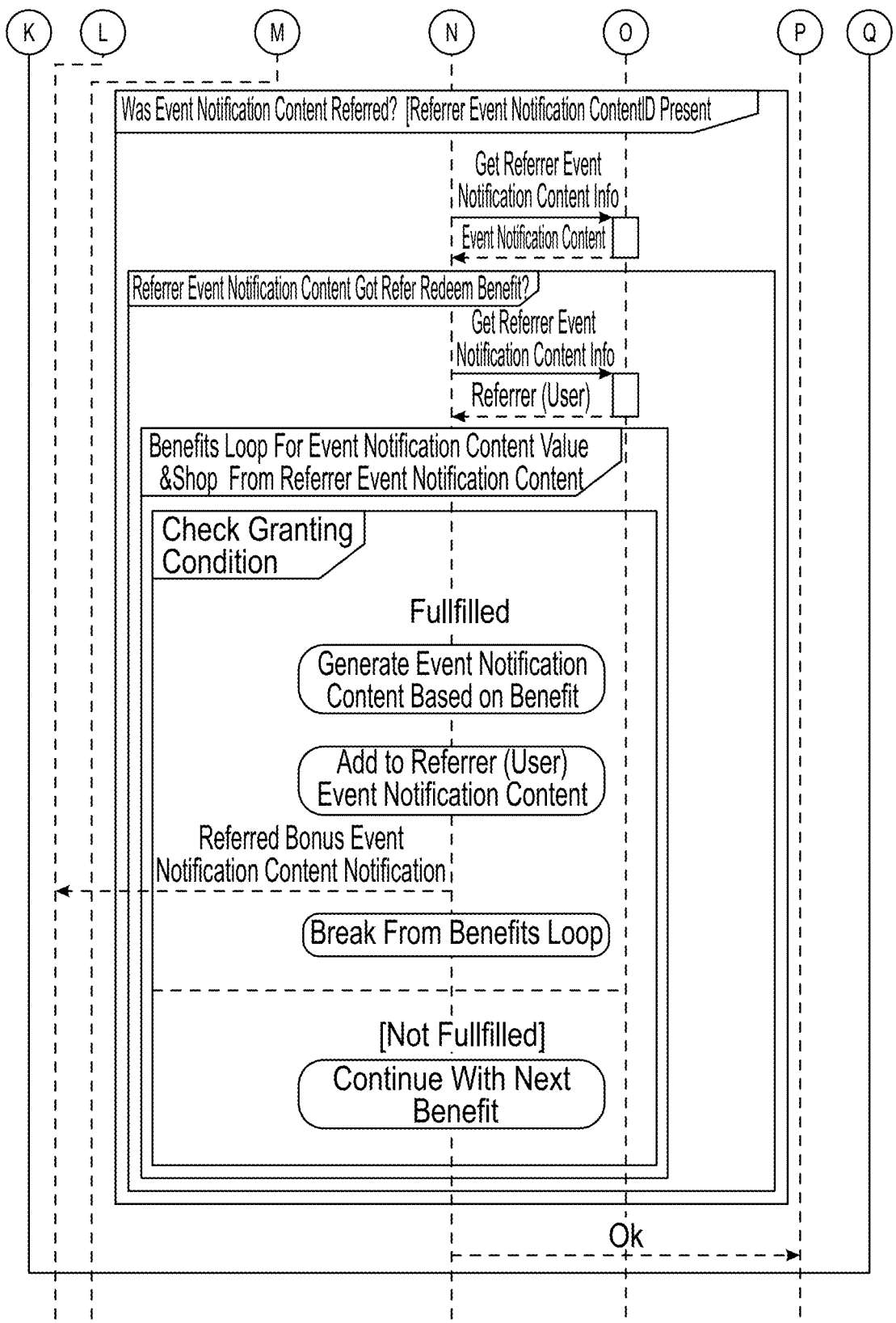

FIGS. 6A-6C illustrate examples of flow diagrams for user referrals according to some embodiments. In some embodiments, the user query flow diagram can include the same steps as in FIG. 5A.

FIG. 6A illustrates an example 600 of a flow diagram for an event notification content referral according to some embodiments. First user 602 can request to refer an event notification content to second user 604 to the server 606. The server 606 can request and receive the event notification value for the event notification content and for vendor information (e.g., shops) from the database 608 based on the received information from first user 602. The event notification values may be different for referrals than for regular query responses, such as additional sets of benefits or different discount amounts. The server 606 can prepare the information to send the event notification content to second user 604. In some embodiments, the first user 602 can select the type of benefit to receive and/or to send to the second user 604.

In some embodiments, the server 606 can begin a benefits loop for the identified event notification values and vendors (e.g., shops) and check the granting conditions. If the granting conditions are met, the server 606 can generate an event notification content based on the identified benefit, such as a percentage discount.

In some embodiments, the server 606 can add the referral benefits and/or review benefits if present. For example, if first user 602 wrote a review for the vendor, then first user 602 may get an additional benefit on top of the referral benefit.

In some embodiments, the server 606 can add the event notification content identifier (e.g., event notification content ID) the referrer (e.g., first user) for the referral benefit and add the actual event notification contents to second user 604.

In some embodiments, the server 606 sends the referred event notification content to second user 604, and the server 606 breaks from the benefit loop to continue to the next benefit. If the check granting condition was not met, the server 606 can also break from the benefit loop to continue to the next benefit. The server 606 can indicate to the referrer first user 602 that the referral was completed to second user 604. The first user 602 can be informed as to the discounts and/or points that the user will receive based on the referral.

FIG. 6B illustrates an example 620 of a flow diagram for an event notification content accepted according to some embodiments. The second user 604 that received the referral event notification content can indicate to the server 606 of accepting the event notification content with the vendor. The server 606 can then receive and request event notification content information and user and vendor information from the database 608. The server 606 can verify the event notification content, and generate a unique QR code for the referrer first user 602.

In some embodiments, the server 606 can indicate that the event notification content has been accepted and add the event notification content to second user 604's favorite list and update the event notification content information with the database 608.

In some embodiments, the server 606 can identify whether the event notification content was referred. If yes, the server 606 can request and receive referrer information from the database 608. Then the server can identify a referrer event notification content by requesting and retrieving referrer information from the database 608 and beginning a benefits loop for the referrer event notification content.

In some embodiments, the server 606 can check whether granting conditions were met for a benefit. If yes, the server 606 can generate an event notification content based on the benefit, add the benefit to a referrer event notification content, and send the bonus event notification content notification to the referrer first user 602. The server can then break from the benefits loop and continue with the next benefit. If the granting conditions were not met for a benefit, the server can also then break from the benefits loop and continue with the next benefit.

In some embodiments, the server 606 can send the generated QR code to the second user 604 for the second user 604 to redeem the referred event notification content.

FIG. 6C illustrates an example 660 of a flow diagram for an event notification content redemption according to some embodiments. The referred first user 604 can present the event notification content at a vendor shop. The vendor 610 can scan the event notification content and send the event notification content information to the server 606. The server can then request and receive event notification content information and user information from the database 608 in order to verify the event notification content.

In some embodiments, the server 606 can send the retrieved event notification content information (such as a discount amount) to the vendor 610 for the vendor 610 to apply the event notification content discount to the transaction with the second user 604.

In some embodiments, the vendor 610 can notify the server 606 that the event notification content has been redeemed, the server 606 can request and receive the event notification content information, and the server 606 can update the status of the event notification content as redeemed with the database 608.

In some embodiments, the server 606 can request verification from the second user 604 of the redemption of the event notification content and requesting review of such redemption. Advantageously, an event notification content cannot be mistakenly redeemed.

In some embodiments, the server 606 identifies whether the event notification content was referred in order to provide the referrer first user 602 with additional benefits of a redeemed event notification content. If so, the server 606 requests and receives referrer information from the database 608.

In some embodiments, the server 606 begins a benefits loop for the referrer event notification content and checks for a granting condition for the benefit. If the condition is met, the server 606 can generate an event notification content based on the benefit, add the referrer event notification content to a referrer message, and send the referrer message to the referrer first user 602 that includes the referrer redeemed event notification content benefit. The server can then break from the benefits loop and continue with the next benefit. If the granting conditions were not met for a benefit, the server can also then break from the benefits loop and continue with the next benefit. In some embodiments, the server 606 can notify the vendor 608 of the completion of the referral event notification content.

Example Communications Diagram With System Database

Figure 7:
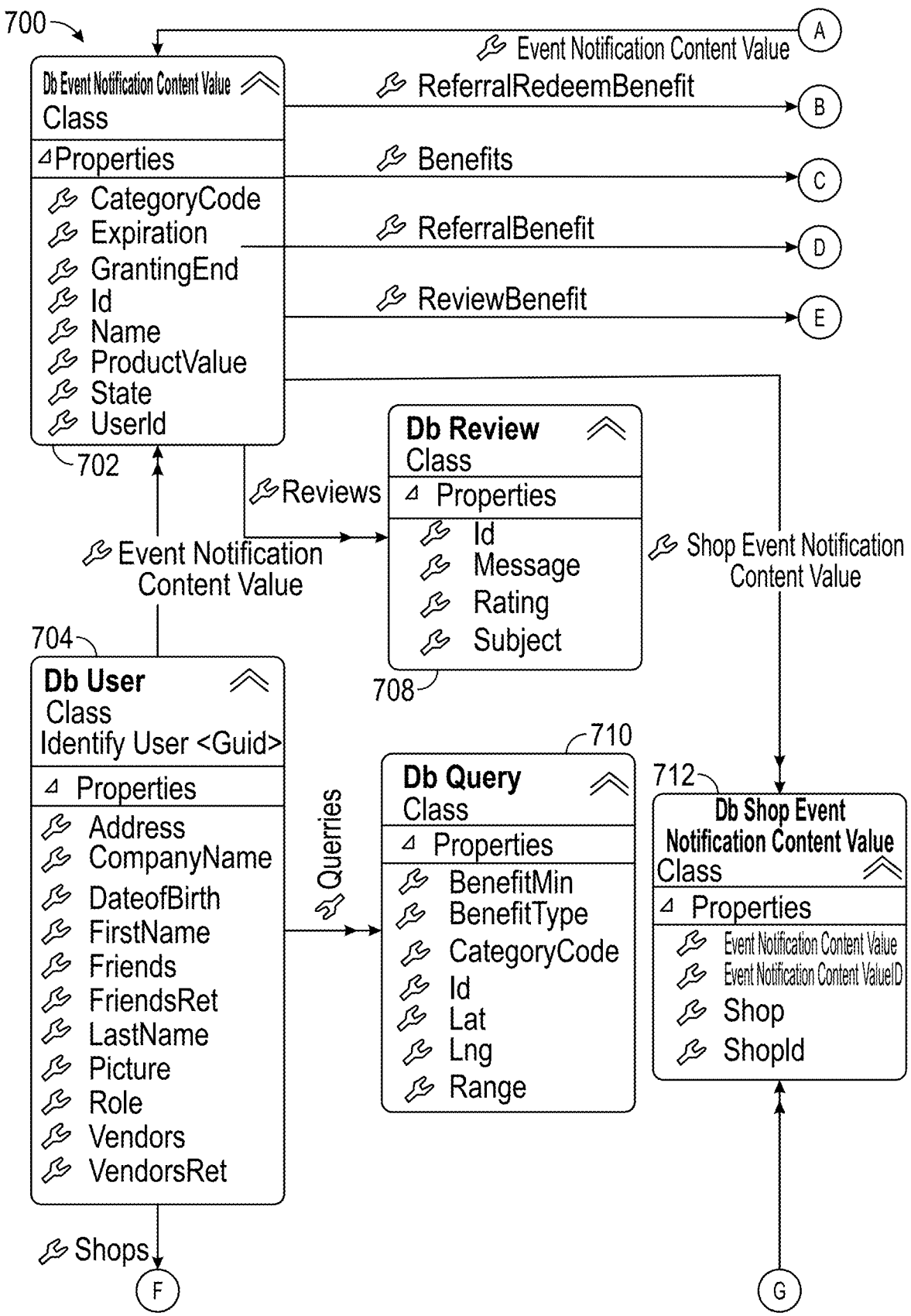
FIG. 7 illustrates an example of a communications diagram between system database tables, according to some embodiments.
Figure 7:
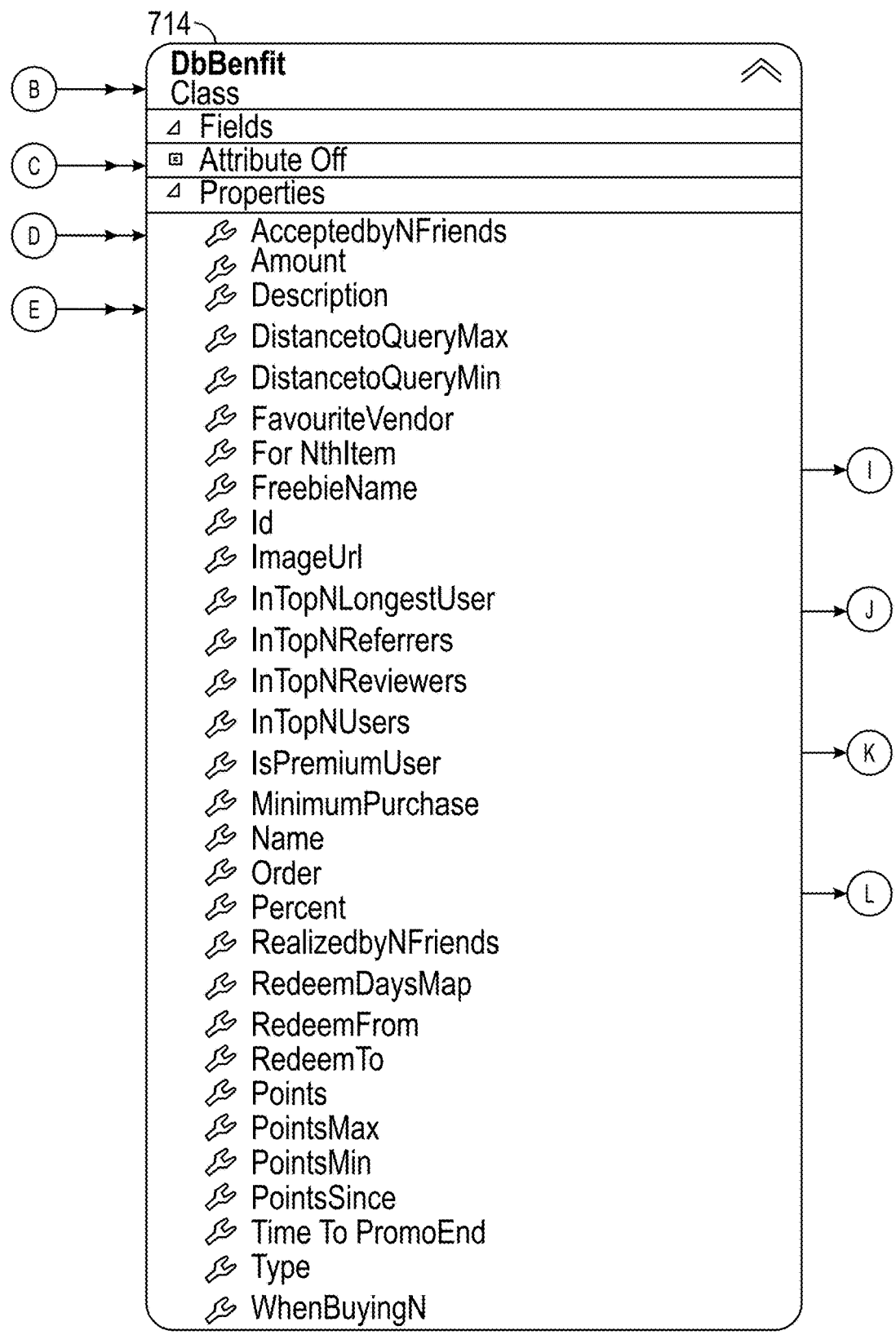
Figure 7:
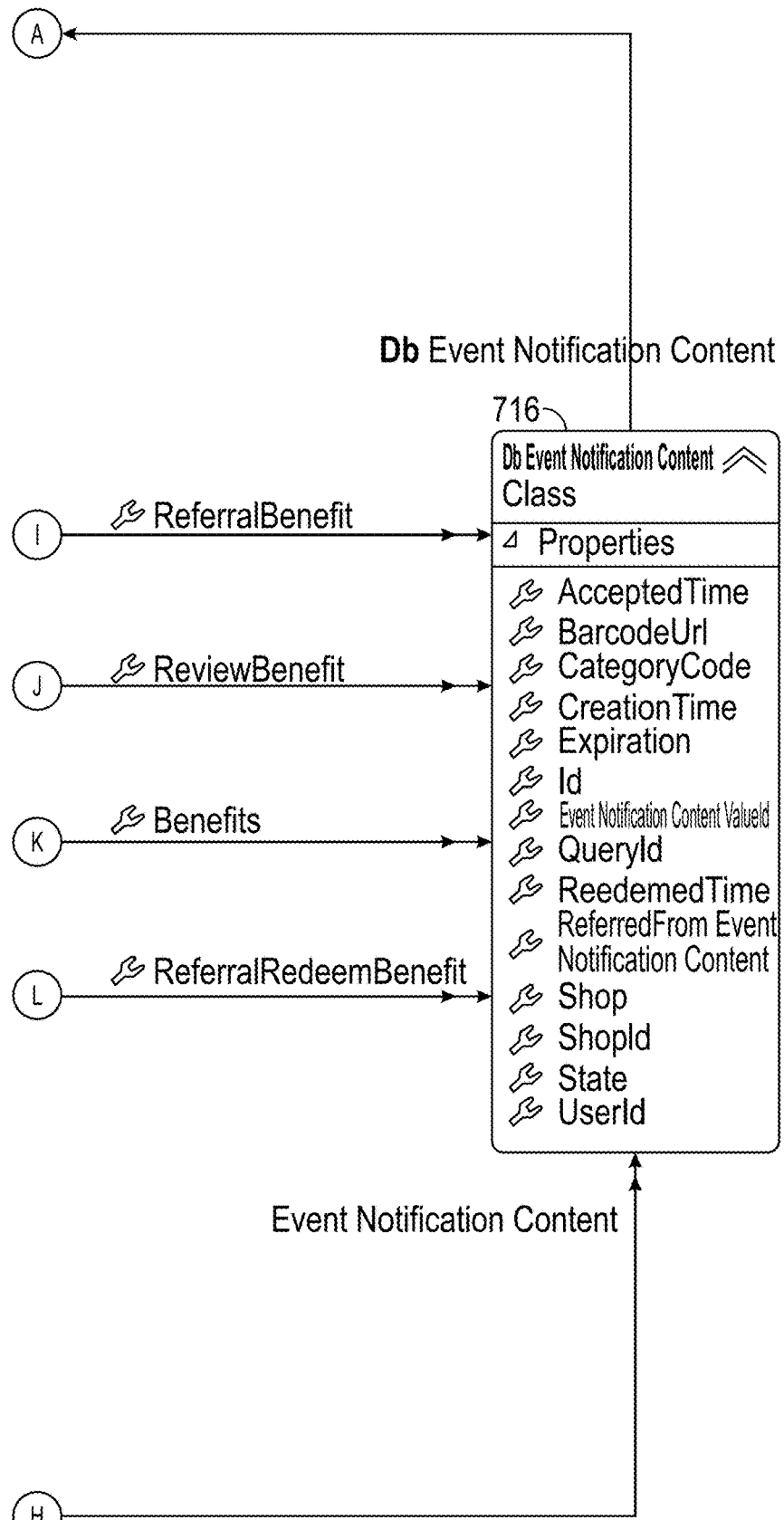
Figure 7:
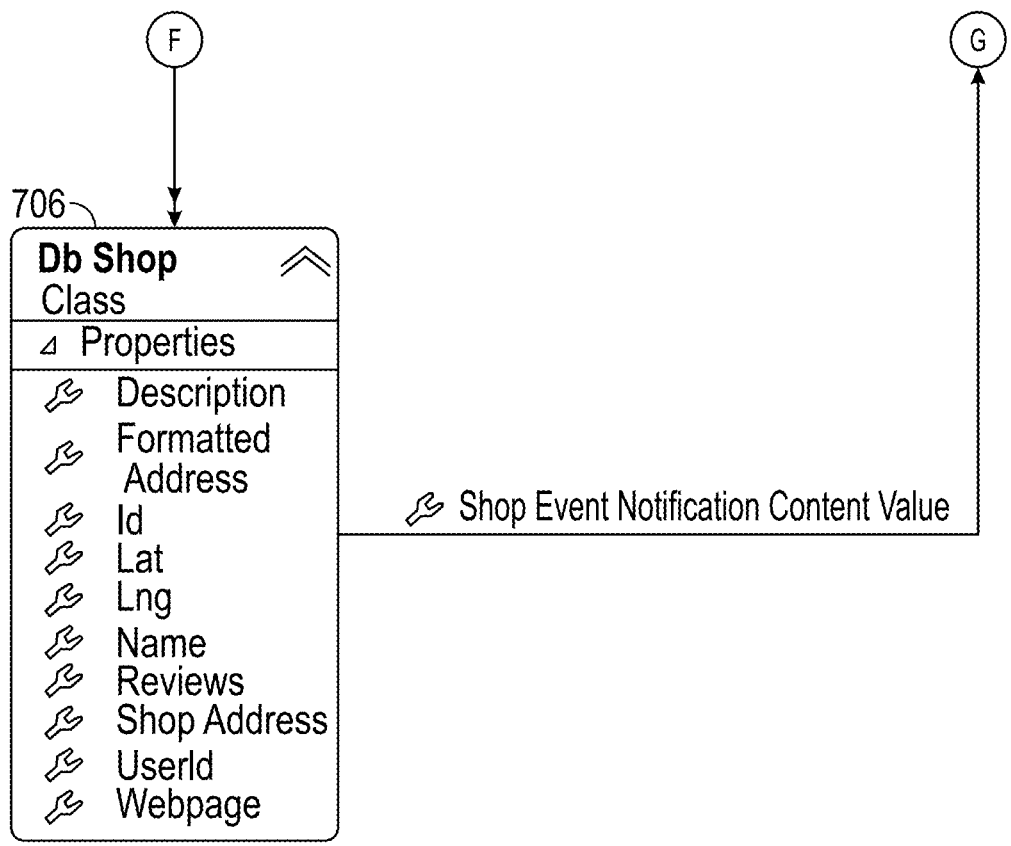

FIG. 7 illustrates an example 700 of a communications diagram between system database tables, according to some embodiments. The example of FIG. 7 includes an event notification value database 702, a user database 704, a shop database 706, a review database 708, a query database 710, a shop event notification value database 712, a benefit database 714, and an event notification content database 716 (collectively referred to herein as databases). In the example of FIG. 7, the databases include SQL tables. However, it is appreciated that other databases can be used.

The event notification value database 702 can include a database of event notification values defined by vendors. Each event notification value can include multiple benefits. The benefits can be grouped into certain categories, such as a query benefit, a referral benefit, a redeem benefit, a review benefit, and/or the like. The benefits can be used to generate event notification contents depending on certain situations, such as if the event notification value is generated based on a user referring an event notification content to another customer or a customer leaving a review for vendor.

The user database 704 can include a database of user profiles. The user profiles can include an authorization information for information associated with the user, such as credit information, personal identifiable information, and/or the like. The authorization can be authorization for the system to access and/or distribute the information. The user profile information can include authentication information, such as an identity authentication based on credit card verification. The profile data can be used for storing profiles for vendors and/or users. The user profile data can include data related to shops, event notification values, event notification contents, and/or queries, such as a user's preference for a type of event notification content or a category of shops.

The shop database 706 can include a database of geographical location and description of vendor sites. For example, the database can include geolocations, a city, a state, a zip code, a webpage, and/or the like. The database can also include information regarding the shop, such as a category of goods and services, event notification values offered, matching rules for the shop, and/or the like.

The review database 708 can include a database for storing user reviews, such as user reviews of the shop.

The query database 710 can include a database of user queries, such as user search terms, user search categories, and/or the like. The database can also include relevant information associated with the query, such as a time of day of the query, the weather, a geolocation where the query was made, and/or the like. The query information can be used for statistical analysis and/or for granting conditional usage of an event notification content.

The shop event notification value database 712 can include a database tying the event notification values to the shops. For example, two shops can want a 20% discount for a customer that is a distance of 5 miles away and 30% discount for a customer that is 10 miles away. the shop event notification value database 712 can link the event notification contents to the two shops.

The benefit database 714 can include a database of benefit descriptions, such as a discount amount, an amount of points granted for a vendor review, and/or the like. Granting conditions can be used to check if the event notification content should be generated based on the benefit.

The event notification content database 716 can include a database of generated event notification contents that point to granted benefits.

The databases include properties that can define the database entries. For example, the event notification value database 702 can include an event notification value name (e.g., "Mike's Car Wash Discount"), an event notification value identifier (e.g., "CW123"), an event notification value category (e.g., "Car Wash"), an expiration date of the event notification value (e.g., "Jan. 3, 2019"), a state of the event notification value (e.g., redeemed, pending, expired).

The databases and/or processors corresponding to the databases can communicate information among each other. In some embodiments, the relations between the tables can be self-referential tables. The self-referential tables can include a special row and/or column within the database that stores the pointers to the other tables. Instead of having to save the benefit characteristics for each of the event notification contents, the event notification content database 716 can include an entry that refers to a benefit in the benefit database 714. Advantageously, the data stored in each of the databases can be reduced by calling a call function (e.g., a database pointer) when a certain data entry in another table is needed. Thus, client computing devices can perform modeling and have more flexibility in assessing large datasets, which previously required large network throughput of data and high processing speed. Moreover, a self-referential table can enable more efficient storage and retrieval of larger sized data, faster searching of the event notifications, event notification values, and benefits, and more flexibility in configuring the database.

The executable instruction set can be generated and deployed to a client computing device (e.g., onto the downloadable electronic file) to automatically adjust the event notification parameters for the preferred outcome (e.g., the desired event notification value). Advantageously, the event notification parameters that were previously stored in the client computing device can be automatically enhanced by the executable instruction set to perform according to the preferred outcome (e.g., increasing the previously set discount amount based on a user characteristic, query, location, and/or the like). The event notification parameters are subsequently and automatically enhanced by the executable instruction set to provide an output that is optimized and/or configured according to the preferred outcome. Thus, client computing devices can solves the technical problem of event notification generation across massive datasets via a practical application of a self-adjusting downloadable electronic file that automatically adjusts event notification parameters within the downloadable electronic file, which previously required large network throughput of data and high processing speed by having to move around the massive datasets for analysis.

In some embodiments, a database can communicate data in one direction, such as shown with a single arrowhead. For example, the event notification content database 716 can communicate the referral benefit, the review benefit, the general benefit, and the referral and review combined benefit to the benefit database 714.

In some embodiments, a database can communicate multiple data files in one direction, such as shown by a double arrowhead. For example, the event notification value database 702 can communicate a property of the event notification contents (e.g., referral and redeem benefits) that includes a collection of pointers to multiple entries in the benefit database 714.

In some embodiments, databases can communicate a collection of pointers to each other. For example, the shop event notification value database 712 can communicate to multiple shops, and each shop may have multiple active event notification values. Both the shop database 706 and the event notification value database 702 can collect a collection of pointers for shop event notification values at the shop event notification value database 712.

Example Heat Map of User Responses to Event notification contents

Figure 8:
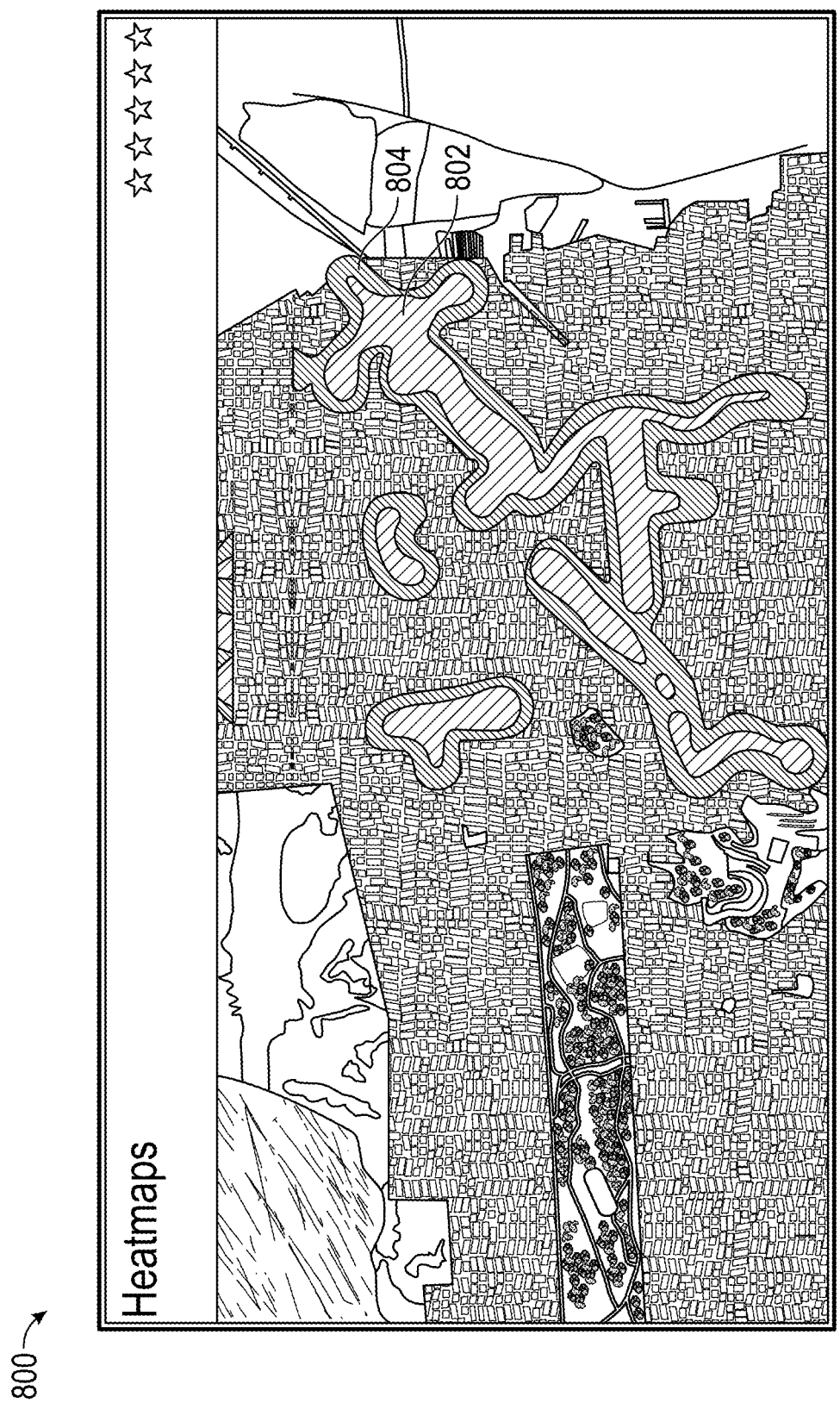
FIG. 8 illustrates an example of a heat map of user responses to event notification contents, according to some embodiments.

FIG. 8 illustrates an example 800 of a heat map for user responses to event notification contents, according to some embodiments. The heat map can include visual indicators that indicate where the users are coming from. Thus, the heat map can show the vendors how to adjust their event notification values to attract the appropriate users from the areas of interest and/or other geographical areas.

The heat map can include a visual indicator 704 that indicates users who have received event notification contents but not yet redeemed the event notification contents. The heat map can also include a visual indicator 702 of users who have redeemed the event notification contents. The vendor can use the heat map to identify which event notification values have the most impact on their sales and adjust the event notification values accordingly to optimize sales. The visual indicators can indicate other characteristics of users and/or vendors, such as users who have queried for a particular event notification content or users who have referred an event notification content to another user.

The heat map can illustrate how vendors should distribute sales, such as distributing sales to other vendor sites located in different geographical locations by adjusting event notification values.

The heat map illustrates a specific graphical user interface that displays event notification contents received data and/or event notification contents redeemed data in a single view overlaid on a map.

The database system can generate a graphical user interface and/or graphical user interface data that optimizes valuable user interface real estate. For example, the database system can provide a display of a heat map of event notifications with visual indicators of event notifications that were distributed, redeemed, referred, and/or the like, and visual indicators of customers that have left reviews for the vendors. Such an improved display interface allows a user to more quickly access desired data stored in the mobile application and/or an external database. Moreover, the visual indicators can include a selectable function (e.g., a button, a summary list, text, radio button) that can launch one or more applications that provide further information to be seen. For example, the visual indicators on the heat map can be selected to display customer information corresponding to event notifications that were referred. Advantageously, the specific and practical manner of displaying the limited set of information to the user via a heat map improves the technical problem for the user interface in electronic devices over conventional systems by enabling the user to identify more relevant data based on geolocation, and more quickly select the relevant data to launch an application for more information related to the selection. Accordingly, the heat map and the visual indicators that correspond to functions that launch applications for more information improve the speed of the user's navigation through various views and windows. The user is saved from navigating to a table of event notification data, opening it up, navigating within the event notification data to identify data of interest and/or functions to be launched. Moreover, the user is saved from paging through multiple screens of options, where the heat map of the database system can enable the user to access the relevant data in response to a single view and a few clicks of the user.

Example Event Notification Value Summary Graph

Figure 9:
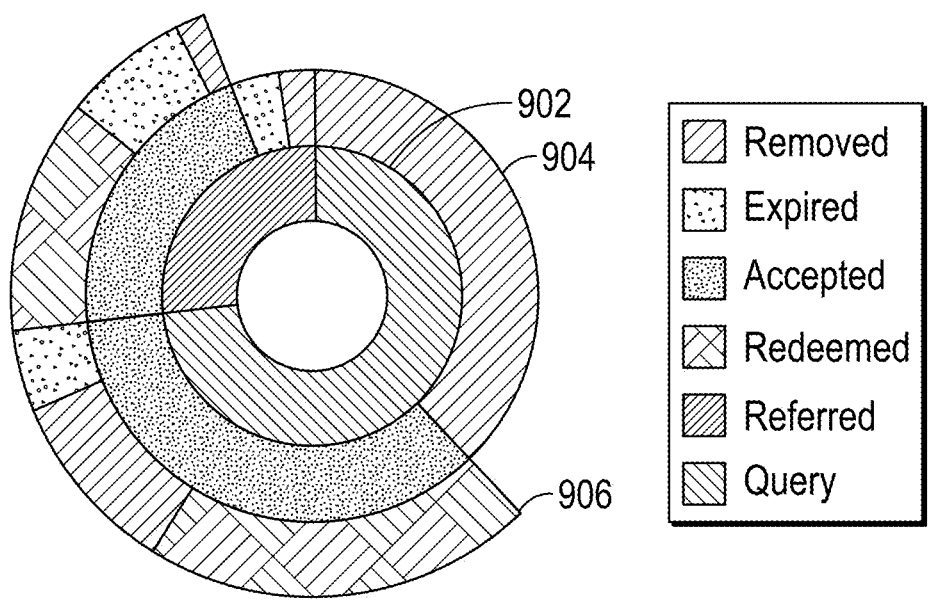
FIG. 9 illustrates an example of an event notification value summary graph, according to some embodiments.

FIG. 9 illustrates an example 900 of an event notification value summary graph, according to some embodiments. The event notification value summary graph can illustrate a hierarchical event notification value summary statistic graph, which can visualize event notification content phases and amount of event notification contents that are accepted, redeemed, removed by the user, and/or expired.

The first hierarchy 902 can include event notification contents that are referred or queried. The event notification contents can be provided to the user based on a user query or if the event notification content is referred to the user. The event notification contents can also be dynamically created, such as based on a close geolocation of the user to a vendor site.

The second hierarchy 904 can include event notification contents that were accepted, expired, or removed. In the example of FIG. 9, the queried event notification contents result in a large amount of accepted event notification contents and removed event notification contents, and no expired event notification contents. The referred event notification contents result in a large number of accepted event notification contents, and a small number of expired and removed event notification contents.

The third hierarchy 906 include results of the accepted event notification contents from the second hierarchy 904. Both the referred and query event notification contents that were accepted have a large number of redeemed event notification contents. The referred event notification contents have a larger percentage of expired event notification contents than those of the queried event notification contents. The queried event notification contents have a larger percentage of removed event notification contents than those of the referred event notification contents.

Example Distribution Time/Distance Diagram

Figure 10:
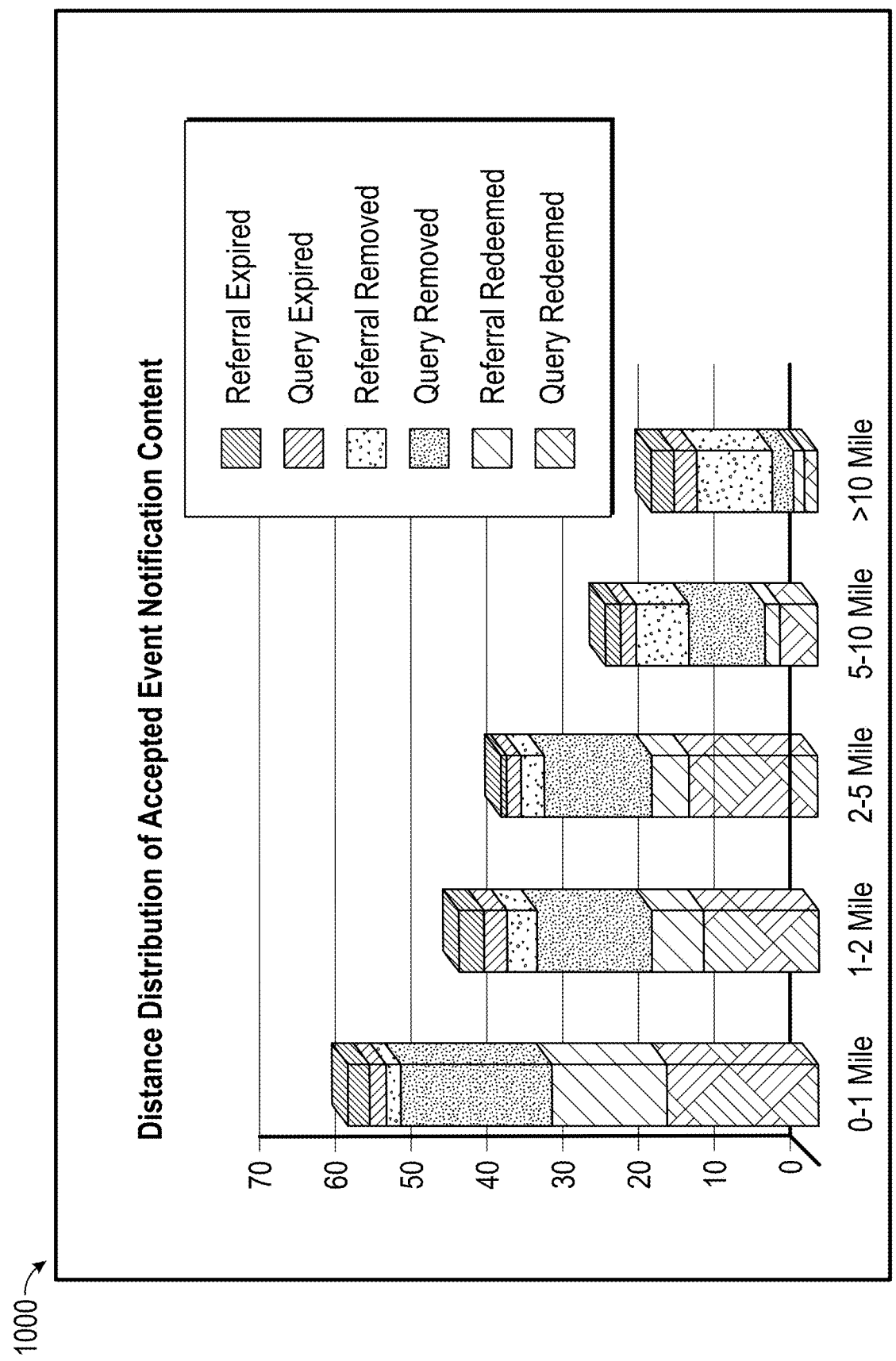
FIG. 10 illustrates an example of a distribution time/distance diagram, according to some embodiments.

FIG. 10 illustrates an example 1000 of a distribution distance diagram, according to some embodiments. In some embodiments, the distribution distance diagram can be displayed for other characteristics, such as queried event notification contents, referred event notification contents, dynamically created event notification contents, redeemed event notification contents, removed event notification contents, expired event notification contents, and/or the like, or a combination thereof. The distribution distance diagram of FIG. 10 illustrates event notification contents that were accepted.

The distribution distance diagram of FIG. 10 illustrates the effectiveness of an event notification content over a distance. As shown, the query event notification contents that are redeemed drop in a large percentage from 2-5 to 5-10 miles. Thus, a vendor may decide to increase the discount amount starting from 5-10 miles. The distribution distance diagram can be used to improve ROI on an event notification content and/or for statistical analysis on effectiveness of an event notification content over distance.

In some embodiments, the diagram can be displayed over time. The number of accepted event notification contents can illustrate how fast certain event notification contents were accepted.

Example Benefits Usage Diagram

Figure 11:
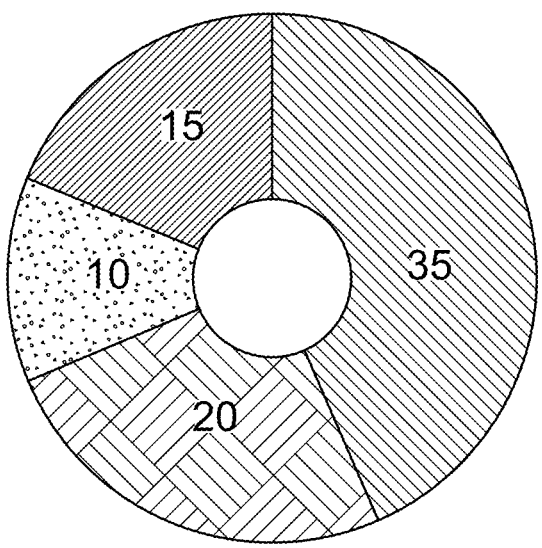
FIG. 11 illustrates an example of a benefits usage diagram, according to some embodiments.

FIG. 11 illustrates an example 1100 of a benefits usage diagram, according to some embodiments. The diagram provides a visual illustration of statistics of the levels of benefits used for a specific event notification value. For example, the diagram can show the benefits of the percentage discount provided to the user. In the diagram of FIG. 11, the benefits illustrate a statistical distribution of event notification contents dispersed for a 10% discount, a 25% discount, a 45% discount, and a 60% discount. The 10% discount can be for all customers, in particular non-new customers with less than 25 loyalty points. The 25% discount can be provided to customers with loyalty points between 25 and 100 loyalty points. The 45% discount can be provided for customers with higher than 100 points. The 60% discount can be provided to new customers.

The diagram of FIG. 11 illustrates that the 10% discount is provided to a greater number of customers than any of the other discounts. The vendor can adjust their event notification value strategy by assessing these statistics, as described further herein.

Example QR Code for Customer Scan

Figure 12:
FIG. 12 illustrates an example of the QR code, according to some embodiments.

FIG. 12 illustrates an example 1200 of the QR code, according to some embodiments. In some embodiments, the QR code can be printed for a customer to scan. For example, the QR code can be printed on a poster and/or an electronic display at the front of a vendor site. Once the customer scans the QR code, such as via a customer's mobile device, an installed electronic file (such as an application) on the mobile device can process the QR code and provide a customized display interface for the user. For example, the electronic file may generate graphical user interface data that includes a personalized menu of discounts provided by the store just for the user. The personalized menu can take into accounts referrals sent, reviews written, loyalty points, and/or the like to provide customized event notification values for the user. The electronic file can run a query based on a scanned QR code, where the query is narrowed to a specific shop and vendor.

In some embodiments, the QR code can be printed on a newspaper, physical mail, an electronic mail, sms message, billboard advertisement, advertisement printed on a car, and/or the like.

In some embodiments, the QR code can be printed on a product or a product shelf. When the user scans the QR code, the electronic file can generate customized pricing to be displayed to the user. Vendors can access the QR code for particular products by accessing specific product event notification values. Vendors can access available event notification values specific to a product and/or to a category of products. Specific product event notification values can be marked as "in store only," which can make the event notification value available only via the QR code on the product or on the product shelf. Vendors may use the vendor electronic file to generate the QR code label for the product.

In an illustrative example, the vendor can create an event notification value with a set of benefits defining different product pricing based on loyalty points. Users with more loyalty points can be offered a higher discount or a better price. In some embodiments, loyalty points can be spent to upgrade a particular event notification value. The upgrade option can be displayed on the mobile device of a user via the electronic file.

In some embodiments, the QR code can be generated for a particular product (e.g., a serial number of shoes). The QR code can be specific to a group of products (e.g., refurbished items or new items). The QR code identifying a product or a group of products can be provided by the vendor to the system. A sticker printer can print the QR codes to be placed on the product, on a product shelf, on a poster wall, and/or the like. In some embodiments, a digital screen can display the QR codes. The electronic file can process the scanned QR codes and allow tracking for returned items or items where the user is requesting warranty.

In some embodiments, the user can be displayed a customized and personalized price in response to scanning the QR code. The user can register the credit card with the system beforehand, and can have the option to pay for the product directly via the electronic file installed on the user device. The electronic file can cause display of notification with receipt and confirmation identifier (e.g., another QR code) that can be used by the vendor to verify the transaction. The vendor can scan the confirmation identifier to get transaction details from the system.

In some embodiments, the vendor can scan the event notification content using the vendor electronic file and request the system to complete the transaction. The user can get notification on the user's electronic file that the transaction was completed. The system can request money transfer from the user's credit card to the vendor's payment system and notify both the vendor and the user upon completion of the payment transfer.

In some embodiments, the QR code can identify one or more products and/or actions. For example, a QR code can indicate a product, a category of products, a shop, a benefit, a particular event notification value, a specific query, and/or the like.

In some embodiments, the QR code can be scanned and the system can identify a vendor profile based on the scanned QR code. System can then retrieve a list of event notification contents for the identified vendor and send the event notification contents to the user.

In some embodiments, a QR code can be scanned and the system can identify a specific vendor location. The QR code can be displayed in front of a vendor store such that a user can scan the code and identify relevant event notification contents available for the store. In some embodiments, the QR code can be scanned offsite, and the system can identify and display the location of the vendor site where the event notification content can be redeemed.

In some embodiments, the QR code can be scanned, and the system can identify a specific vendor's event notification value. The event notification value can be displayed to the user and/or can be printed, an internet event notification content that can be redeemed by displaying a barcode on the user device (e.g., via a downloadable file installed on the user device), and/or the like. For example, the user device can display an advertisement on a search engine stating "scan here to check our pizza discount for you."

In some embodiments, the event notification content can be printed onto a newspaper, event notification content book, advertisement to be physically mailed to the user, displayed as an internet advertisement, sent via electronic mail, and/or the like. The event notification content can be a general event notification value and/or a customized event notification value for the individual.

Augmented Reality and Virtual Reality Devices

In some embodiments, the system can send event notification contents to an augmented reality system, a virtual reality system, and/or the like. A user can use the downloadable file on the augmented reality system to look through a lens, camera, and/or the like. The event notification value can be displayed on top of a newspaper, where the event notification value can be displayed as a virtual event notification content displayed on top of a physical newspaper. In some embodiments, the augmented reality system, virtual reality system (VR/AR), and/or the like can include AR/AR glasses, VR/AR lenses, VR/AR camera, VR/AR headset, and/or the like. The VR/AR device can enable scanning multiple QR codes at once in real time. In some embodiments, the VR/AR device can display and/or print the event notification values on top and/or near the QR codes. For example, a user can view an event notification content book with multiple event notification contents via the VR/AR device, and the VR/AR device can display multiple offers at once, each offer adjusted for the specified user's profile. The user can select the virtual discount via an input, such as by tapping on the event notification content or controlling a pointer, to accept the event notification content.

In some embodiments, the VR/AR device can display door posters at a vendor site, such as adjusted pricing of a restaurant menu for a specific user.

User and User Group Rating

In some embodiments, the user and/or user group rating can include an abstract value or set of values associated with each user or user group calculated based on one or more of, but not limited to:
- user history of realized event notifications
- history of realized event notifications that user forwarded to others
- reviews and feedback provided by user that was rated as helpful by others
- History of purchase transactions associated with realized event notifications like:
  - original price
  - discounted price
  - product category
  - time of transaction
  - location of transaction Rating of the user group can be calculated based on ratings of its members and/or vice versa. Dynamically calculated rating value can be broken down by category, origin (realized event notifications, referrals, feedback), time and location, and/or the like.

The rating of the user or user group can be normalized across a plurality of suppliers. For example, the ratings of the user or user groups can be normalized based on the transaction price and the discounted price. Furthermore, other transaction parameters can be used to normalize as well as to categorize or break down user or user group rating. For example, the supplier can include a rule that filters users with ratings above 100 only considering event notifications for electronic equipment from stores in California realized during the last month. Rating points can be gathered by users by realizing event notifications (e.g., $100 spent on discounted articles). Rating points can be also gathered by referrals, reviews, and/or the like.

In-Person Event Notification Distribution

In some embodiments, suppliers using near-field communication ("NFC"), Bluetooth or other location limited technology can distribute event notifications to users that physically visited premises. Such event notifications can be passed using a dedicated application such as a mobile application. Vendors granting event notification contents can include NFC devices to connect with a mobile phone in the vendor's store. The vendor systems can include systems for employees with NFC communication triggers for users to query for event notification values. In some embodiments, certain benefits can only be accessed in-store using NFC devices.

Favorite Supplier Proximity Trigger for Event Notification Query

In some embodiments, users can build a list of favorite suppliers for which event notification query will be generated based on user location proximity to the supplier's premises. User will be notified once the event notifications are generated and ready to use. This feature can eliminate the need to search for event notifications for the specified suppliers. The event notification content query can be automatically triggered by a user device when within a certain distance threshold to a vendor site.

Supplier Loyalty Program Plugin

In some embodiments, users can extend his or her profile with a supplier's existing loyalty program where she or he is a member. Loyalty program ID can be stored in user database and used in the event notification queries as well as during event notification realization. User loyalty program ID can be verified on supplier's server before it is stored in user profile.

In some embodiments, users can receive points for completing a transaction with a supplier. For example, a user can receive a 50% off for their first offer and 20 points to their loyalty program. Any user with 100+ points can get a 25% discount for future offers. Users who refer the supplier to other users can receive 5 points for their referral. If the referred user realized an event notification content, the referrer user can receive an additional $10 off his or her next service of greater than $30. Loyalty points can also be applied to a user when the user completes a review for the vendor. Loyalty points can be spent by a user to upgrade a specific event notification content already received from a query and/or referral to the next benefit level in the same event notification value.

Plugin for Supplier Bar Code Scanner

In some embodiments, software plugins to bar code scanner equipment can provide automated feedback related to realized event notifications and the associated transactions along with regular product bar-code scan. Such systems can combine the step of event notification verification with product/service purchase. Advantageously, automatic detection of product returns can be fed back to the system.

Wish List

In some embodiments, users can specify wish lists as a list of products or categories of interest. Mobile applications can automatically query and notify user about event notifications fulfilling specified criteria. Queries can be triggered based on time (periodic) or based on location (when user change the location). After an event notifications list is built, the system application can provide tools to compare the benefits based on additional parameters (e.g., 20% off vs. $50 off based on specified product price). The user can search for special offers nearby for a longer period of time and/or be notified every time a new, better offer shows up.

In some embodiments, the wish list can include a user's favorite query and/or sets of queries that can be stored by the user's mobile device and/or the server. The mobile device can process the queries to trigger queries to the server at certain time periods and/or based on a proximity trigger. The server can process the queries to check on any new matching event notification values to add to the generated event notification contents for the user.

Shopping List

In some embodiments, users can build a query that span multiple categories and/or products and send to the system as one request. As a response, system can send geographically grouped sets of event notifications that can be compared, such that user can choose the place of interest, such as a place for shopping.

Pay with the Event Notification

In some embodiments, suppliers can grant unique, single user dedicated event notifications for users that connect their credit card information with the profile. User can have possibility to pay for the product/service with the event notification itself. Money transfer can be done directly from user's registered credit card to supplier account and transaction confirmation will be sent to both user and supplier app. The system can verify a user's identify based on credit card information, and can indicate to a content item provider of the user identify verification.

Short Validity Flash Event Notifications

In some embodiments, the database system can generate short validity flash event notifications. Higher benefit event notifications can be generated for sports events, movies at a theater or concerts in response to queries issued few hours before the event and with very short validity. Flash event notifications can be useful to fill in the empty spots last moment.

Universal Event Notifications

In some embodiments, supplier can query for a top number of users to send discount event notifications or referral benefit event notifications (e.g., forward to friends, get $10 discount once they use it) to their users.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 13:
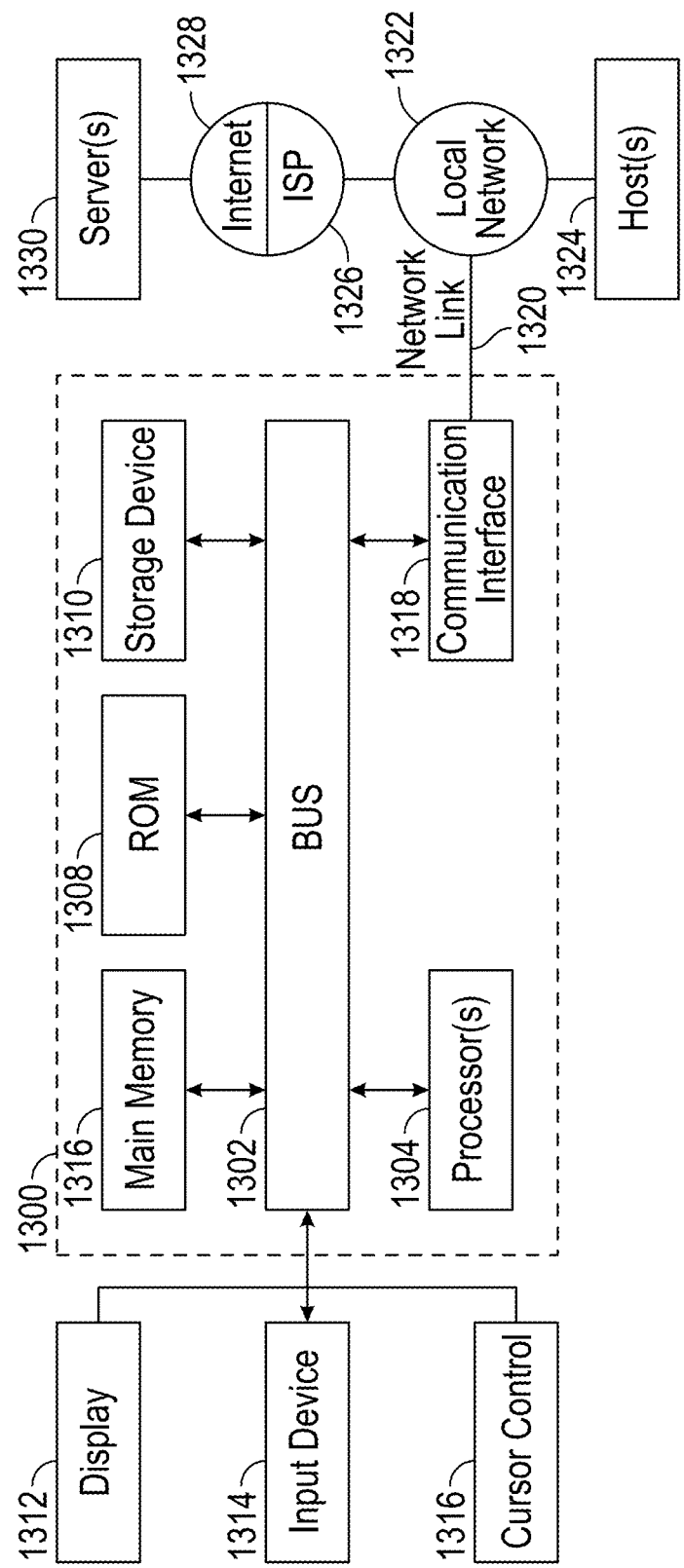
FIG. 13 illustrates a computer system with which certain methods discussed herein may be implemented.

For example, FIG. 13 is a block diagram that illustrates a computer system 1300 upon which an embodiment may be implemented. Computer system 1300 includes a bus 1302 or other communication mechanism for communicating information, and a hardware processor, or multiple processors, 1304 coupled with bus 1302 for processing information. Hardware processor(s) 1304 may be, for example, one or more general purpose microprocessors.

Computer system 1300 also includes a main memory 1306, such as a random access memory (RAM), cache and/or other dynamic storage devices, coupled to bus 1302 for storing information and instructions to be executed by processor 1304. Main memory 1306 also may be used for storing temporary variables or other intermediate information during execution of instructions to be executed by processor 1304. Such instructions, when stored in storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or USB thumb drive (Flash drive), etc., is provided and coupled to bus 1302 for storing information and instructions.

Computer system 1300 may be coupled via bus 1302 to a display 1312, such as a cathode ray tube (CRT) or LCD display (or touch screen), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1300 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor(s) 1304 executing one or more sequences of one or more instructions contained in main memory 1306. Such instructions may be read into main memory 1306 from another storage medium, such as storage device 1310. Execution of the sequences of instructions contained in main memory 1306 causes processor(s) 1304 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1310. Volatile media includes dynamic memory, such as main memory 1306. Example forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN (or wide area network (WAN) component to communicated with a WAN). Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

Merchant Location Service Based on Scan of User Unique Identifier Embodiment

Figure 14:
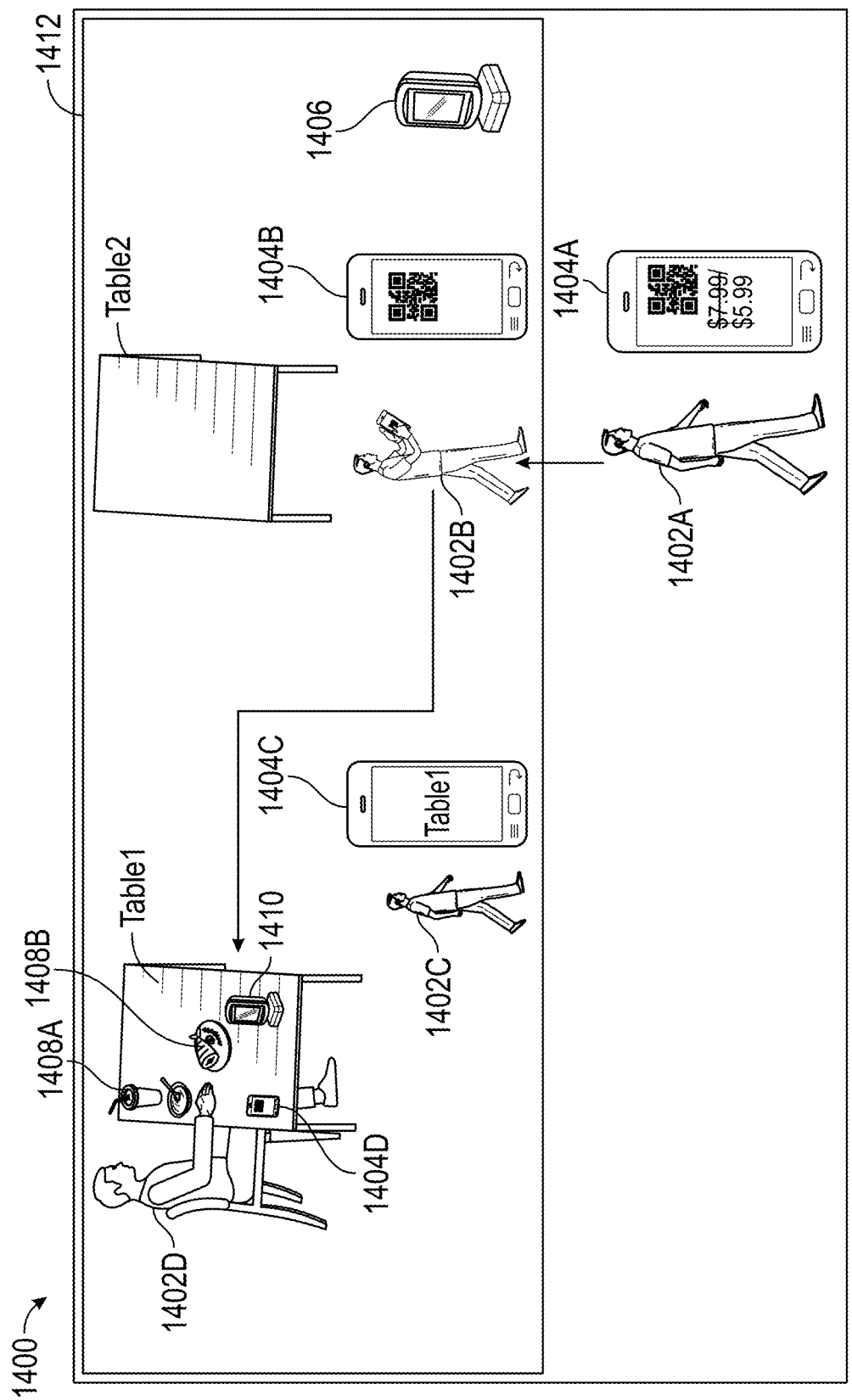
FIG. 14 illustrates an example of merchant location service based on a scan of a user unique identifier, according to some embodiments.

FIG. 14 illustrates an example 1400 of merchant location service based on a scan of a user unique identifier, according to some embodiments. In some embodiments, the database system can identify a change in a user record or a query to the database corresponding to a user 1402A, 1402B, 1402C, 1402D (collectively referred to herein as user 1402). In response to the change or query, the database system can generate an event notification, such as an indication of a promotion for a restaurant.

In some embodiments, the event notification can be displayed on a user device 1404A, 1404B, 1404C, 1404D (collectively referred to herein as user device 1404). The user 1402A can view an event notification on the user device 1404A displaying a discounted price for a meal of $7.99 to $5.99. The user device 1404A can display a unique identifier, such as a QR code.

In some embodiments, the user 1404B can enter a merchant location 1412, such as a restaurant. The restaurant can include a QR scanner 1406 at the front of the restaurant. The user 1404B can scan the QR code displayed on the user device 1404B at the QR scanner 1406. Then, the restaurant system can determine what products or services the user is requesting.

In some embodiments, the restaurant system can determine available seating for the user. In other embodiments, the user 1402C can select a table on the user device 1404C. The user 1402C can view an available and/or assigned table (e.g., table 1) displayed on the user device 1404C. After the user 1402D is sitting at table 1, the user 1402D can scan the QR code displayed on the user device 1404D on another QR scanner 1410 on or near table 1. The other QR scanner 1410 can retrieve information that the user 1402D is sitting at table 1, and transmit the information to the restaurant system. The restaurant system can indicate to workers at the location that the user 1402D is sitting at table 1, and the staff workers can provide meals 1408A, 1408B, or other requested services or products, to the user 1402D.

In some embodiments, payment for the goods and services are made on the user device 1404. The user can store payment information, such as credit card information or other sensitive information, with the database system. Then, the database system can send payment via its own payment platform to the merchants. Advantageously, user payment information is not relayed to the merchant, providing enhanced data security and privacy. In some embodiments, the database system can employ data encryption technology when sending payment information to the merchants, that a user would typically not employ when sending credit card information to a merchant point of sale system. In some embodiments, the database system can facilitate payment by accepting payment from the user credit card on the cloud side. The merchant point of sale system would only receive the user's unique identifier (e.g., QR code) and the database system can separately make payment to the merchant. In other embodiments, the user can use third party online payment services separate from the database system.

In some embodiments, the database system can receive encrypted code, or a token, from a third party server, such as a bank server or payment platform. The third party server can perform tokenization by replacing sensitive data with unique identification symbols that retain the essential information about the data without comprising its security. The third party server can encrypt credit card information and generate a token that corresponds to the credit card information of a user to the database system. The database system can apply the token to point of sale systems, such that when a user makes a purchase at a point of sale system, the database system can transmit an indication of a payment amount to the third party server via the token. The third party server can initiate payment by decrypting the token and/or identifying credit card information corresponding to the token. Advantageously, only the third party server can have access to credit card information and other sensitive data, whereas the database system and the point of sale systems can facilitate transactions using the token.

In some embodiments, the database system can retrieve statistics on users at the vendor, such as preferred table seating. Users may prefer table 2 over table 1 for its close location to the front door. As such, the database system can indicate that the user sit at table 1 to allow others to sit at table 2. In some embodiments, the point of sale system local to the merchant can provide service at several service points (e.g., tables in restaurant, car wash stations) where each service point can include a unique identifier scanner. The user (e.g., shopper) can go to the user's favorite or convenient service point (e.g., table 1), and scan the code on his mobile device at the unique identifier scanner. The point of sale system can initiate service to be delivered to that service point. As each service point scanner can be associated with its own service point ID, and users are free to choose their service point of preference, and the merchant can get statistics on the most favorite service points of individual users. Then, the point of sale system can, at a later time, assign the user or reserve the service point for the user upon notice that the user is en route to the merchant location. In some embodiments, the database system can gather and analyze statistics on service points across a plurality of different users, and provide recommendations to the merchant (such as a recommendation to rearrange the location of the service points due to an unbalanced preference of service point locations). For example, service points that are close to the windows or entrances may be preferred by users. The system can identify this characteristic and angle and/or position service points (e.g., tables and chairs) to maximize user seating at these locations.

In some embodiments, collection of the user device 1404 and the QR scanners 1406, 1410 can eliminate or reduce the need for a host at a restaurant. The user 1402 can place orders, receive discounts and promotions, be assigned seating, and indicate readiness to receive goods and services without contact with a human, necessarily rooting the embodiments in computer technology (such as for car wash stations, window shopping to pick up orders, etc). Moreover, the embodiments described herein are not just performing actions that a human would perform, but performing such actions in a different and more effective way. The orders and promotions/discounts are performed remotely on a user device that connects to the database system. The database system identifies discounts and promotions specific for the user based on a user profile that includes information such as loyalty points, distance from the merchant location, referrals, last visit statistics, and/or other characteristics described herein related to smart pricing and/or discounts/promotions. Advantageously, prices are personalized to the user, and different users may receive different event notification contents, with different pricing and discounts/promotions. The personalized prices and/or discounts are provided to the user remotely and can incentivize users to visit the merchant store differently (e.g., 50% discount for 5 miles away to a first user based on the first user conversion rate vs. 25% discount for a user who frequently visits the store to a second user after not having visited the store in several weeks). Thus, targeted advertising can be much more efficient and specifically tailored to the needs of the user.

Figure 15:
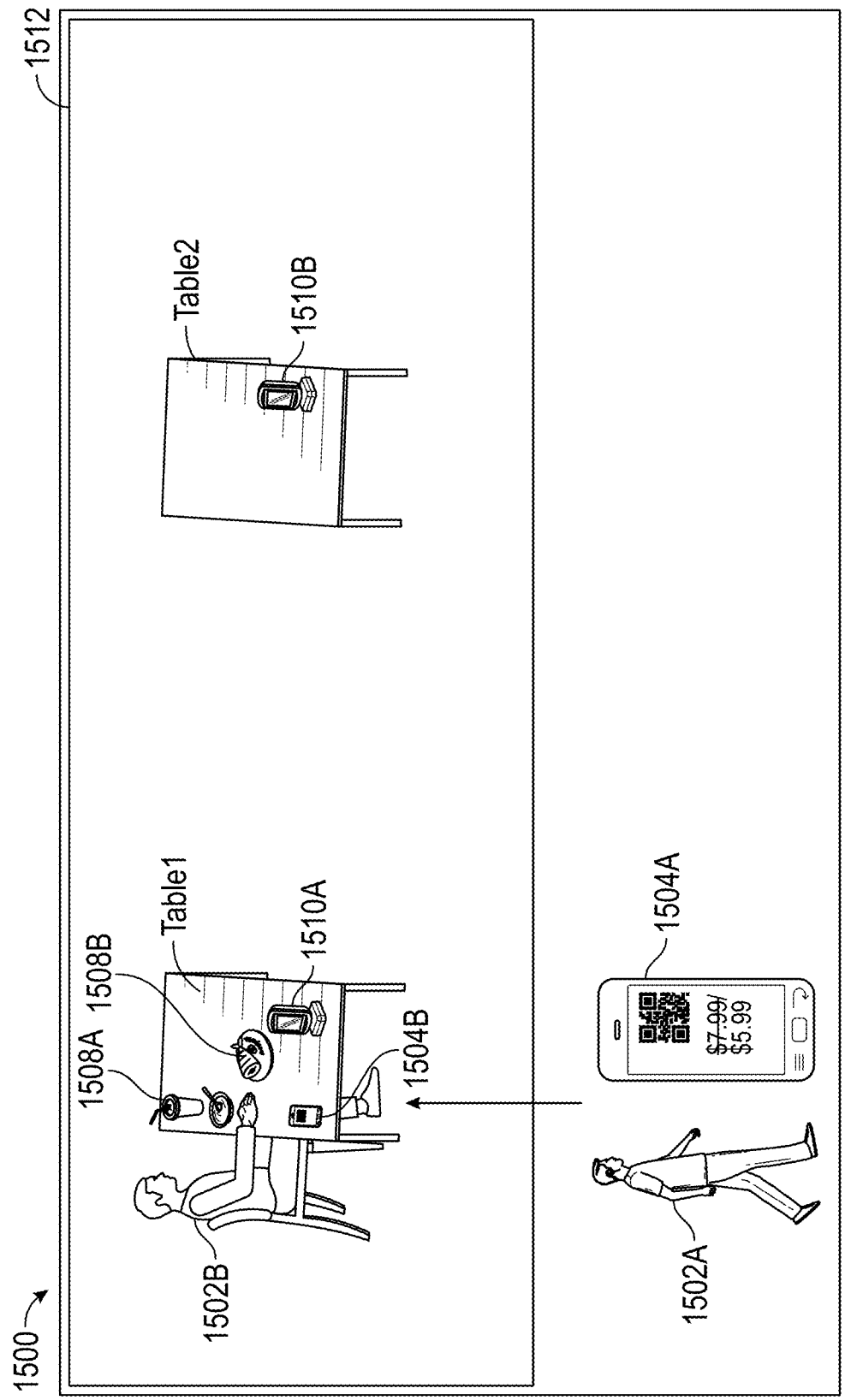
FIG. 15 illustrates an example of merchant location service based on a scan of a user unique identifier at a table location, according to some embodiments.

FIG. 15 illustrates an example 1500 of merchant location service based on a scan of a user unique identifier at a table location, according to some embodiments. In some embodiments, the database system can identify a change in a user record or a query to the database corresponding to a user 1502A, 1502B (collectively referred to herein as user 1502). In response to the change or query, the database system can generate an event notification, such as an indication of a promotion for a restaurant.

In some embodiments, the event notification can be displayed on a user device 1504A, 1504B (collectively referred to herein as user device 1504). The user 1502A can view an event notification on the user device 1504A displaying a discounted price for a meal of $7.99 to $5.99. The user device 1504A can display a unique identifier, such as a QR code.

In some embodiments, the user 1504B can enter a merchant location 1512, such as a restaurant. The restaurant can include a QR scanner 1510A, 1510B (collectively referred to herein as QR scanner 1510) at one or more tables, such as table 1 and table 2. The user 1504B can scan the QR code displayed on the user device 1504B at the QR scanner 1510A. Then, the restaurant system can determine what products or services the user is requesting. The QR scanner 1510A can retrieve information that the user 1502A is sitting at table 1, and transmit the information to the restaurant system. The restaurant system can indicate to workers at the location that the user 1502A is sitting at table 1, and the staff workers can provide meals 1508A, 1508B, or other requested services or products, to the user 1502B.

Point of Sale (POS) System Embodiments

Figure 16:
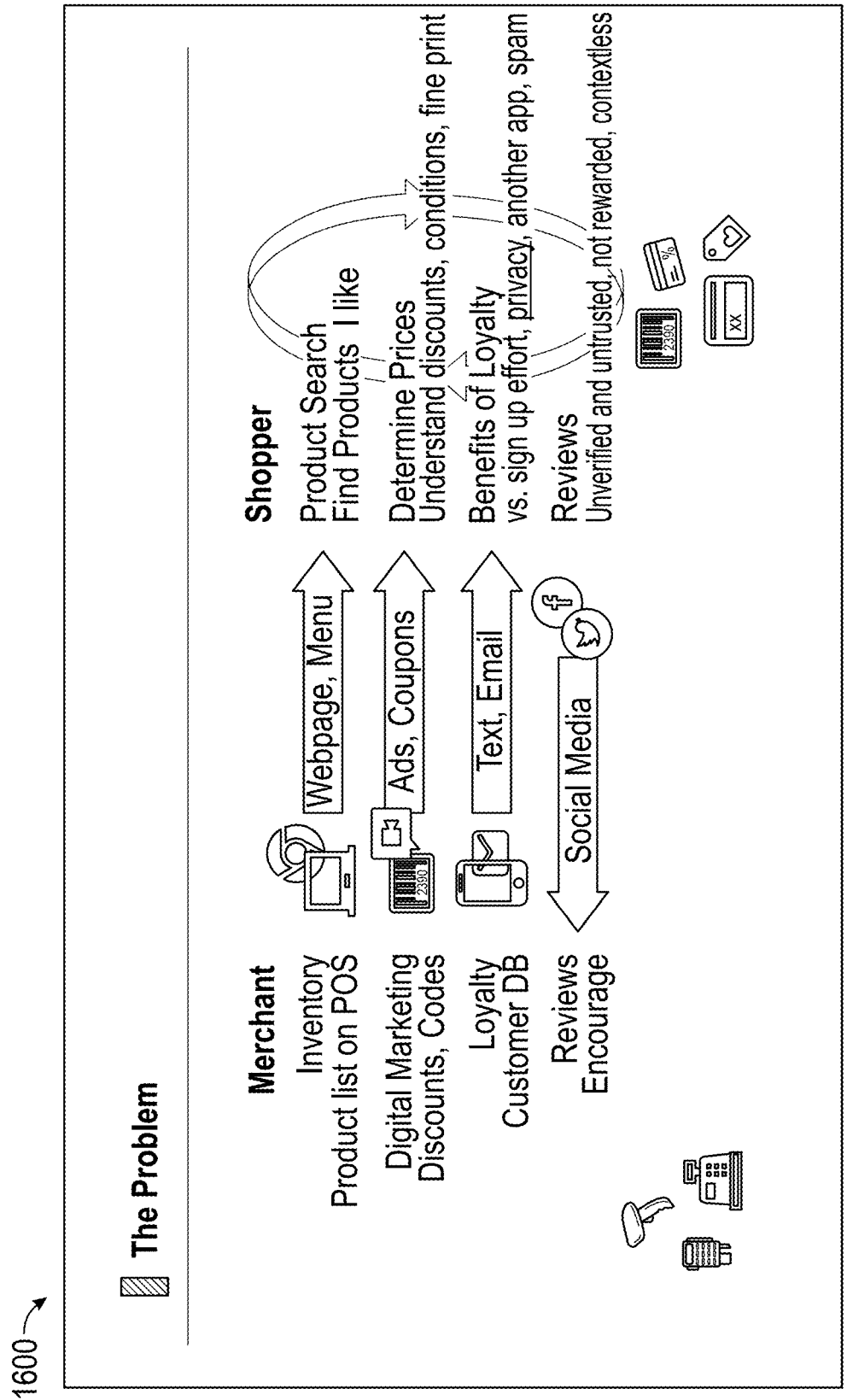
FIG. 16 illustrates an example of a traditional point of sale system between the merchant and the shopper.

FIG. 16 illustrates an example of a traditional point of sale system between the merchant and the shopper. The merchant can operate a point of sale system where inventory of products can be stored on the point of sale. The point of sale system can generate a website and menu options to display inventory and enable users (or shoppers) to search and find products of interest. In some embodiments, the merchant point of sale system can reside fully or at least partially on the cloud. For example, inventory and user query on the merchant websites or the mobile applications can be stored in the server.

The point of sale system can generate digital marketing discounts and codes and display advertisements and codes to the shopper. The point of sale system can determine loyalty points of a user using the point of sale system for the merchant. The point of sale system can provide a platform for users to provide reviews and engage in social media activity on the merchant's point of sale system. In some embodiments, the point of sale system can provide an end discounted price to the user. The user can be notified of a breakdown or actions required to receive an even better price, such as a special discount for referrals. As such, the user can get more transparency on price using a single QR code, and can have other optional prices based on further action by the user.

However, such traditional point of sale systems are limited to the data that the merchant has on the user, such as the user's prior search history on the merchant's website or the merchant's activity on the website. The point of sale system typically provides coupons general to all users, such as a 25% off sale between April 1 through April 15$^{th}$. Moreover, the reviews and loyalty points are also limited to the merchant's database and point of sale system related databases.

Moreover, for a database system to integrate to these merchant point of sale systems to overcome these technical disadvantages can be difficult from a technical standpoint. Each merchant point of sale system can differ in communication methods and channels. For example, certain point of sale systems can use certain communication protocols over others, store certain information or not store certain information that others do or don't, may relay information upon a user performing a first action but not when a user performs a second action, and/or the like. Such integration across different point of sale systems can cause inefficiencies in communication between databases and missing data entries.

Figure 17:
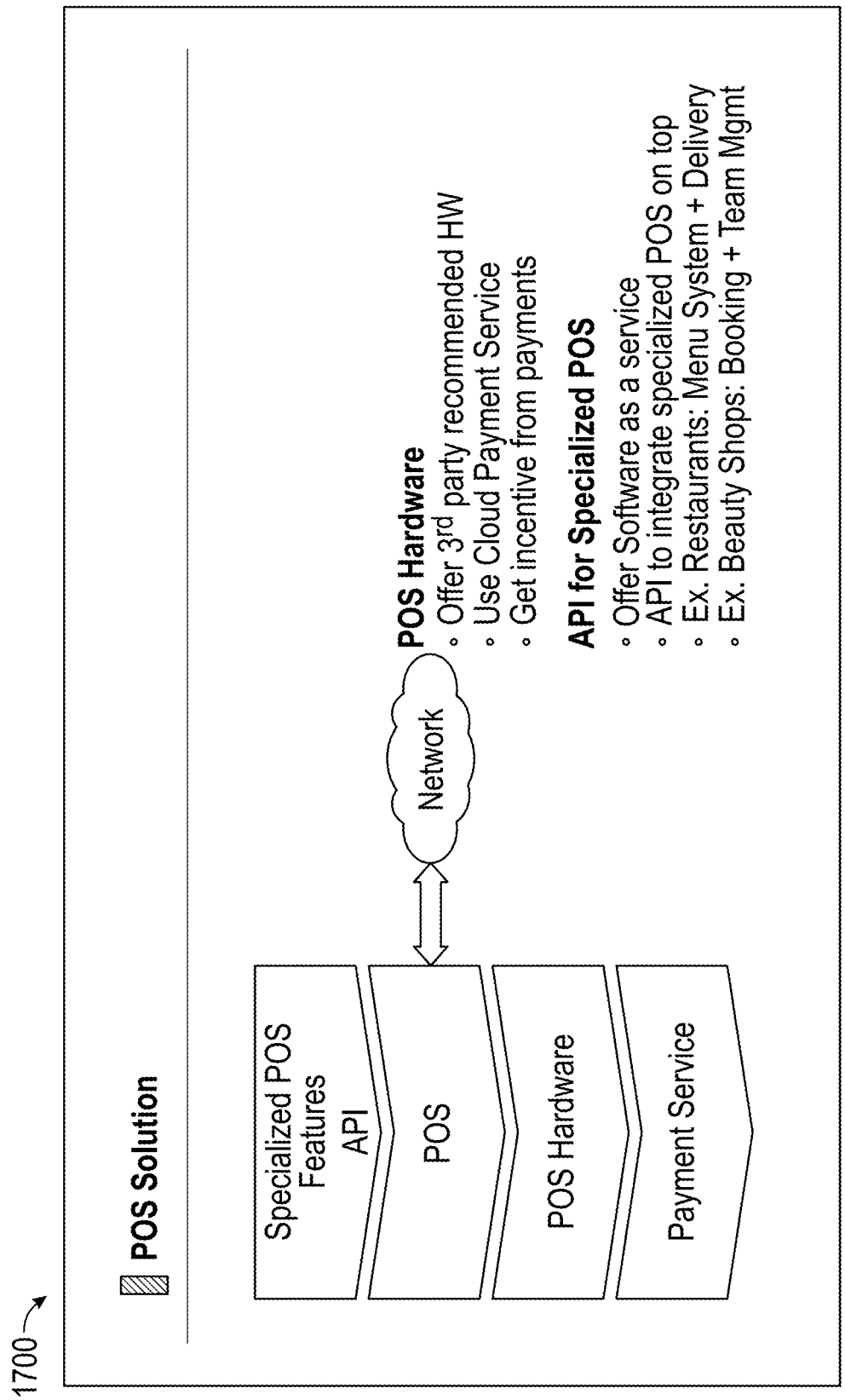
FIG. 17 illustrates an example of a point of service solution, according to some embodiments.

FIG. 17 illustrates an example 1700 of a point of service solution, according to some embodiments. The database system can include point of sale software to integrate with existing point of sale software and/or a standalone point of sale software. The point of sale software that integrates with existing point of sale software can integrate without having the merchant change their point of sale systems. For example, the database system can provide features to existing point of sale systems (via software and/or hardware) for checkout service to make payment on behalf of the user.

In some embodiments, the point of sale software is executed by one or more processors on a terminal (e.g., tablet, phone, personal computer, etc.), with point of sale hardware, such as associated hardware including a QR scanner, near field communication (NFC), receipt printer, cash drawer, scales, etc. The point of sale software can include software running locally at the point of sale and/or software running on a remote server or on the cloud server. The terminal can be connected to the network to access a merchant account and can provide a merchant interface to access the cloud point of sale server. Sensitive information (such as personal identifiable information for the user) and/or all sensitive processing (such as the processing of such sensitive information) can be performed remotely to provide data security on sensitive information.

Cloud Based Point of Sale (POS) System Embodiments

Figure 18:
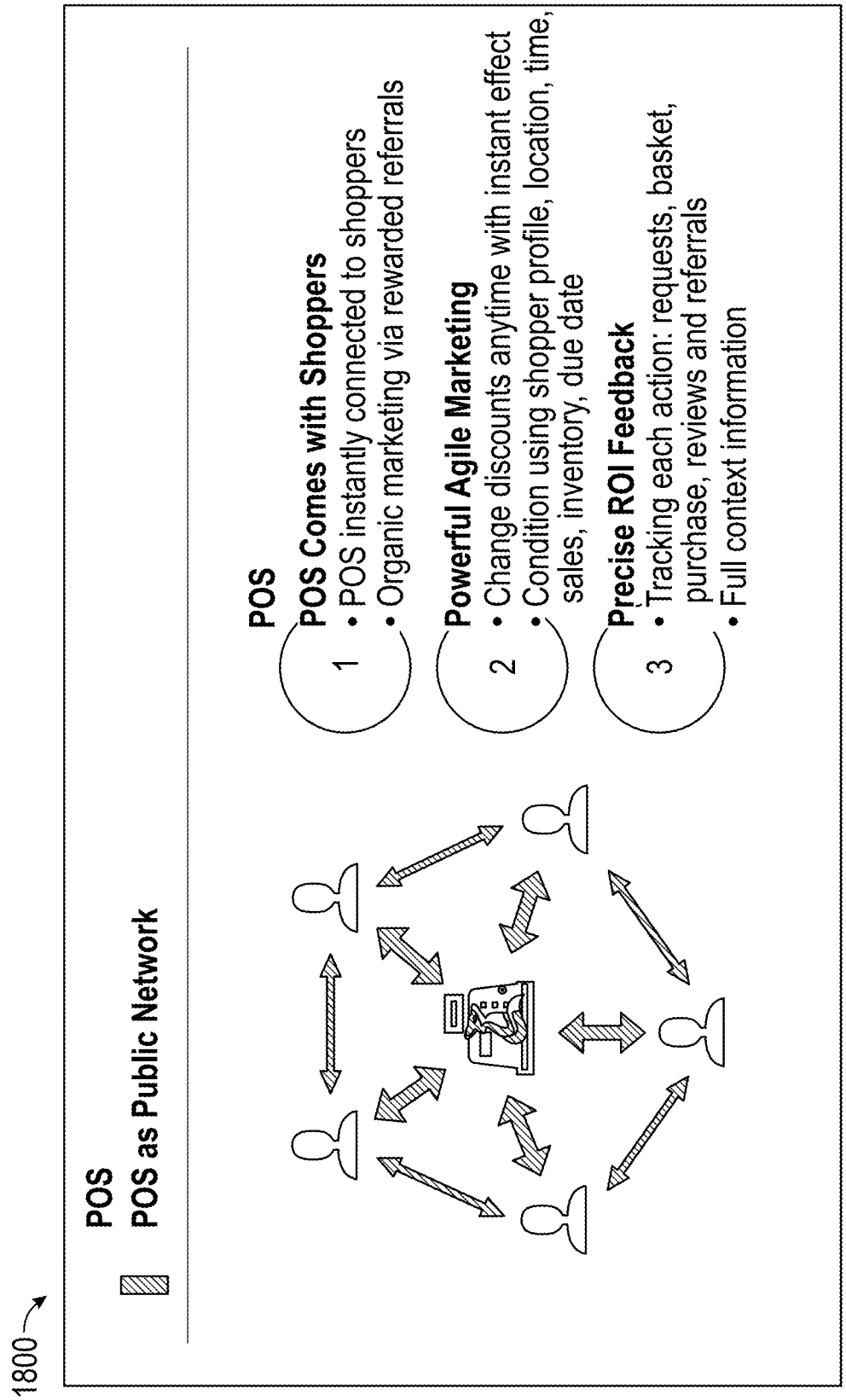
FIG. 18 illustrates an example of a cloud based point of service solution, according to some embodiments

FIG. 18 illustrates an example 1800 of a cloud based point of sale solution, according to some embodiments. The database system can include a cloud based point of sale system. The cloud based point of sale system can include databases with data records for users. The data records can include information on the users, such as loyalty points, geolocation data, referrals given to and provided from the user, visit or purchase histories, reviews, and/or the like. Moreover, the database system can provide return on investment (ROI) feedback by tracking each action taken by the user, including requests, placing items into a basket, purchases, reviews, and referrals to provide full contextual feedback for users. The databases can include algorithms for smart pricing or discounting/promotions as further described herein.

In some embodiments, the point of sale system and/or software can reside locally to the merchant and can connect to the database system to connect to shoppers via the database system. The point of sale system can access the database system to request appropriate promotions and discounts for the user, such as based on a user's profile, location, time, sale, inventory, or due date. Advantageously, because such sensitive user data resides on the remote database system, and the database system provides the end amount of the event notification content (e.g., discount) to the local point of sale system, sensitive user data does not have to be distributed to the point of sale system, reducing the amount of needed memory store at the local point of sale system, reduces network requirements (e.g., throughput) and processing power by having the database system process the data and only transmitting the output to the point of sale system, and sensitive data can be stored at a far more secure location on the database system side instead of having to have all point of sale systems needing to encrypt and safely store/process sensitive user data.

Figure 19:
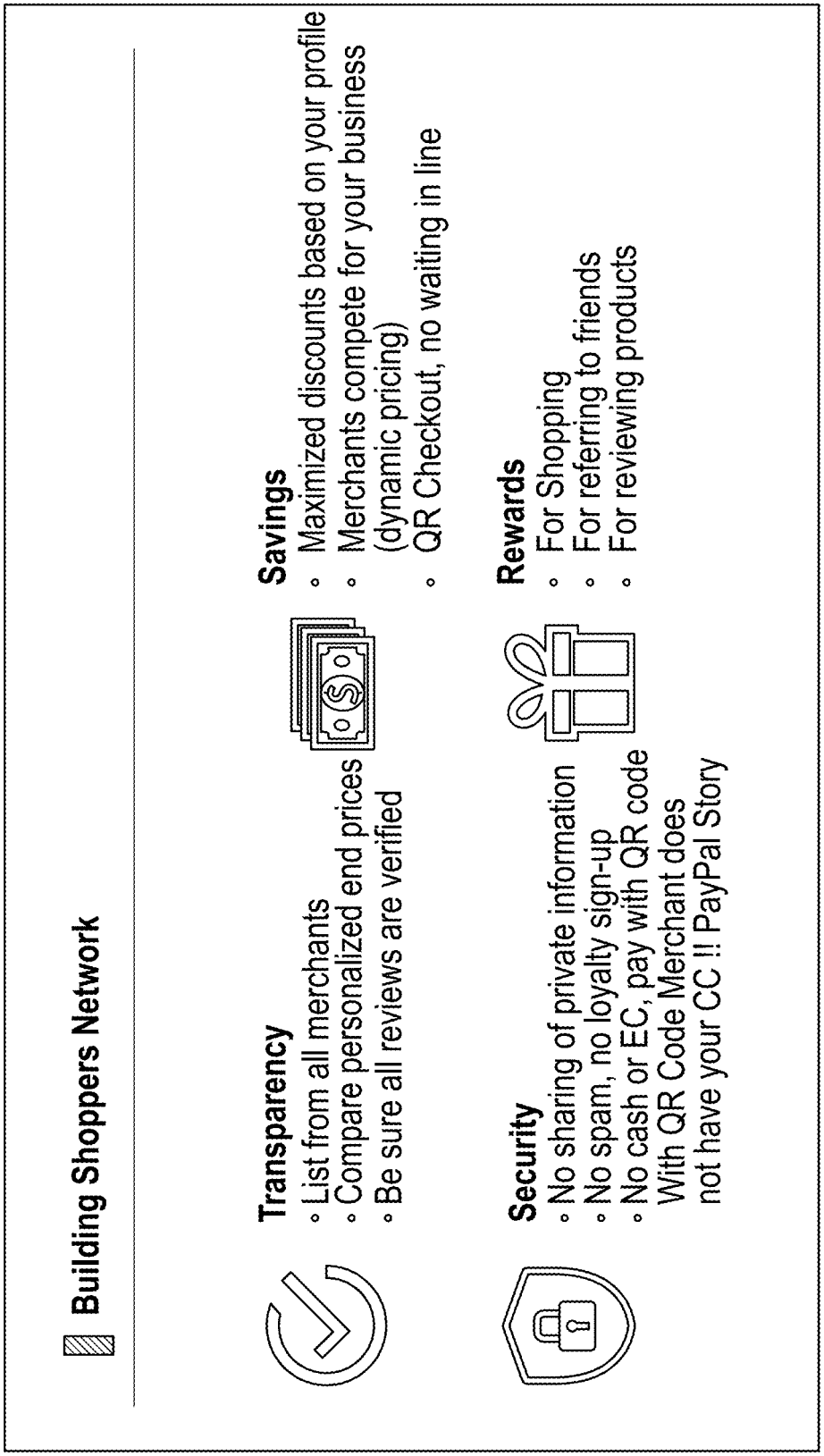
FIG. 19 illustrates an example of advantages from a cloud based point of sale solution, according to some embodiments.

FIG. 19 illustrates an example 1900 of advantages from a cloud based point of sale solution, according to some embodiments. The cloud based point of sale system can provide data transparency to systems not previously available. For example, the cloud based point of sale system can provide the user with a final price for each merchant that is specific to the user for the goods or services that the shopper searched for in a database query. The user can compare offers on a single list based on the final price without analyzing coupons, loyalty points, and/or other types of promotions. The cloud based point of sale system can enable review of the goods or services only after the user makes the purchase.

In some embodiments, the cloud based point of sale system can provide savings for the user. The final price can be a personalized price for that specific user, and not to other users, on-demand, and can include discounts for the merchant that the user qualifies for. The all inclusive list can limit the amount of time the user spends searching for each merchant individually, reducing the amount of user interfaces that the user needs to sort through. The point of sale systems for the merchants can change discounts and promotions at any time. Moreover, given that the user can simply scan a QR code at the merchant scanner, the user does not have to wait to checkout in real time.

In some embodiments, the cloud based point of sale system can provide security by not sharing personal information with the merchant. The cloud based point of sale system can maintain user data related to loyalty programs and personalized offers. Moreover, the cloud based point of sale system can reduce the amount of spam that is distributed by the merchant. The QR code payment can be associated with a single payment, and as such, the merchant can only qualify for that single payment instead of having access to sensitive information enabling the merchant (or other hackers) to make subsequent unintended payments.

In some embodiments, the cloud based point of sale system can provide can provide loyalty points to the user for purchases at the point of sale system in the merchant location. The cloud based point of sale system obviates the need to sign up for a loyalty point system or a punch card to keep track of purchases. The cloud based point of sale system can provide enable users to refer friends or post reviews through the cloud based point of sale system, and avoid information of referrals or reviews to be stored at the merchant's point of sale system. Such referral and/or review activity can be a factor in determining smart pricing for the user.

Smart Pricing Embodiments

Figure 20:
FIG. 20 illustrates an example of smart pricing for an event notification content, according to some embodiments.

FIG. 20 illustrates an example 2000 of smart pricing for an event notification content, according to some embodiments. In some embodiments, the event notification content can include a final discounted amount, such as $5.45 from the $8.99 original price. Upon acceptance by the user, the database system can provide a unique identifier, such as a QR code, NFC, or other identifier communication, to the user to use at the vendor site. The database system can provide the unique identifier to the point of sale system local to the vendor with information corresponding to the final discounted price. As such, when the user uses the unique identifier at the point of sale system at the vendor site, the point of sale system automatically knows the final discounted price. Advantageously, only the finalized discounted price is required to be transmitted and stored by the point of sale system. Moreover, the discounted price at the point of sale system can be specific to the users and not available for other users (e.g., because of the user's loyalty or close proximity to the vendor).

Figure 21:
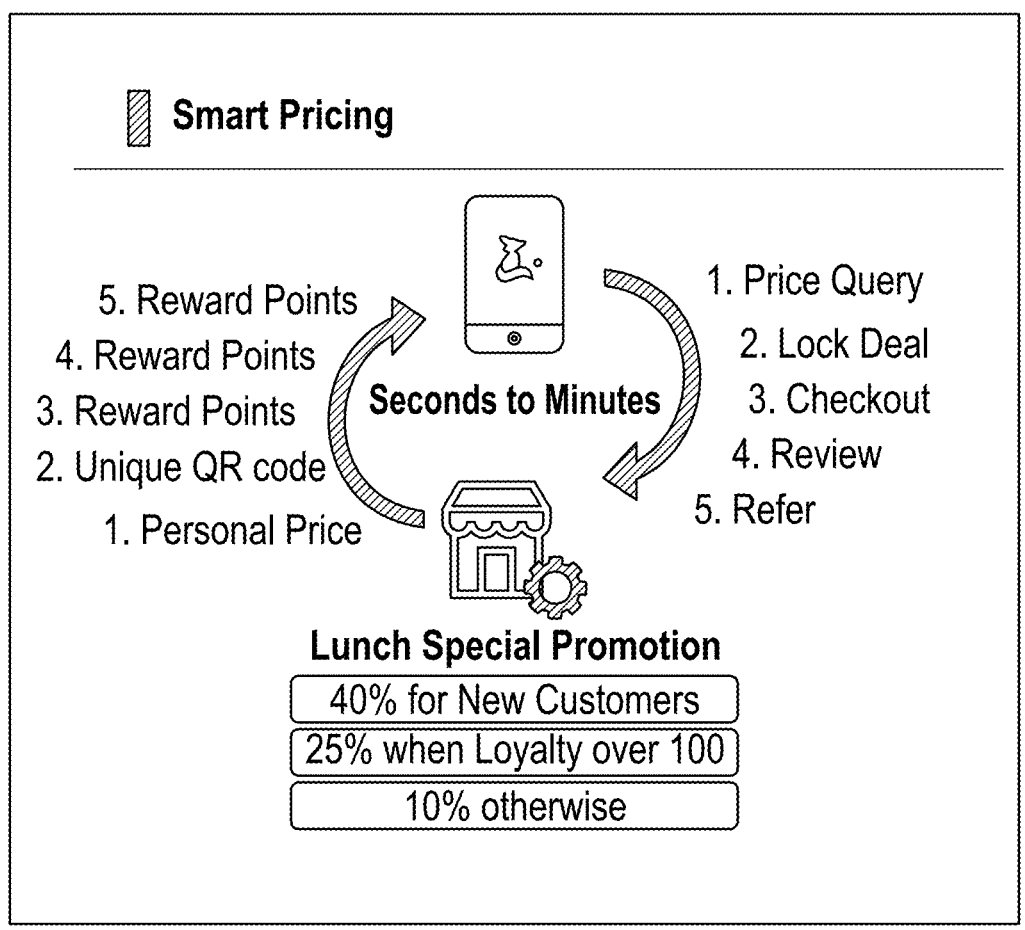
FIG. 21 illustrates an example of almost instantaneous on-demand smart pricing for an event notification content, according to some embodiments.

FIG. 21 illustrates an example 2100 of on-demand smart pricing for an event notification content, according to some embodiments. The database system can deliver event notification contents in a format that is personalized with a finalized price for a specific product or service that is specifically tailored to the user.

In some embodiments, the database system can determine pricing and/or promotions/discounts based on generation of user interest, accepting and redeeming of user event notifications, referring of vendor promotions, and reviewing of vendor products and/or services. Smart pricing can be based on one or more factors, as described herein (such as new customers, loyalty, or otherwise general promotions or discounts). In some embodiments, smart pricing can be applied to a discount, coupon, voucher, and/or promotion.

In some embodiments, the smart pricing can be initiated by a database inquiry, such as a price inquiry, or a change to a database record, such as a geolocation distance from the vendor. The database system can lock in a deal for the user, perform checkout for the user, provide a review platform for the user, and/or provide a platform for user referral.

In some embodiments, the user can build an order (basket) including a plurality of product/services offered by same merchant and merchant location. Each product/service in the basket can be accepted by shopper and receive a single or a plurality of unique IDs to lock the generated price. For the single unique ID, the database system can generate a basket unique ID to identify the list of items. The basket unique ID can be used in same way as single product/service ID by shopper as described herein.

Multi-Function Single Scan Embodiments

Figure 22:
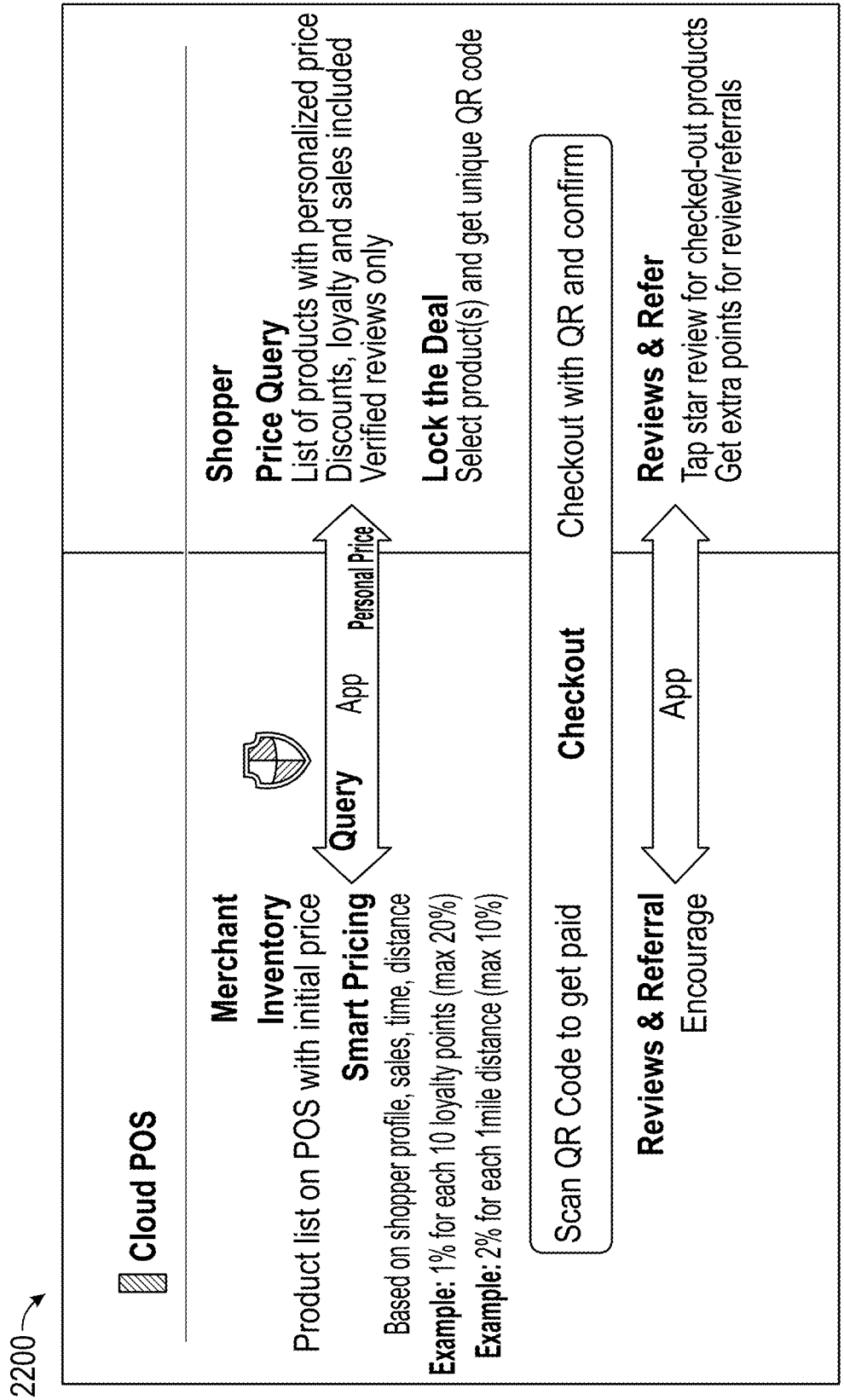
FIG. 22 illustrates an example of ordering, discounting, and checking out in a single scan of a unique identifier, according to some embodiments.

FIG. 22 illustrates an example 2200 of ordering, discounting, and checking out in a single scan of a unique identifier, according to some embodiments. The database system can enable simplified checkout using a single unique identifier. For example, the user can submit a database query requesting for a list of products with a personalized price. The database system and/or the point of sale system local to the merchant can search its inventory and generate a list with an initial price. The database system can generate discounts, loyalty points, sales, promotions, and reviews (e.g., verified reviews) that are specific for the user on the products that are searched.

In some embodiments, the database system can generate smart pricing for the user. The pricing can be based on a variety of different factors, such as data in a user profile, prior sales with the merchant or product, time intervals from the last visit or sale, and/or distances from the merchant location. For example, a 1% discount can be provided for each 10 loyalty point with a maximum of a 20% discount. A 2% discount can be provided for each 1 mile distance, with a maximum of 10%.

In some embodiments, the user can select one or more products displayed in an application on a mobile device, and the user can receive a QR code. The user can scan the QR code at the merchant site. The database system (and/or other third party payment platform) can process the payment from the user to the merchant, such as via tokenization as further described herein.

In some embodiments, the user can apply a review (such as a star review). The database system can incentivize the user to provide reviews with additional points or discounts. The database system can request the point of sale system local to the merchant to provide the incentives that the database system can display to the user via a mobile phone application. The request for review can be displayed after purchase of the product and service in order to facilitate verified reviews only.

Group Pricing, Booking, Ordering, Rating Embodiments

Figure 23:
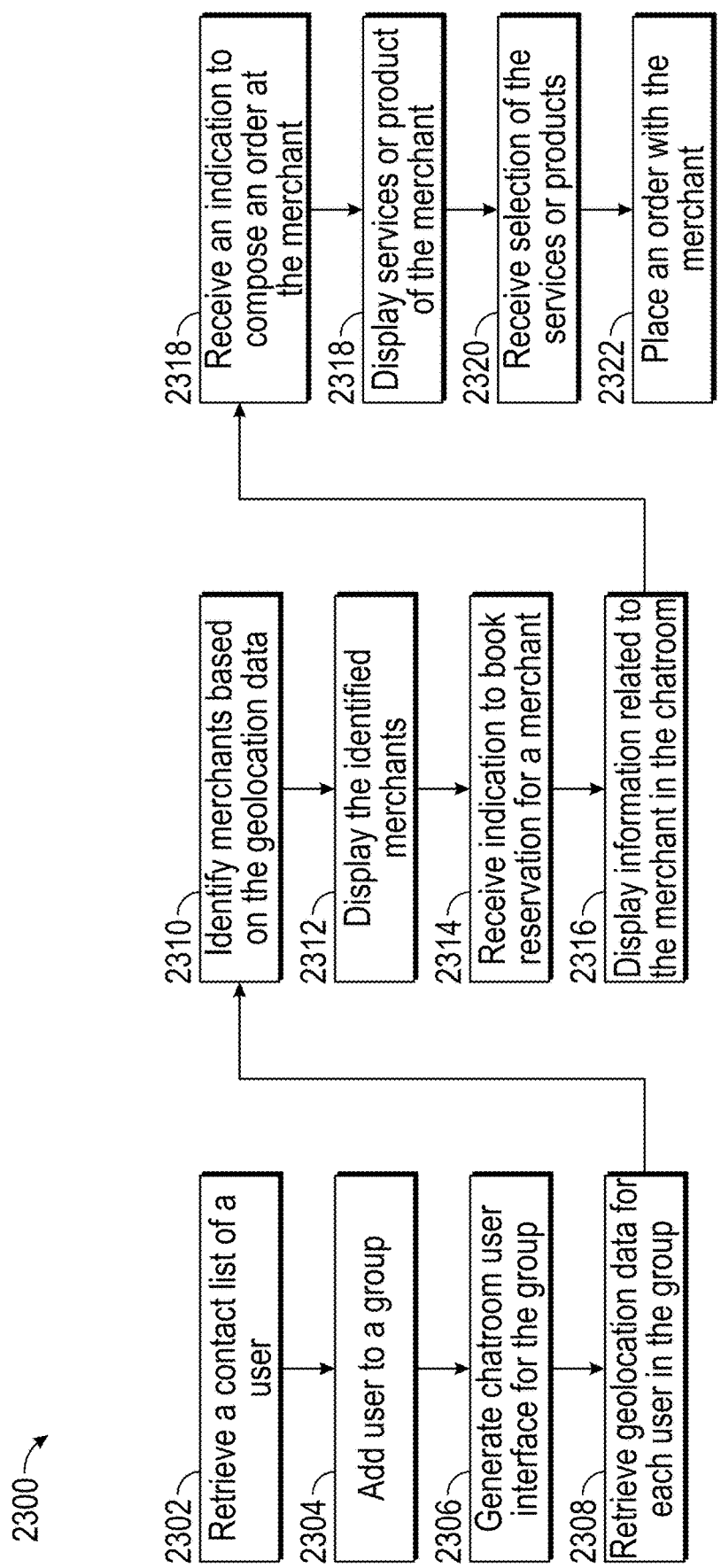
FIG. 23 illustrates an example flow diagram for group pricing, booking, ordering, and rating according to some embodiments.
Figure 24:
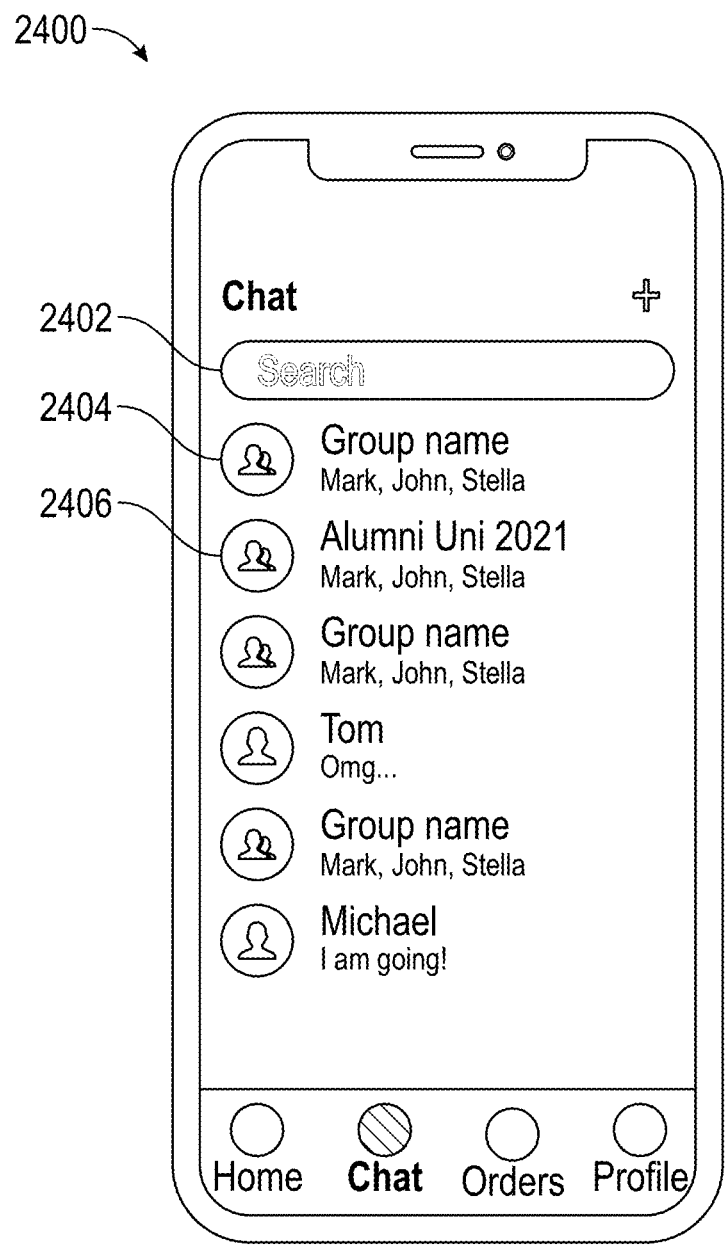
FIG. 24 illustrates a user interface illustrating user contacts that the user can request to join the group according to some embodiments.

FIG. 23 illustrates an example flow diagram 2300 for group pricing, booking, ordering, and rating according to some embodiments. At step 2302, the database system can retrieve a user's contact list to form a group for a group of users. In some embodiments, the database system enables users of a group to organize a group event and invite user's contacts to join the group. The user's contacts can be from a contact list such as from a user's mobile phone. FIG. 24 illustrates a user interface 2400 illustrating user contacts that the user can request to join the group according to some embodiments. The user interface 2400 can include a search function to search the user contacts on a user's mobile phone. The user interface 2400 can provide the user an option 2404 to name the group. The user can add an entire group 2406, such as the "Alumni Uni 2021 group," that was previously generated to the current group. At step 2304, the database system can receive an indication from the user to add a plurality of users to a group. The database system can then send an invitation to the plurality of users to join the group.

In some embodiments, the database system can enable users to define, in a user's profile, family members. The users can define family members each with their own set of preferences, restrictions, etc. Family members can share some of the characteristics with user—e.g., location, reviews, etc. In some embodiments, the user can specify which family members would be participating in the order and present at merchant site. The family members can contribute to the group-size based discounting.

In some embodiments, the database system can assign or facilitate assigning a group organizer, a user within the plurality of users of the group. The database system can receive an indication of the group organizer, such as based on a vote or via the group chat. The database system can allow the group order organizer to pay for the other users invited to join the group. The database system can allow the group organizer to set a maximum price for per person. The maximum price can include a price that other users are willing to pay. The database system can receive an indication from other users to order beyond the maximum price and can determine a payment that is beyond the maximum price for the group to provide to the other users.

In some embodiments, the database system can enable an organizer to invite (and pay for) guests, leaving them the flexibility of placing order themselves. The organizer can specify maximum costs per guest that he/she is willing to cover for. For example, for an office meeting or event where the team lead invites the team for dinner paying with a business credit card, where he/she is allowed to cover for up to $50 per person, during the split check, first a $50 per group member would be charged to organized, while each group member who spent over $50 would be able to cover the reminder using personal credit card.

In some embodiments, the database system can enable any member of the group to add or remove others to the group or event. The database system can enable the addition or subtraction of goods or services for purchase. The database system can enable only the organizer to add or remove individuals or goods/services. The database system may limit the group size to a maximum group size.

Figure 25:
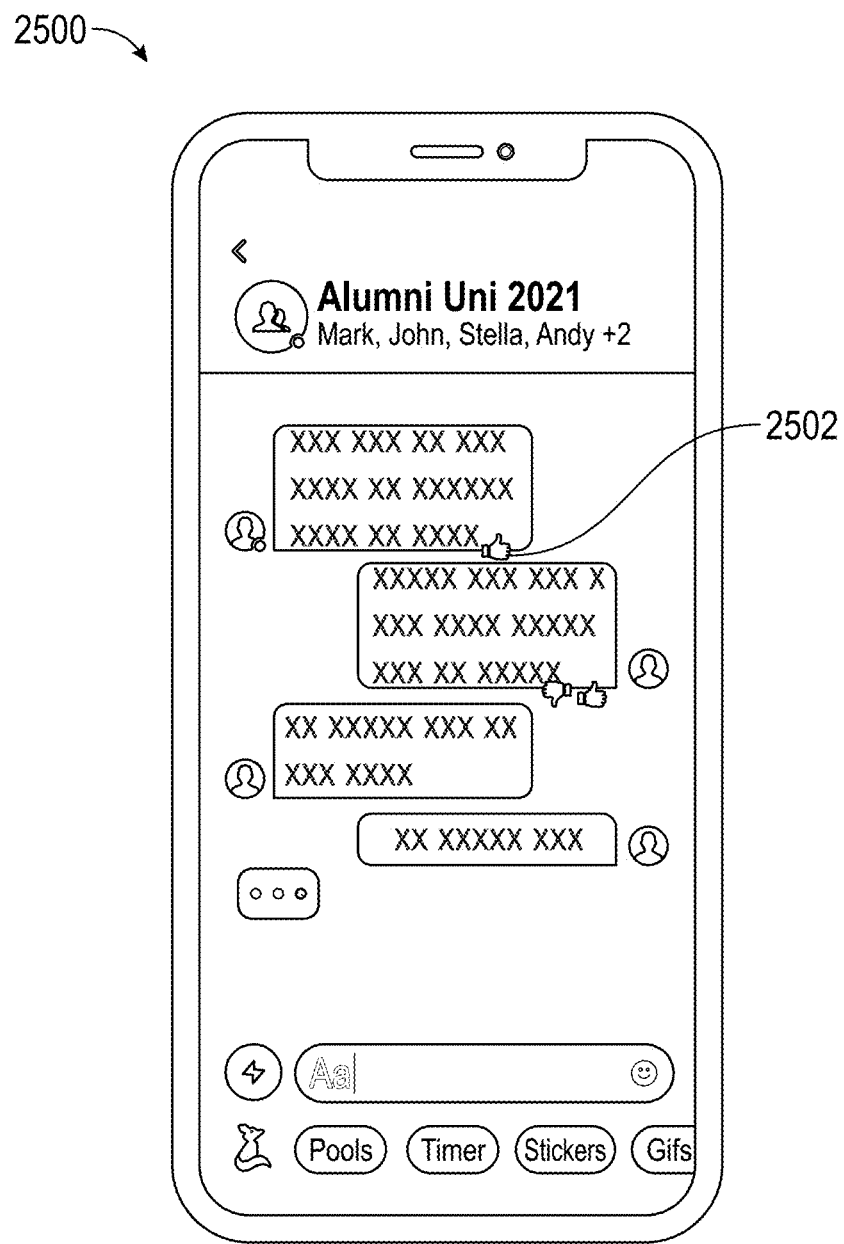
FIG. 25 illustrates a user interface illustrating a group chatroom interface according to some embodiments.

In some embodiments, at step 2306, the database system provides a chatroom user interface enabling users to input text, video, audio, location information, and/or the like. FIG. 25 illustrates a user interface 2500 illustrating a group chatroom interface according to some embodiments. The chatroom user interface can include built-in functionalities that allows the group to share websites and/or links to merchants, enable users to interact with other group members, provide suggestions or recommendations for the group, and/or the like. The chatroom user interface can enable the group to vote on a particular menu item or a comment 2502 by another user. The users can review or rate a merchant as a group.

In some embodiments, the users can be adding chat entries, photos, media, etc. to the group chat. Users can mark any from his/her own chat entry as a public review by tap-holding the chat entry and selecting merchant and/or product that the chat entry relates to. For example, the user can tap-hold a selected merchant available from the chat suggestions and add "Guys, those ribs were amazing" as well as a star-rating. The chatroom user interface can include a user interface for exporting event information into a social media account or feed. For example, the event organizer (or any user from the group, matter of permissions) can export the information gathered during event (merchants+time/date visited, photos form the group, selected chat entries, group orders, reviews left, public information about merchants and locations visited like street view of merchant, etc.) as a social media story/timeline or other social media entry. The chatroom user interface can include options to export to social media that may be linked to the database system, such as via login credentials.

Figure 26:
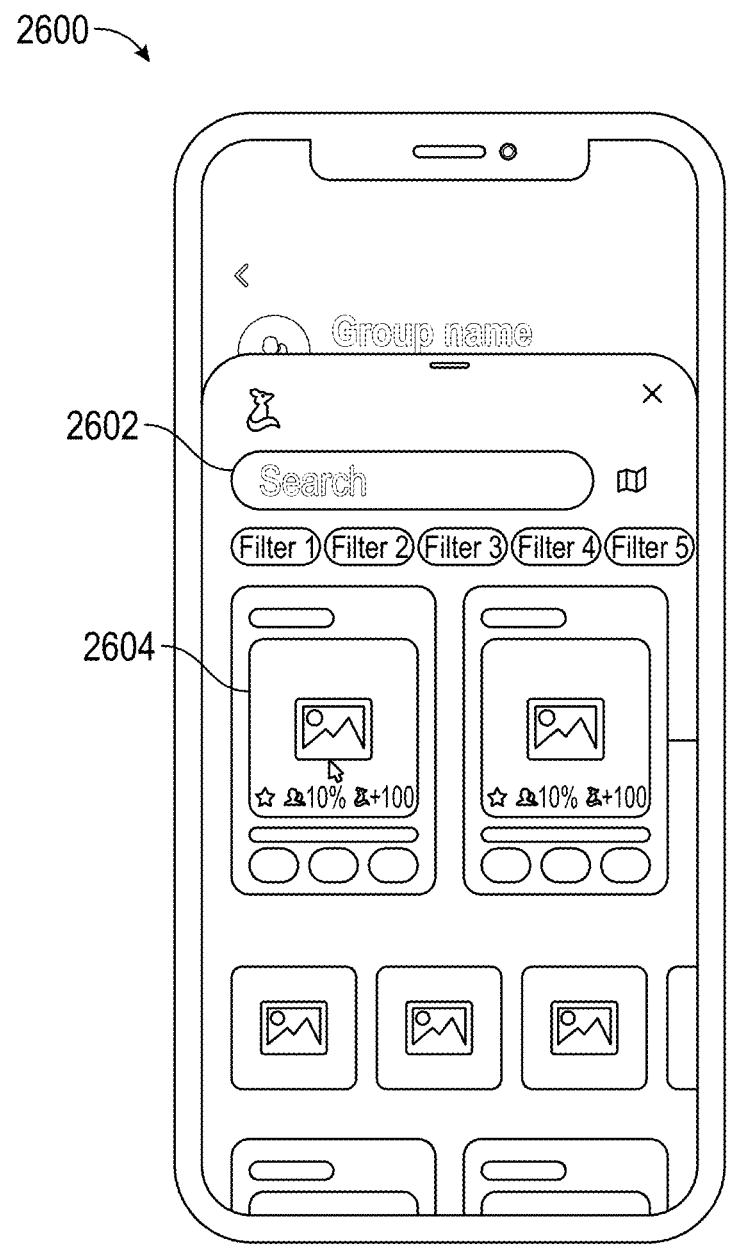
FIG. 26 illustrates a user interface illustrating a user interface for identifying merchants to propose to the group according to some embodiments.

In some embodiments, the chatroom user interface can include a button to add suggestions of merchants. FIG. 26 illustrates a user interface 2600 illustrating a user interface for identifying merchants to propose to the group according to some embodiments. The user can search for merchants using the search option 2602. The user may be presented with a list of merchants based on nearby places, suggested places for the group, history of last visited places, a map with location marking, and/or the like. The database system can include automatic suggestion on merchants based on whole group preferences, profiles, restrictions, location, calendars and calculating and indicating how well each of the suggested merchants fit to the whole group (or notifications about the same).

In some embodiments, a merchant can include a shop, retailer, service provider, attraction, rental, restaurant, Place Of Interest (POI), and/or the like. In some embodiments, the database system can provide recommendations based on a group of users. For example, the database system can suggest merchants or a set of merchants that the group can visit or items (e.g., food items, menu items, goods/services items) that the users can purchase. In some embodiments, the database system can automatically provide recommendations based on preferences, profiles, restrictions, activity history, past reviews and ratings, location, loyalty, and/or the like of the users in the group. For example, the database system can provide recommendations based on a user's sport or food preferences.

In some embodiments, the database system can provide suggestion on merchants automatically. The database system can consider factors of every member of the group based on his/her profile, current location, preferences, dietary restrictions, history of the reviews/ratings/other merchant visits, time, date, and/or the like.

In some embodiments, the database system can make suggestions on merchants and menu items based on a merchant's availability to provide products and services, inventory, availability for seating, products/services for the specific group size at the selected time and date, and/or the like. The database system can dynamically provide updates: e.g., the database system can send an alert informing if the group of this size can be accommodated for a lunch in the specific restaurant at given time/date.

In some embodiments, at step 2308, Global Positioning System (GPS) data can be retrieved from profile information of each user in the group. The geolocation data is generated from a global positioning system sensor of corresponding computing devices configured to communicate with satellites and to determine the geolocation of the computing device. The database system can retrieve geolocation data from computing devices of the plurality of users that have accepted the invitation to join the group. The GPS data can provide live information on the locations for each of the users in the group. The database system can identify nearby merchants to propose based on the distance of each user in the group. The database system can identify the locations of each user and nearby merchants, and determine recommendations based on distances to a merchant from each of the users in the group. The database system can identify a subset of merchants based on distances of each of the plurality of users to individual merchants and display the subset of merchants 2604 on the computing device. Thus, at step 2310, the database system can identify a subset of merchants based on distances of each of the plurality of users to individual merchants.

Figure 27:
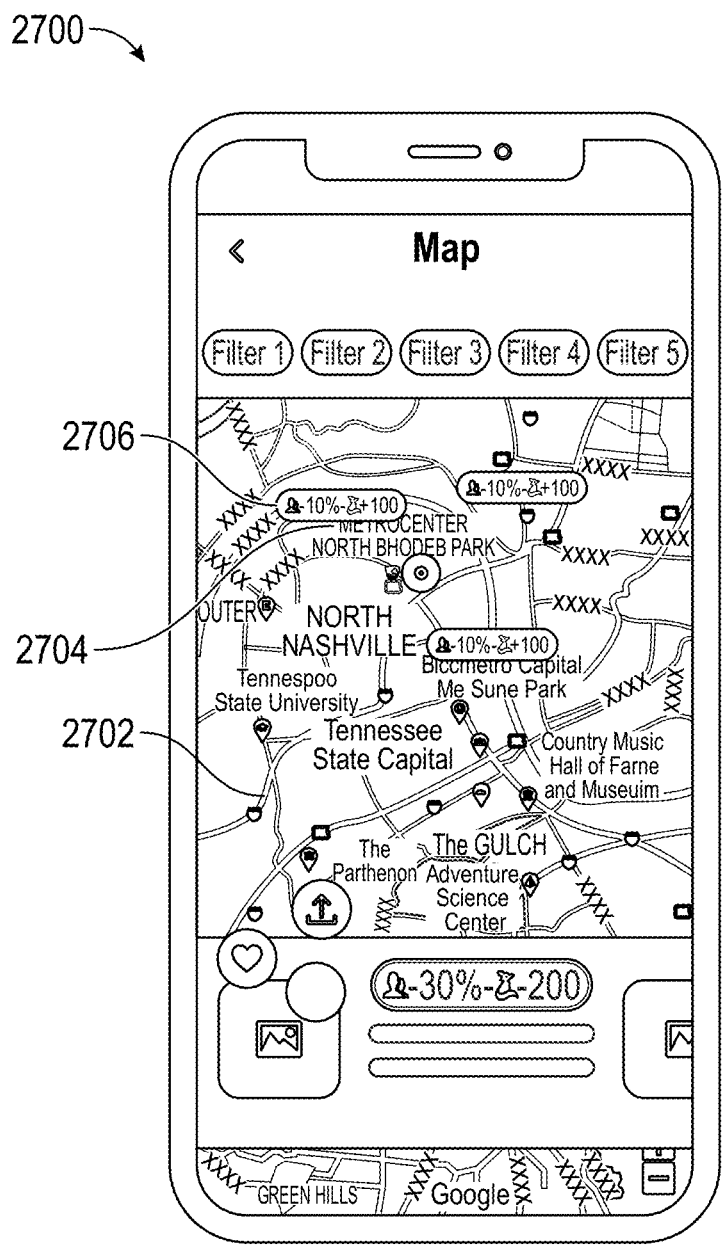
FIG. 27 illustrates an example user interface of the user and nearby merchants according to some embodiments.

FIG. 27 illustrates an example user interface 2700 of the user and nearby merchants according to some embodiments. At step 2312, the database system can display the subset of merchants identified based on geolocation data. The database system can display a map user interface 2702, wherein the map user interface displays the location for each of the subset of merchants 2704 and at least one characteristic of the merchant 2706. The at least one characteristic can include an expected discount, a loyalty point rating, or a group match score.

In some embodiments, the database system can generate a scoring for the recommendation. The scoring can be between a value of 0-100 for each characteristic of the user, where 100 is assigned for the best case value of the characteristic. For example, distance between user and merchant 0-2 miles may equate or correspond to a score of 100, distance 2-10 miles can be a linear function from 100-0 points, and 10+ miles equates to a score of 0 points. In another example, a place review left by user equates to a score of 100 points for 5 star, 0 points for 1 star, 50 points for no review. Reviews points might be also weighted based on how recent they are (e.g., more weight on more recent ones). In another example, dietary restriction and preferences can be applied. The user profile might contain user-defined set of preferences like favorite restaurant types, activity types, dietary restrictions (e.g., vegan, lactose or glucose intolerant, disability, etc.). Points assignment could be 100 points for matching merchant type, 50 for no preference nor restrictions met, 0 in case the merchant cannot provide sufficient service due to user restrictions. In yet another example, loyalty status of user at merchant place could be applied to calculate a score based on expected average of relative discount amount (e.g., 0 points for 0% with linear increase to 100 points for 50+% discount).

In some embodiments, the database system can calculate the weights for each of the characteristics. Weight from 0-100 can represent characteristics importance, which might depend on the amount of information available for the characteristic as well as how recent is the information. For example, reviews can be of high importance and thus weight on reviews score might differ in case no reviews are available from user. For example, 0 score for no reviews, 1-2 reviews may equate to a score of 50, and more reviews of 100+ equates to a score of 100. In another example, the database system can weigh dietary restrictions that are not met which might be high (100 points), while weight of a place that is not on the list of preferred ones based on user profile might be lower weight (50 points). The database system can calculate a user to merchant match as a weighted average based on calculations above. The database system can calculate a group fit score as an average from each group member match. The above examples can result in accurate matching of merchants that are best fit to whole group by assigning normalized score (0-100) for each merchant and allow to sort them based on the match.

Figure 28:
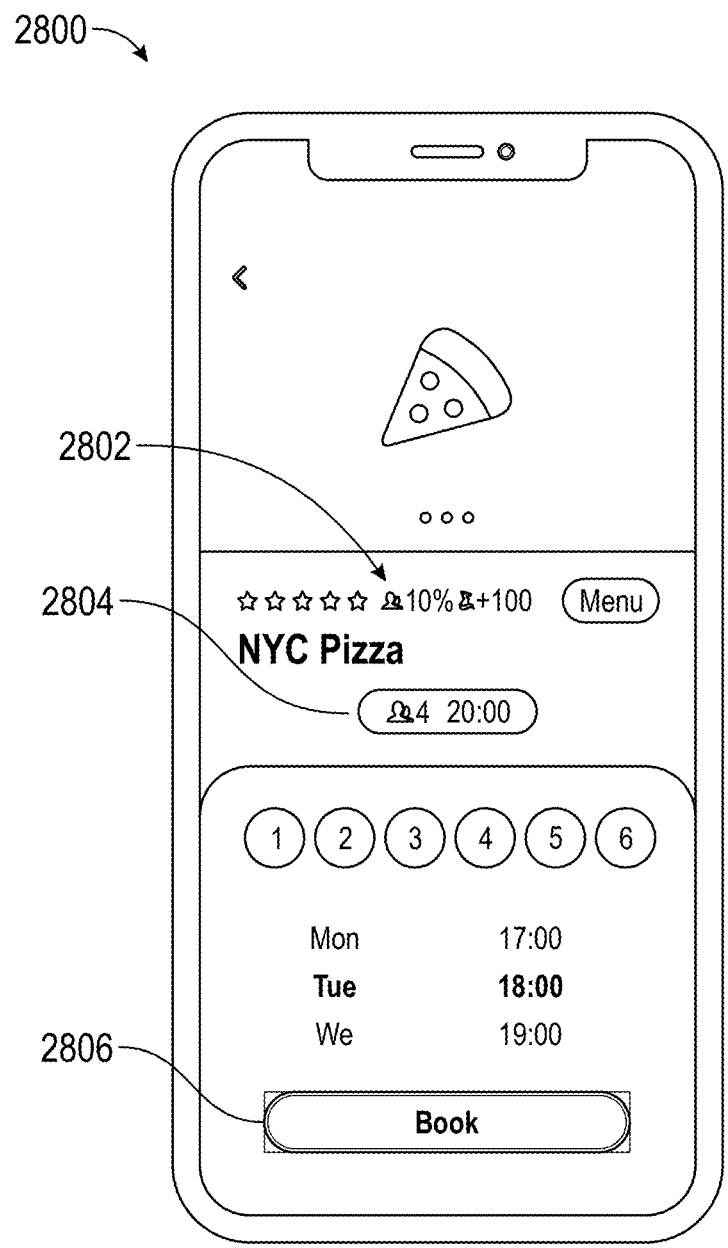
FIG. 28 illustrates a user interface that displays additional information on a merchant according to some embodiments.

In some embodiments, a user can select the place to learn details about the merchant. FIG. 28 illustrates a user interface 2800 that displays additional information on a merchant according to some embodiments. The user interface 2800 can display a break-down score 2802 of how well it fits each of user's friends. The merchant can provide a booking API for the database system to communicate with the merchant system. The database system can then display available booking times 2804 considering a group size for the group. The database system can receive availability for booking from a system of the merchant to retrieve booking availability; filter the booking availability based on the group size; and display the booking availability of the merchant on the computing device of the user.

Figure 29:
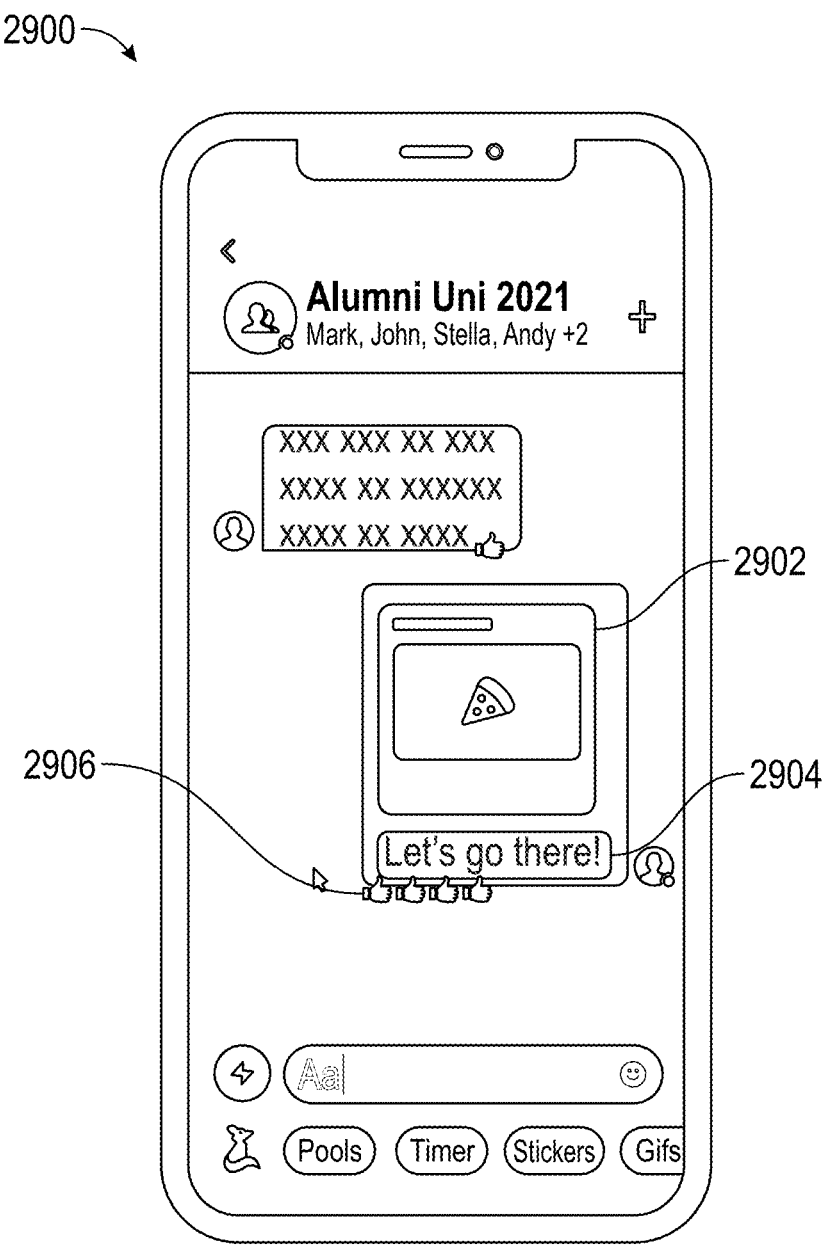
FIG. 29 illustrates a chatroom user interface that displays the suggestion for the merchant on the chatroom according to some embodiments.

In some embodiments, the user can select one of the booking times for the merchant and confirm sending as suggestion to the group. Suggestion can be presented with key details on the group-chat screen. FIG. 29 illustrates a chatroom user interface 2900 that displays the suggestion for the merchant 2902 on the chatroom according to some embodiments. The chatroom can enable users to provide comments 2904 on the merchant and voting options for the group 2906. Users can vote (like or dislike) each of the suggestions, which would be presented to everyone on the chat. The person that suggested the place can remove it from the chatroom. Each suggestion (merchant+date/time) can include have a booking confirmation button 2806.

Figure 30:
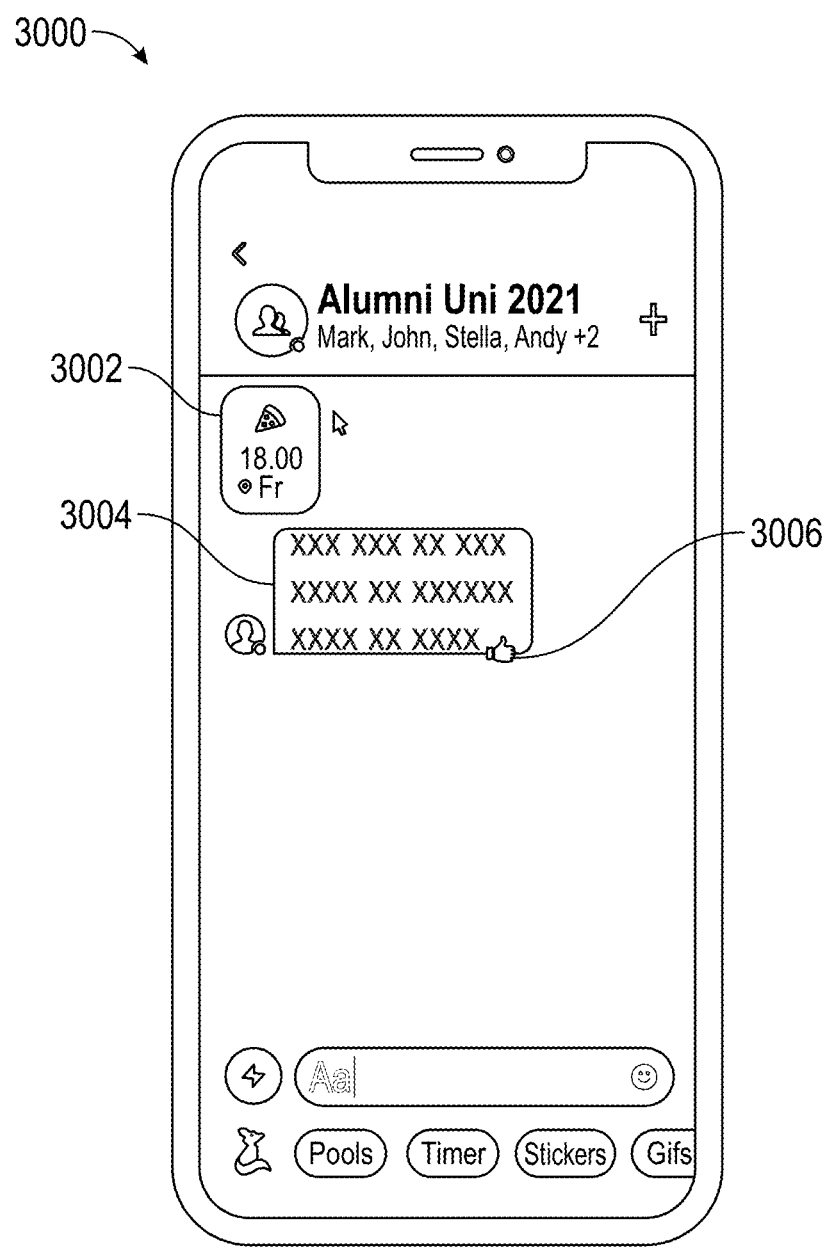
FIG. 30 illustrates an example chatroom user interface that includes the booked reservation of the merchant according to some embodiments.
Figure 31:
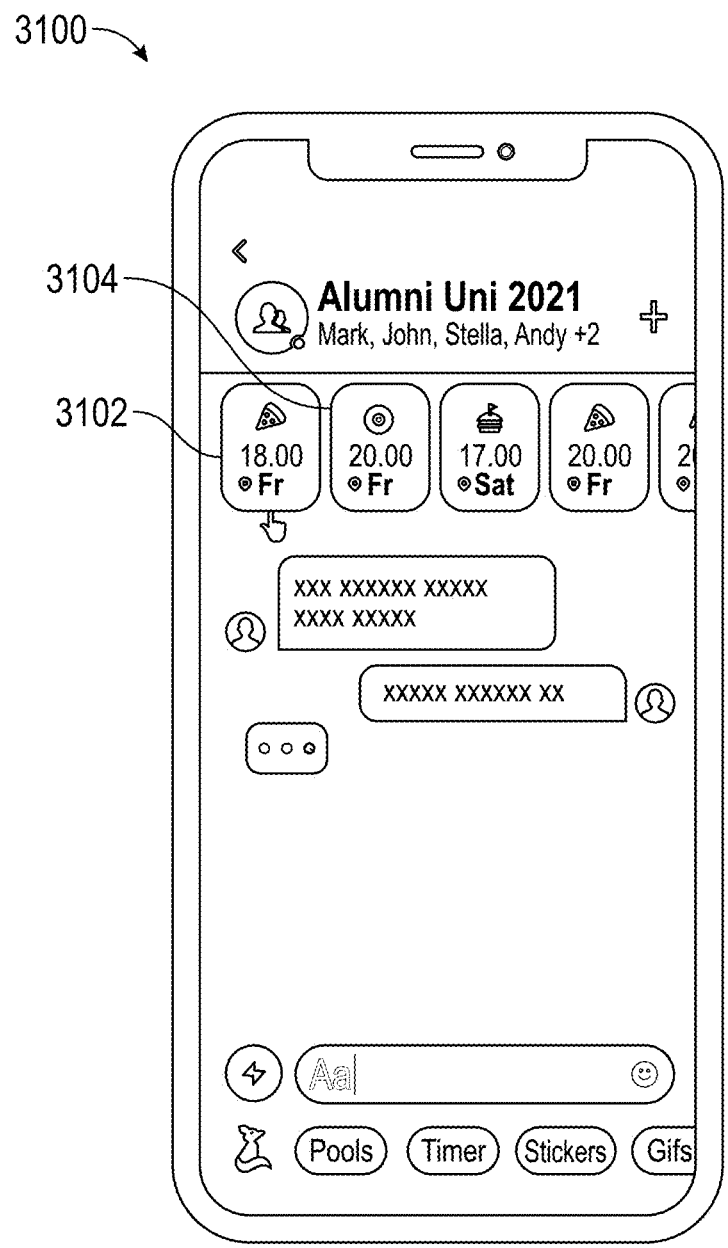
FIG. 31 illustrates an example chatroom user interface that includes multiple booked reservations of merchants according to some embodiments.

In some embodiments, at block 2314 the database system can receive an indication to book a reservation for the merchant via the booking confirmation button 2806. At block 2316, the database system can display information related to the merchant in the chatroom user interface. FIG. 30 illustrates an example chatroom user interface 3000 that includes the booked reservation of the merchant 3002 according to some embodiments. The members of the group can continue to add comments 3004 and votes 3006 in the chatroom user interface 3000. FIG. 31 illustrates an example chatroom user interface 3100 that includes multiple booked reservations of merchants 3102, 3104 according to some embodiments. For example, users can request pizza at 6 pm at one merchant 3102 followed by go-karting at 8 pm at another merchant 3104.

In some embodiments, the database system enables users to rate, review, and share the group's review as a group. The database system can collect star ratings for each member of the group via the chatroom. The database system can determine an average rating for the whole group by averaging the star ratings for each user. The ratings can be provided to other users searching for the same merchant. The rating for the group can be shown as a single rating. The rating can show characteristics of the group, such as the size of the group, the relationship between group members (e.g., family, friends), and/or the products or services ordered.

In some embodiments, the database system allows users of the group to suggest a date and time for the group to meet. The database system can provide a suggestion of one or more merchants. The database system can display merchant information with additional details such as address, menu, special offer, pricing list, discounts, and/or the like. Merchant information can be displayed side by side for easy comparison. The database system can enable the group to vote, rate, discuss and decide on the place to visit. Example of how suggestion from user (merchant selection+time/date) details might look like is shown on the interface below (Merchant card above group chat). A suggestion about a time/date might be made based on user's calendar data pulled from a user's phone data, calendar profile data, and/or the like.

In some embodiments, at block 2314 the database system can receive an indication to compose an order at a merchant. For example, users can start composing orders at any merchants that was suggested (adding products to cart). The database system can restrict combined group orders to only be placed after each user "signs-off" own cart as completed. Group might decide to place orders towards multiple suggestions (merchant-time/date pair).

In some embodiments, the database system can present to each user a menu, list of products or services. The menu or list of products/services can include personalized smart price calculated based on factors of the group and/or the merchant.

For example, factors can include:
- conditions related to the individual (such as preference, loyalty, etc.),
- conditions related to merchant characteristics (such as inventory, availability, etc.),
- a group discount—conditional price discount such as smart pricing that assign a discount based on group size (2% for each group member) or order size (1% for each $100 spent by group)

In some embodiments, the databases system can display the personalized end-price next to each item, product or service with break down on discounts resulting from characteristics of the individual, the group, and/or the merchant. The personalized end-price might be changing dynamically as other group members add items to their carts. For example, a user can be displayed a price decrease as the order or group size grows. The user can select products and add them to cart. The database system can present to the user an app notification or group chat entry every time his order in cart price changes. A single order can be placed via API toward merchant POS system once all users finish placing their item into the cart. The single order with a calculated final discount can be placed to a merchant's POS via API, so that merchant is not aware of which products were purchased by which user.

In some embodiments, the application of the database system can keep track of the break-down of each item and corresponding price, and allow each user from the group to pay the respective portion of the combined bill as partial payment towards combined order. The database system can include partial payment online via a payment service associated with user profile (e.g., such as via credit card, other payment service, etc.). Partial payment can be completed via NFC or scan technology supported by the merchant's POS.

In some embodiments, the database system can enable users to add products to a common pool order (e.g., appetizers, shared costs, etc). A common pool can be added to a combined order and discounted based on the group discount. The costs of the common pool can be equally split between group members (either based on paying users only or considering family members).

In some embodiments, the database system determines a dynamic customized price and/or discount for the group. The database system can determine a discount for the group based on a group side or a combined order amount. For example, the database system can apply a 2% discount for each user in the group. The database system can apply a maximum discount, such as a maximum discount of 20%. The group discount can be an add-on to the individual smart pricing for each individual. The end-price per item can be dynamic and may change on the go depending on factors of the group, such as group size or order amount. The end price for products in the cart can be static except for certain factors, such as discounts due to the group size. The group discount can be finalized dynamically or when the group order is placed.

In some embodiments, the database system provides to the group a suggestion on items to purchase. The database system can display a user interface that displays items that members of the group selected. For example, a first user can select a seafood dish to order. The rest of the group members can see the selected seafood dish that the first user selected. Suggestions can come from other users not in the system. For example, user A after finding a favorite dish might "share" the dish with other users, star-rate it, and leave a comment for the other user.

In some embodiments, the database system provides an option for a user to make a selection for another user. For example, the database system can enable a user to select menu items for his or herself as well as for another user in the group. The database system can help a user to select a menu item. The database system can provide this recommendation based on the user's preferences, profiles, restrictions, activity history, past reviews and ratings, location, loyalty, and/or the like. Thus, the database system can customize recommendations to individuals in the group. For example, the database system can recommend menu items for each of the users in the group, wherein the recommendations of the menu items are based on individual user profiles. The database system can provide a user interface, such as an application or a group chat, to present and/or share a user's order with other users within the group.

Figure 32:
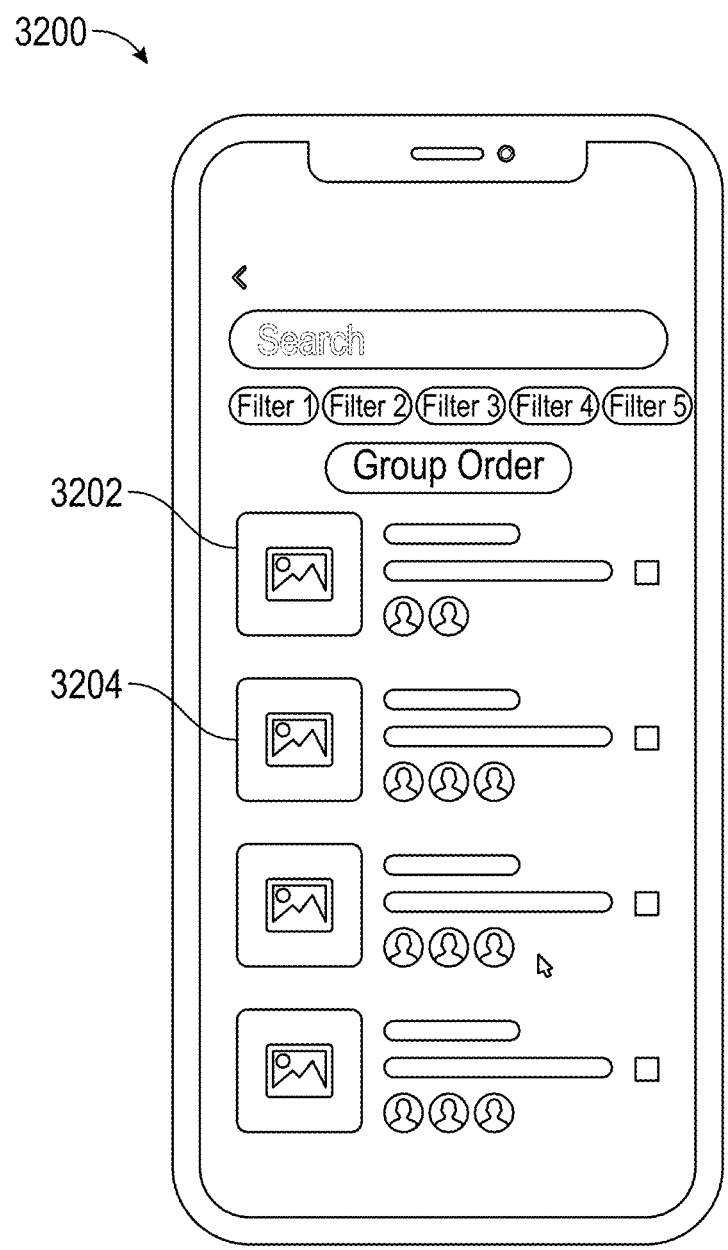
FIG. 32 illustrates a user interface displaying the group order according to some embodiments.

In some embodiments, the database system is configured to receive a request from a group of users to place a group order, make a purchase, or book a reservation as a group. The database system can display services or products of the merchant retrieved via a merchant API. The merchant can configure, in the merchant's profile, if booking confirmation is required before ordering. Any member of the group can mark the status of the booking in the application to indicate booking status, name, date/time and max group size to the rest of the group. FIG. 32 illustrates a user interface 3200 displaying the group order according to some embodiments. The group order can include orders from each of the plurality of users 3202, 3204.

In some embodiments, the database system can determine benefits associated with the bulk order or purchase. The database system can determine a breakdown of individual orders of each member. The database system can automatically display payments that need to be made by each member of the group. The database system can determine tipping percentages for each member's order in the group. The database system can divide the loyalty points according to the orders placed by individuals of the group.

Figure 33:
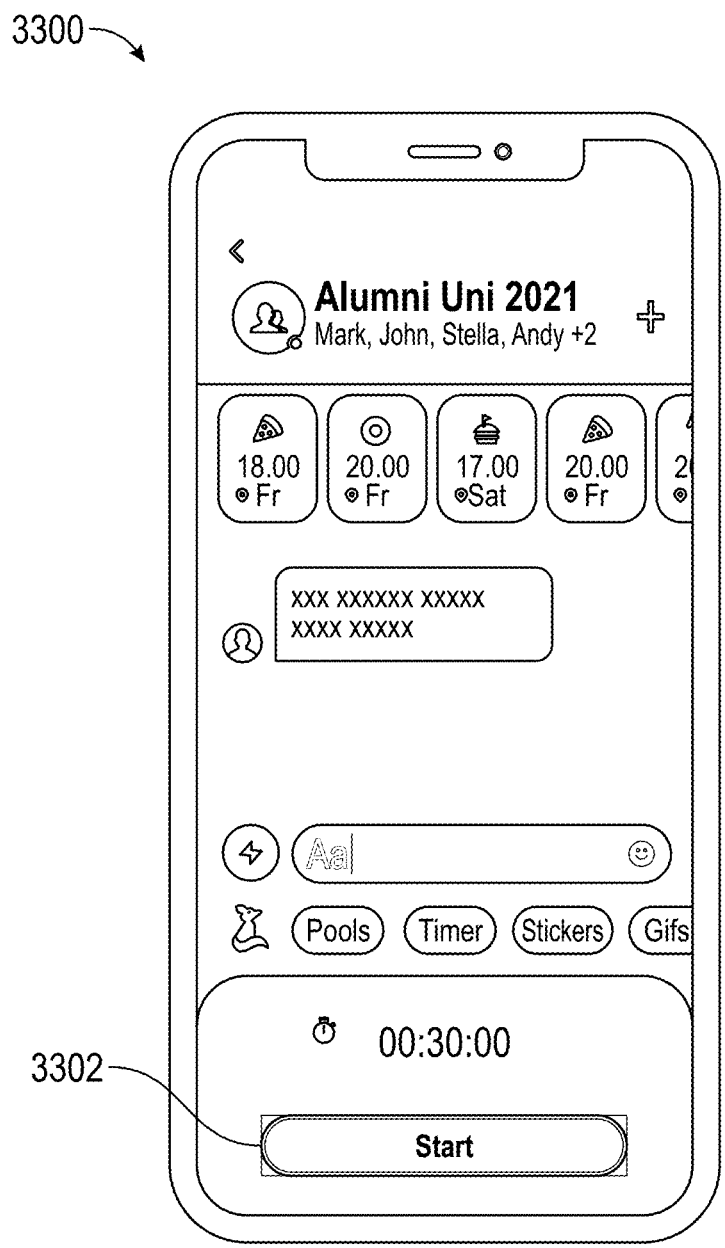
FIG. 33 illustrates a user interface that includes a timer for individuals to make a recommendation and/or an order according to some embodiments.

In some embodiments, the database system can display an interface presenting a list of products, their options and possible modifications. Each product can be assigned with a personal price for each user, such as based on their own profile. Members of the group who are ordering together toward a combined order can see dynamically updated icons, comments, ratings, emojis, avatars, etc. next to the products marked, ordered, commented on, rated by other users of the group. Each user can share his or her opinion about the product with others by tapping the product from the list, choosing pop-up icon representing comment, typing the comment and confirming. Product can be marked with "dialog cloud" icon to all other users in the group and they would be able to see the comment after tapping ("I had it last time and it was amazing, try it"). Moreover, user can include a rating for the products, such as a star rating. Users can share the recommendation to the group. An order icon can enable a user to order on behalf of another user. Users can send a referral of a product to a user outside of the group, and be rewarded by the merchant such as an additional discount. The ratings and comments may be marked as public, which results in sharing with other users of the database system, and the users can receive rewards, such as loyalty points. FIG. 33 illustrates a user interface 3300 that includes a timer 3302 for individuals to make a recommendation and/or an order according to some embodiments. At the end of the timer 3302, the database system can determine the recommendation for the merchant and/or order to place, such as based on a majority vote.

In some embodiments, the database system can apply a POS booking API to verify that a merchant is able to accommodate a given group size at a particular time. The merchant can also configure this information in its own profile of available capability (e.g., max group size of 10 for boat trip, bowling alley, go-kart race, table size).

In some embodiments, the database system can complete the booking via a POS API if the merchant POS system provides such support. In case of merchant POS does not support the booking API, the application may present the merchant's contact information, such as a phone number, that the user can use for manual booking. At step 3220, the database system can receive selections from each of the plurality of users in the group among the services or products of the merchant, and at step 3222, the database system can place the order with the merchant via the merchant API.

In some embodiments, the database system can provide the following features in booking, ordering, and menu displaying:

1. the database system can also allow users to interact with a selected merchant to book, purchase, order, reserve, buy the product or service. Each group member can be able to order his/her selection of product or services, however the order would be placed as one group order towards the merchant
2. the database system can allow ordering or purchasing of the services or products as a pre-order or could be placed on premises of shop or service provider (e.g., app used as digital ordering menu). It could be decision of the group on the moment of placing final group order
3. the database system can allow ordering for another member of the group provided member accepted/allowed it
4. the database system can allow users to share the order details between members of the group (view, copy, suggest, discuss, vote, rate each product and service while ordering)
5. As a group order can come with benefits in terms of discounts, perks, points, freebies, etc. (described in next point), the database system can keep track of specific products and services ordered by each member of the group. This would allow automatic check-split at the end of the order. Each group member would also be allowed to specify own tip amount, which would be combined as a group tip for the merchant or service provider.
6. the database system can allow users to register credit card or other methods of payments by each group member to provide convenient way of payment for split check
7. the database system can allow users to pay for other, selected members of the group (e.g., kids ordering themselves, while parents paying for them at the end)
8. the database system can allow the organizer of the group (person who initiated the event) to invite others indicating he/she will be paying for the whole group. Each group member would be able to order/purchase product or services that would later be charged to organizer.
9. the database system can allow the organizer to specify an amount of money the organizer would like to pay for others as part of the invitation. For example, the organizer can invite group of friends for a birthday party to a restaurant offering $50 per invited person. Each person in the group can participate in group order. First $50 spent would be charged to the organizer.

Reminder over the maximum would be charged to the ordering person (same as spit check functionality)
10. the database system can allow group ordering that keeps track of break-down to allow convenient split check
11. the database system can allow ordering on behalf of others
12. the database system can allow group ordering using an interface that allows communication via an app between the group during the ordering process (sharing with others, recommending, suggesting, etc)
13. the database system can allow inviting a group of users and allowing them to place their orders that organizer would be charged at the end (with preset maximum)

Figure 34:
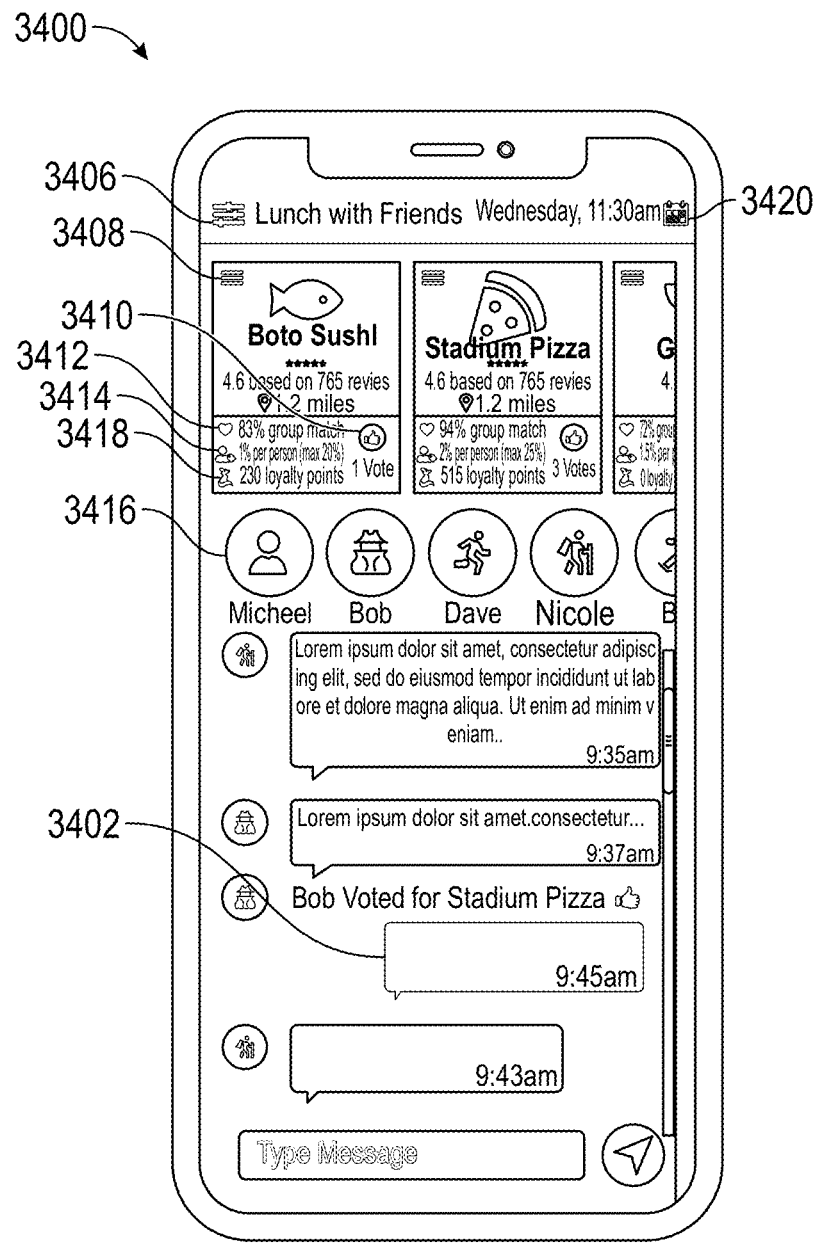
FIG. 34 illustrates a group chat user interface according to some embodiments.
Figure 35:
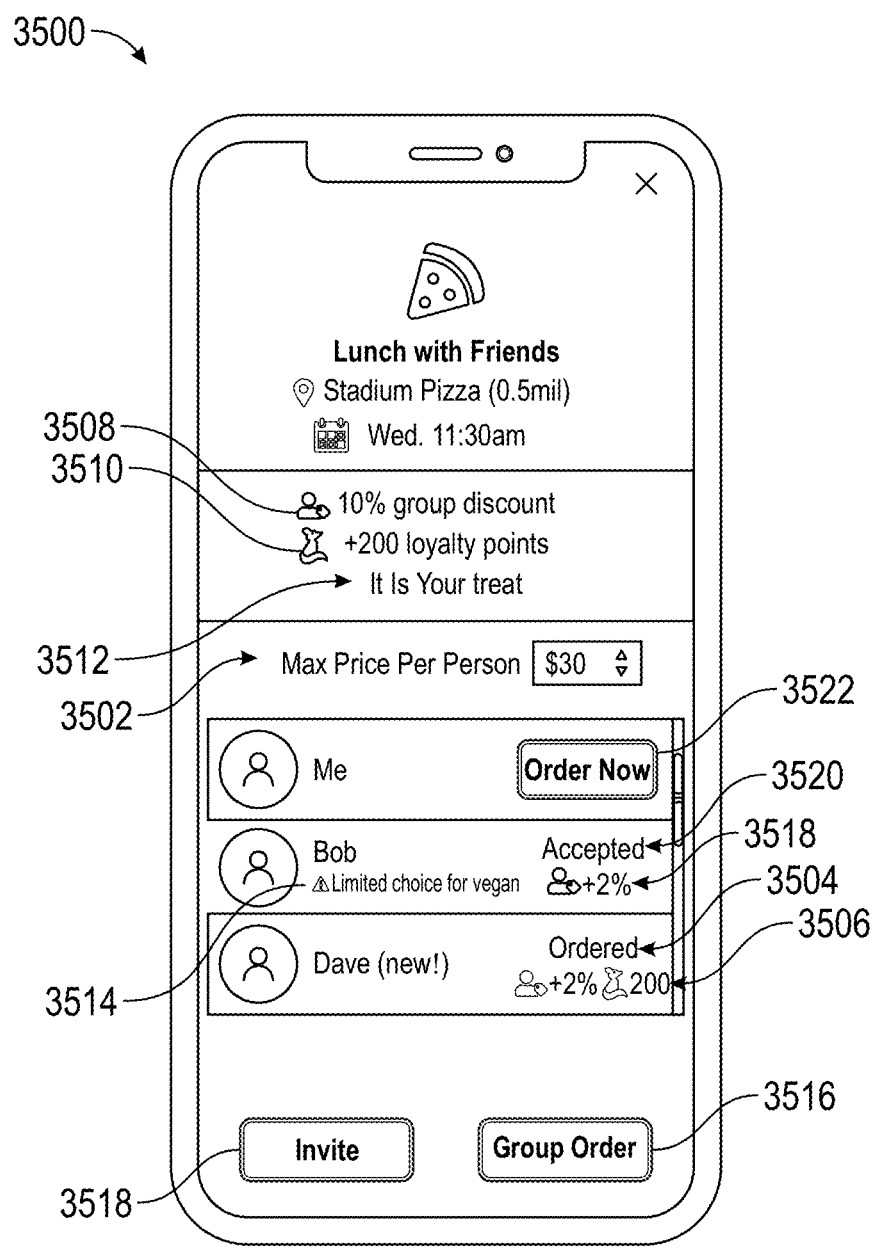
FIG. 35 illustrates a user interface displaying more detail on a particular event according to some embodiments.
Figure 36:
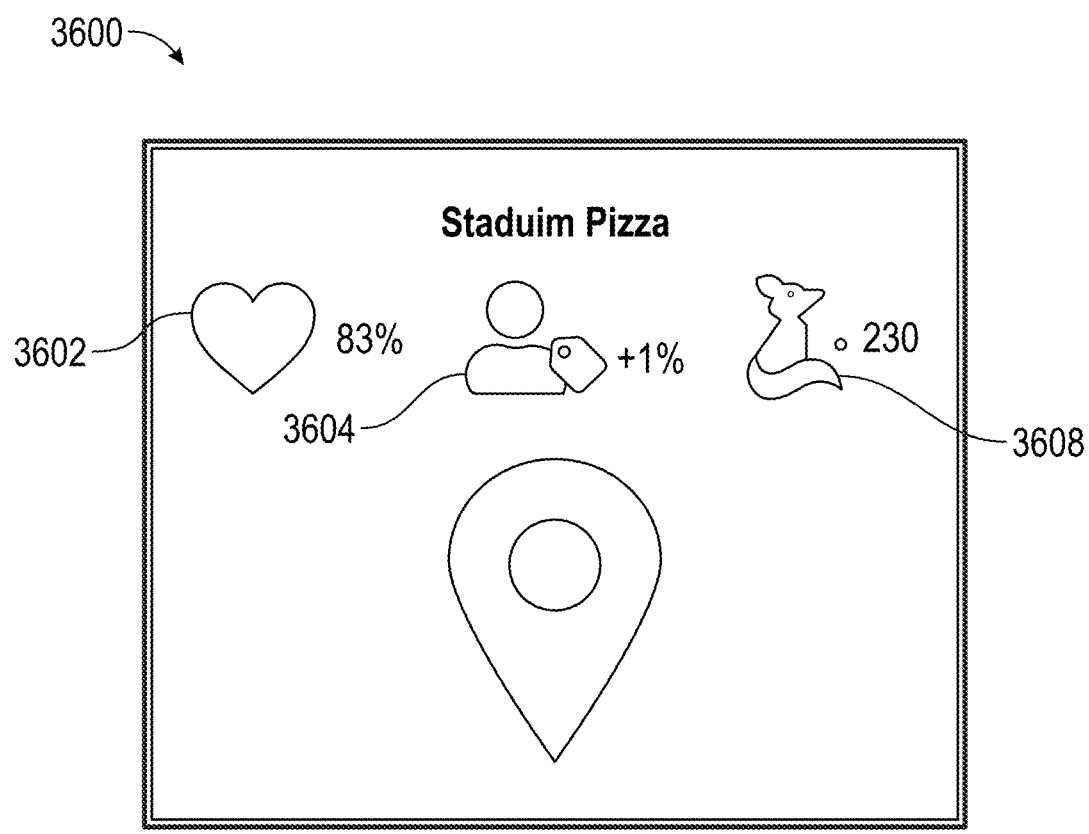
FIG. 36 illustrates a user interface of a default map marker according to some embodiments.

In some embodiments, the database system can provide the following interface features:
1. the database system can provide an interface that includes a group chat, such as a text-messaging or social network chat with additional functionality for placing suggestions on place, merchant, service provider and functionality to group vote, rate, discuss, mark, describe each of them. FIG. 34 illustrates a group chat user interface 3400 according to some embodiments. The group chat user interface 3400 can include a group chat portion 3402 where users can communicate with other members of the group. The group chat user interface 3400 can include information of a time and place of events set by the organizer 3504. The group chat user interface 3400 can include options to open event configurations 3406, view details of an event or merchant to check personalized offers 3408, voting options 3410, matching statistics on how well the place matches with the group based on group preferences, profiles, locations, restrictions, etc. 3412, group discounts, amount of discount the merchant is offering for a group order 3414, avatars for a group 3416, loyalty point information for the merchant 3418, and time and place for the event set by the organizer 3420.
2. FIG. 35 illustrates a user interface 3500 displaying more detail on a particular event according to some embodiments. The user interface 3500 can include a maximum price per person that the organizer can set for the group 3502. In the scenario of the organizer's invitation, the organizer can specify a maximum price per person he or she is willing to pay. In the scenario of a group member order over the maximum price, the remaining amount is charged to the person. The user interface 3500 can include a total group discount added to each member's order 3508, loyalty points for the organizer due to inviting other members of the group 3510, an indication of how the check will be paid (e.g., split check, organizer pays) 3512, warnings about dietary restrictions for a user based on the user's profile and a merchant provided limited selection on food (e.g., vegan choices) 3514, a button to place an order for an individual 3522, a button to place the final group order 3516, a button to invite additional persons 3518, and statistics on the group or other users in the group, such as an order that another user placed 3504 or loyalty points that the user brings to the group 3506, changes in group discounts due to statuses such as a user accepting an invitation (e.g., additional 2% discount) 3518, status of an order of a specific group member 3520,
3. the database system can provide an interface that can dynamically notify the group on the availability, pricing, discounts, rating, restrictions, limitations, etc. of each place selected as a group suggestion. For example, the interface will notify the group if the selected place does not provide vegan food in case one of the group members has vegan restriction on his/her profile
4. the database system can provide an interface that can show the suggested merchants on the map with markers extended with group match, group discount and loyalty points information
5. the database system can provide an interface that can inform the group of the updates related to the applied discounts, perks and benefits as other members of the groups place their order (e.g., pop-up with information of group discount of additional 5% due to another person placed the order)
6. the database system can provide an interface that can allow ordering or purchasing product or services via the app after the group select the place, merchant, service provider
7. the database system can provide an interface that can allow users to place photos, videos, comments, reviews, rating on the group chat as well as link them to the specific order, product or service as feedback to the merchant. This can be done directly as part of the group chat by referring specific product or services as they browse (e.g., suggesting others a particular dish with comment how good it was last time, warning others that something contain peanuts, rating the service with comment on chat)
8. the database system can provide an interface that can allow users to use the chat at any time from the moment the group event is created (even after the purchase)
9. the database system can provide a group chat interface with functionality that allows event planning (selection of the place, time, suggestions, inviting more persons, who pays, adjusting to group preferences), voting, ordering, paying, receiving benefits, reviewing, and rating as a group and not as an individual
10. FIG. 36 illustrates a user interface 3600 of a default map marker according to some embodiments. The database system can provide a default map marker with specific information about group match 3602, group discount 3604 and loyalty points 3606 information (or any other dynamic discount related information).

In some embodiments, the database system can provide the following group discount and offer features:
a. the database system can allow the merchant to create dynamic pricing group discounts conditioning the discount amount on the group size or group order size. For example: 1% discount on the group order for every person ordering in the group up to 20% max. $25 discount for every $150 spent as a group, etc.
b. the database system can inform all the group members about expected discount and final price of each of the member order every time the discount amount changes based on changed conditions. Members that have their orders placed can observe price changing as others are ordering. Every order can be changed anytime until the final group order is placed
c. the database system can implement an algorithm to suggest to the group how much they are missing to the next discount level d. the database system can allow the merchant to setup additional discount, perks, points, etc. for the group event organizer for inviting and bringing in persons new to the merchant (new customers)
e. the database system can provide dynamic group discounting as opposed to fixed group offers
f. the database system can provide perks for bringing new customers to the merchant (e.g., introducing your friends to new place you found)

In some embodiments, the database system can provide price conditioning for dynamic pricing based on:
   a. group size
   b. group order total price
   c. combined loyalty points of the group members
   d. amount of time the order was placed ahead of the time to provide the service—example: 2% for each day ahead of renting the bike)
   e. current day sales amount
   f. current day sales amount comparing to average sale, same day average, etc.
   g. number of open seats, tables, places
   h. Inventory levels on hand (at the location shopper order at or based on multi location inventory distribution)
   i. Available Labor at the time of service (e.g., for accommodation of larger parties)—staff availability based on information from POS team management
   j. Product labels and tags (e.g., marking product as a new service for additional Introductory discount to it or marking products as end-of-season for additional dynamic discount)

Additional Embodiments

In some embodiments, the term voucher or event notifications is used, rules or triggers are used, coupon or event notification content is used, promotion to event notification content value is used, discount or event notification content value adjustment is used, database query or user query, or shopper, consumer, or user is used to describe certain embodiments. However, it is understood that the embodiments disclosed herein apply to either of these terms.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate embodiments are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A database processing system for accessing databases and updated data records and triggering event notifications, the system comprising:
   a first database including a plurality of data records;
   a second database including a plurality of triggers; and
   a hardware processor configured to execute computer-executable instructions in order to:
      retrieve a contact list from a computing device of a user;
      receive an indication from the user to add a plurality of users to a virtual group;
      in response to the database processing system receiving the indication to add the plurality of users to the virtual group:
         provide an invitation to the plurality of users;
         generate chatroom user interface data for the virtual group, wherein the chatroom user interface data is configured to generate a chatroom user interface on the computing device of the user;

receive an indication via a user interface element from the computing device of the user to select a merchant for the virtual group;

retrieve geolocation data from computing devices of the plurality of users that have accepted the invitation to join the virtual group;

identify a subset of merchants based on distances of each of the plurality of users in the virtual group to candidate merchants;

display the subset of merchants on the computing device;

receive an indication to book a reservation for a selected merchant from the subset of merchants;

display information related to the selected merchant in the chatroom user interface;

receive an indication to compose an order for the virtual group at the selected merchant;

sending a booking confirmation to the selected merchant via a merchant Application Programming Interface (API);

display services or products of the selected merchant retrieved via the merchant API;

receive selections from each of the plurality of users in the virtual group among the services or products of the selected merchant; and transmit code indicative of the order to the selected merchant via the merchant API based on the received selections.

2. The database processing system of claim 1, wherein the geolocation data is generated from a global positioning system (GPS) sensor of the corresponding computing device configured to communicate with satellites and to determine the geolocation of the computing device.

3. The database processing system of claim 1, wherein the hardware processor is further configured to identify the subset of merchants based on a scoring algorithm, wherein the scoring algorithm applies a score for each user based on the distance of the user to the candidate merchant.

4. The database processing system of claim 1, wherein the hardware processor is further configured to identify the subset of merchants based on at least one of: a user's preference, restriction on products or services, activity history of the user at the merchant, reviews and ratings of the merchant, or loyalty points for the merchant.

5. The database processing system of claim 1, wherein the hardware processor is further configured to execute computer-executable instructions in order to display a map user interface, wherein the map user interface displays the geolocation for each of the subset of merchants and at least one characteristic of the merchant.

6. The database processing system of claim 5, wherein the at least one characteristic includes an expected discount, a loyalty point rating, or a group match score.

7. The database processing system of claim 1, wherein the hardware processor is further configured to: receive availability for booking from a system of the merchant to retrieve booking availability; filter the booking availability based on a group size of the virtual group; and display the booking availability of the merchant on the computing device of the user.

8. The database processing system of claim 1, wherein the chatroom user interface data includes a first user interface element enabling a user to add comments to the selected merchant, wherein in response to the user adding comments, displaying, by the computing device, the comments on chatrooms for each user in the virtual group.

9. The database processing system of claim 8, wherein the chatroom user interface data further includes a second user interface element enabling a user to add a rating for the selected merchant, wherein in response to the user adding a rating, displaying, by the computing device, the rating on chatrooms for each user in the virtual group.

10. The database processing system of claim 1, wherein the hardware processor is further configured to: receive a review of the merchant from the virtual group; and correlate the merchant with the review of the virtual group to display to other users viewing the merchant.

11. A method for accessing databases and updated data records and triggering event notifications, the method comprising:

providing code indicative of an invitation to a plurality of users to join a virtual group;

generating chatroom user interface data for the virtual group, wherein the chatroom user interface data is configured to generate a chatroom user interface on computing devices of the plurality of users;

retrieving geolocation data from each of the computing devices of the plurality of users;

identifying a subset of merchants among candidate merchants based on distances of each of the plurality of users to the candidate merchants;

causing one or more computing devices to display the subset of merchants on one or more of the computing devices of the plurality of users;

receiving a selection of a merchant from among the subset of merchants;

sending a booking confirmation to the selected merchant via a merchant Application Programming Interface (API);

displaying services or products of the selected merchant retrieved via the merchant API;

receiving at least one selection from each of the plurality of users in the virtual group among the services or products of the selected merchant; and transmitting code indicative of an order to the selected merchant via the merchant API.

12. The method of claim 11, wherein the method further comprises determining a personalized price for each user for the products or services based on individual user profiles.

13. The method of claim 12, wherein the individual user profiles include at least one of: activity history of the corresponding user at the merchant, reviews and ratings of the merchant by the corresponding user, or loyalty points for the merchant by the corresponding user.

14. The method of claim 11, wherein the method further comprises receiving confirmation of the order from each of the users before placing the order with the merchant.

15. The method of claim 11, wherein the method further comprises: determining a group discount for the order based on a number of users in the virtual group; and applying the group discount to a total price for the order.

16. The method of claim 11, wherein the method further comprises: separating costs for the purchase of the products or services for each user based on the corresponding user's selection of the products or services; and providing the separated costs to the computing devices corresponding to the plurality of users.

17. The method of claim 11, wherein the chatroom user interface displays a user interface element configured to enable a user to provide a vote for the merchant.

18. The method of claim 11, wherein the method further comprises displaying the selections from each of the plurality of users in real time of receiving the selections from each of the plurality of users.

19. A non-transitory computer storage medium storing computer-executable instructions that, when executed by one or more processors, cause the one or more processors to:

provide code indicative of an invitation to a plurality of users to join a virtual group;

generate chatroom user interface data for the virtual group, wherein the chatroom user interface data is configured to generate a chatroom user interface on computing devices of the plurality of users;

retrieve geolocation data from each of the computing devices of the plurality of users;

identify a subset of merchants among candidate merchants based on distances of each of the plurality of users to the candidate merchants;

cause one or more computing devices to display the subset of merchants on one or more of the computing devices of the plurality of users;

receive a selection of a merchant from among the subset of merchants;

send a booking confirmation to the selected merchant via a merchant Application Programming Interface (API);

display services or products of the selected merchant retrieved via the merchant API;

receive at least one selection from at least one of the plurality of users in the virtual group among the services or products of the selected merchant; and transmit code indicative of an order to the selected merchant via the merchant API.

20. The non-transitory computer storage medium of claim 19, wherein identifying the subset of merchants is further based on a group-match-score.

* * * * *